(12) United States Patent
Du et al.

(10) Patent No.: US 12,528,940 B2
(45) Date of Patent: Jan. 20, 2026

(54) CROSSLINKABLE POLYSILOXANE

(71) Applicant: Commonwealth Scientific and Industrial Research Organisation, Acton (AU)

(72) Inventors: Ke Du, Acton (AU); Johan Basuki, Acton (AU); Timothy Hughes, Acton (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 766 days.

(21) Appl. No.: 17/871,750

(22) Filed: Jul. 22, 2022

(65) Prior Publication Data
US 2022/0380553 A1 Dec. 1, 2022

Related U.S. Application Data

(63) Continuation-in-part of application No. PCT/AU2021/050034, filed on Jan. 21, 2021.

(30) Foreign Application Priority Data

Jan. 22, 2020 (AU) ................................ 2020900162

(51) Int. Cl.
| | | |
|---|---|---|
| C08L 83/14 | (2006.01) | |
| B29C 64/124 | (2017.01) | |
| B33Y 10/00 | (2015.01) | |
| B33Y 80/00 | (2015.01) | |
| C08G 77/12 | (2006.01) | |
| C08G 77/20 | (2006.01) | |
| C08G 77/28 | (2006.01) | |
| C08G 77/452 | (2006.01) | |
| C08G 77/54 | (2006.01) | |
| C08J 3/24 | (2006.01) | |
| C09J 183/10 | (2006.01) | |
| B29K 83/00 | (2006.01) | |
| B33Y 70/00 | (2020.01) | |

(52) U.S. Cl.
CPC ............ *C08L 83/14* (2013.01); *B29C 64/124* (2017.08); *B33Y 10/00* (2014.12); *B33Y 80/00* (2014.12); *C08G 77/12* (2013.01); *C08G 77/20* (2013.01); *C08G 77/28* (2013.01); *C08G 77/452* (2013.01); *C08G 77/54* (2013.01); *C08J 3/24* (2013.01); *C09J 183/10* (2013.01); *B29K 2083/00* (2013.01); *B33Y 70/00* (2014.12); *C08G 2170/00* (2013.01); *C08G 2190/00* (2013.01); *C08J 2383/08* (2013.01); *C08J 2383/10* (2013.01); *C08J 2383/14* (2013.01)

(58) Field of Classification Search
CPC .................................. C08L 83/10; C08L 83/14
USPC .................................................... 525/474, 477
See application file for complete search history.

(56) References Cited

U.S. PATENT DOCUMENTS 5,919,441 A * 7/1999 Mendolia ............... A61Q 15/00
514/846
2020/0369835 A1 11/2020 Stepp et al.

FOREIGN PATENT DOCUMENTS

| CN | 111303431 A | * | 6/2020 |
| CN | 110573555 A | | 2/2022 |
| JP | 2020196847 A | * | 12/2020 |

OTHER PUBLICATIONS

Machine translation of JP 2020-196847 A (no date).*
Machine translation of CN 111303431 (no date).*
International Search Report for PCT/AU2021/050034 mailed Mar. 1, 2021, all pages.

* cited by examiner

*Primary Examiner* — Marc S Zimmer
(74) *Attorney, Agent, or Firm* — Kilpatrick Townsend & Stockton LLP

(57) ABSTRACT

The present invention provides a liquid polysiloxane comprising a siloxane-thiourea segment and a crosslinkable functional group(s) selected from one or more ethylenically unsaturated groups, silyl hydride groups, alkylenethiol groups and combinations thereof.

17 Claims, 14 Drawing Sheets

CROSSLINKABLE POLYSILOXANE

CROSS-REFERENCE TO RELATED APPLICATIONS

This application is a bypass continuation-in-part filing of PCT/AU2021/050034, filed Jan. 21, 2021, which application claims priority to Australian Patent Application No. 2020900162, filed Jan. 22, 2020, the contents of which are hereby incorporated by reference in their entireties for all purposes.

FIELD OF THE INVENTION

The present invention relates to a crosslinkable polysiloxane, to a resin composition comprising the crosslinkable polysiloxane, to a method of producing a three-dimensional silicone article using the crosslinkable polysiloxane, and to a three-dimensional silicone article comprising a crosslinked form of the crosslinkable polysiloxane.

BACKGROUND OF THE INVENTION

Silicones, also known as polysiloxanes, are a class of polymer widely used in a range of applications, including industrial and medical applications. The popularity of silicones arises due to a number of favourable properties such as chemical stability, biocompatibility, non-toxicity, high gas permeability and elasticity. Such polymers can also exhibit resistance to degradation and microbial growth.

Medical devices that are customised to suit individual requirements are of increasing interest. For example, bespoke implants for cosmetic and reconstructive applications are becoming highly sought after. However, there are numerous challenges to manufacturing customised medical devices, particularly those made using polysiloxanes, as they require high precision manufacturing and often need to be produced rapidly.

Additive manufacturing techniques such as three-dimensional (3D) printing has allowed custom-designed complex 3D articles to be rapidly produced. 3D printing typically involves the successive addition of material in a layer-by-layer manner to construct a 3D article, with layers then being fused or bonded together. 3D printed articles are most commonly produced using suitable metals or thermoplastic polymer.

Articles made using polysiloxanes have traditionally been formed via a moulding process. However, such a process inherently lacks any practical ability for customised manufacturing due to the time and cost associated with retooling and process optimisation.

While it would be desirable to manufacture polysiloxane-based articles by 3D printing, that has proven challenging to date. For example, it has proven difficult to achieve sufficiently fast curing (i.e. crosslinking) rates during 3D printing. Also, the physical properties of polysiloxane-based articles produced by 3D printing have been quite poor, particularly in terms of their elasticity.

An opportunity therefore remains to develop polysiloxanes that are better suited for use in 3D printing.

SUMMARY OF THE INVENTION

The present invention provides a liquid polysiloxane comprising a siloxane-thiourea segment(s) and a crosslinkable functional group(s) selected from one or more ethylenically unsaturated groups, silyl hydride groups, alkylenethiol groups and combinations thereof.

It has now surprisingly been found this unique class of liquid polysiloxane is well suited for use in 3D printing applications, not only in terms of how the polysiloxane performs (e.g. crosslinking ability) during the 3D printing process itself, but also in terms of the excellent physical properties of articles produced using the polysiloxane. Notably, rapid crosslinking can be achieved during 3D printing and complex articles with fine detail can be produced using the polysiloxane without compromising elasticity. Articles produced using that unique class of liquid polysiloxane can also advantageously exhibit self-healing properties.

The polysiloxane according to the invention presents in the form of a polymer chain that may be linear or branched.

The polysiloxane comprises as part of the polymer chain one or more siloxane-thiourea segment(s) and one or more crosslinkable functional groups.

The siloxane-thiourea segment(s) is covalently attached to the polysiloxane polymer chain and may be located in-chain, pendent from and/or at the termini of the polymer chain.

The cross-linkable functional group(s) is covalently attached to the polysiloxane polymer chain and may be located pendent from and/or at the termini of the polymer chain.

In one embodiment, the siloxane-thiourea segment of the polysiloxane comprises a structure of formula (I):

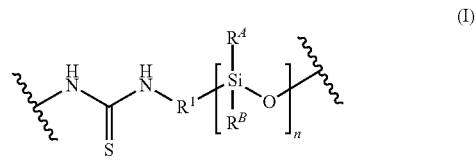

(I)

wherein:
  each $R^A$ and $R^B$ are independently selected from H, optionally substituted alkyl, optionally substituted aryl, optionally substituted siloxane, a moiety comprising an alkylenethiol group, and a moiety comprising one or more ethylenically unsaturated groups;
  $R^1$ is optionally substituted alkylene or optionally substituted arylene; and
  n is an integer of at least 1.

In one embodiment, one or both of $R^A$ and $R^B$ in at least one repeat unit defined by n in formula (I) is independently selected from H, a moiety comprising an alkylenethiol group, and a moiety comprising one or more ethylenically unsaturated groups.

$R^A$ and $R^B$ in the same or different repeat units defined by n may be independently the same or different.

In a further embodiment, the siloxane-thiourea segment of the polysiloxane comprises a structure of formula (II):

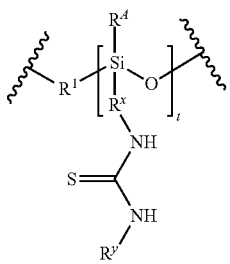

(II)

wherein:
  each $R^A$ is independently selected from H, optionally substituted alkyl, optionally substituted aryl, optionally substituted siloxane, a moiety comprising an alkylenethiol group, and a moiety comprising one or more ethylenically unsaturated groups;
  $R^1$ and each $R^x$ are each independently optionally substituted alkylene or optionally substituted siloxane;
  each $R^y$ is independently optionally substituted alkyl, optionally substituted siloxane, a moiety comprising an alkylenethiol group, and a moiety comprising one or more ethylenically unsaturated groups; and
  t is an integer of at least 1.

In one embodiment, $R^A$ in at least one repeat unit defined by tin formula (II) is independently selected from H, a moiety comprising an alkylenethiol group, and a moiety comprising one or more ethylenically unsaturated groups.

Each $R^A$, $R^x$ and $R^y$ in repeat units defined by t may be independently the same or different.

In yet a further embodiment, the siloxane-thiourea segment of the polysiloxane comprises a structure of formula (III):

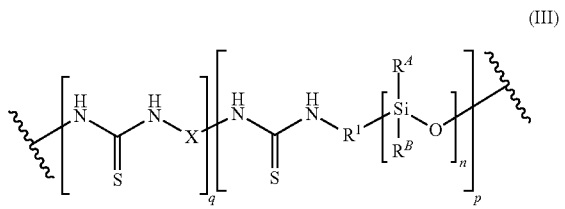

(III)

wherein:
  each $R^A$ and $R^B$ are independently selected from H, optionally substituted alkyl, optionally substituted aryl, optionally substituted siloxane, a moiety comprising an alkylenethiol group, and a moiety comprising one or more ethylenically unsaturated groups;
  each X is independently selected from optionally substituted alkylene, optionally substituted arylene, (poly)siloxane, polyether, polyimide and polyester;
  each $R^1$ is independently optionally substituted alkylene or optionally substituted arylene;
  n is an integer of at least 1;
  p is an integer of at least 1; and
  q is an integer of at least 1.

In one embodiment, one or both of $R^A$ and $R^B$ in at least one repeat unit defined by n in formula (III) is independently selected from H, a moiety comprising an alkylenethiol group, and a moiety comprising one or more ethylenically unsaturated groups.

$R^A$ and $R^B$ in the same or different repeat units defined by n in formula (III) may be independently the same or different.

$R^1$ in repeat units defined by p may be the same or different.

X in repeat units defined by q may be the same or different.

Where $R^A$ and/or $R^B$ are independently selected from H, a moiety comprising an alkylenethiol group, and a moiety comprising one or more ethylenically unsaturated groups, it will be appreciated they may represent one or more of the crosslinkable functional groups of the polysilioxane.

The invention further provides a liquid resin composition comprising a liquid polysiloxane according to the invention and an agent for promoting crosslinking of the crosslinkable functional group(s).

In one embodiment, the agent for promoting crosslinking of the crosslinkable functional group(s) is selected from a catalyst and a radical initiator.

There are a number of permutations of crosslinkable functional groups that can form part of the polysiloxane according to the invention and function to provide a means for crosslinking to produce a crosslinked polymer structure.

In one embodiment, the polysiloxane comprises (i) a siloxane-thiourea segment, and (ii) one or more ethylenically unsaturated groups.

In a another embodiment, the polysiloxane comprises (i) a siloxane-thiourea segment, and (ii) two or more ethylenically unsaturated groups.

In a further embodiment, the polysiloxane comprises (i) a siloxane-thiourea segment, and (ii) two or more silyl hydride groups.

In a further embodiment, the polysiloxane comprises (i) a siloxane-thiourea segment, and (ii) two or more alkylenethiol groups.

In a further embodiment, the polysiloxane comprises (i) a siloxane-thiourea segment, (ii) a silyl hydride group, and (iii) an alkylenethiol group.

In a further embodiment, the polysiloxane comprises (i) a siloxane-thiourea segment, (ii) a silyl hydride group, and (iii) an ethylenically unsaturated group.

In a further embodiment, the polysiloxane comprises (i) a siloxane-thiourea segment, (ii) an alkylenethiol group, and (iii) an ethylenically unsaturated group.

The polysiloxane in accordance with the invention may comprise one of more crosslinkable functional groups described herein.

The polysiloxane in accordance with the invention may comprise one of more siloxane-thiourea segments described herein.

The resin composition comprising the polysiloxane may be provided with a reactive diluent. The reactive diluent can assist with modifying the viscosity of the resin composition.

The reactive diluent can also comprise crosslinkable functional groups that can react with crosslinkable functional groups of the polysiloxane according to the invention to form a crosslinked structure.

In one embodiment, the resin composition comprises (i) a polysiloxane comprising (a) a siloxane-thiourea segment, and (b) one or more ethylenically unsaturated groups, and (ii) a reactive diluent comprising one or more ethylenically unsaturated groups.

In a further embodiment, the resin composition comprises (i) a polysiloxane comprising (a) a siloxane-thiourea segment, and (b) two or more ethylenically unsaturated groups, and (ii) a reactive diluent comprising one or more ethylenically unsaturated groups.

In a further embodiment, the resin composition comprises (i) a polysiloxane comprising (a) a siloxane-thiourea segment, and (b) two or more ethylenically unsaturated groups, and (ii) a reactive diluent comprising two or more silyl hydride groups.

In a further embodiment, the resin composition comprises (i) a polysiloxane comprising (a) a siloxane-thiourea segment, and (b) two or more silyl hydride groups, and (ii) a reactive diluent comprising two or more ethylenically unsaturated groups.

In another embodiment, the resin composition comprises (i) a polysiloxane comprising (a) a siloxane-thiourea segment, and (b) two or more alkylenethiol groups, and (ii) a reactive diluent comprising two or more ethylenically unsaturated groups.

In another embodiment, the resin composition comprises (i) a polysiloxane comprising (a) a siloxane-thiourea segment, and (b) two or more ethylenically unsaturated groups, and (ii) a reactive diluent comprising two or more alkylenethiol groups.

Specific examples of reactive diluents include 3-[tris (trimethylsiloxy)silyl]propyl methacrylate, mono- or bis-functional urethane acrylate, e.g. sold commercially as Genomer 1122™ or CN991, dimethyl acrylamide, hydroxyethyl methacrylate, ethylene glycol dimethacrylate, pentaerythritol tetramethacrylate, trimethylolpropane trimethacrylate, pentaerythritol tetrakis(3-mercaptopropionate), trimethylolpropane tris(3-mercaptopropionate), 3-[tris(trimethylsiloxy)silyl] propyl methacrylate, vinyl terminated polydimethylsiloxane, vinyl terminated diphenylsiloxane-dimethylsiloxane copolymer, vinyl terminated polyphenylmethylsiloxane, vinyl terminated trifluoropropylmethylsiloxane-dimethylsiloxane copolymer, vinylmethylsiloxane-dimethylsiloxane copolymers (vinyl or hydride terminated), hydride terminated polydimethylsiloxane, α-monovinyl-ω-monohydride terminated polydimethylsiloxane, methylhydrosiloxane-dimethylsiloxane copolymer, methacryloxypropyl terminated polydimethylsiloxane, (3-acryloxy-2-hydroxypropoxy-propyl) terminated polydimethylsiloxane, (methacryloxypropyl)methylsiloxane-dimethylsiloxane copolymer, monomethacryloxypropyl functional polydimethylsiloxane, (bicycloheptenyl)ethyl terminated polydimethylsiloxane, mercaptopropyl terminated polydimethylsiloxane, (mercaptopropyl)methylsiloxane-dimethylsiloxane copolymer, methacrylate silanes containing urea or thiourea, for example 3-propylbis(trimethylsiloxy)methylsilane-3-(2-methacryloyloxyethyl) thiourea/urea and 3-[tris(trimethylsiloxy)silyl]-3-(2-methacryloyloxyethyl) thiourea/urea.

In one embodiment, the reactive diluent comprises one or both of 3-propylbis(trimethylsiloxy)methyl silane-3-(2-methacryloyloxyethyl) urea and 3-[tris(trimethylsiloxy)silyl]-3-(2-methacryloyloxyethyl) urea.

The invention also provides a method of producing a three-dimensional silicone article, the method comprising printing a liquid resin composition according to the invention using a three-dimensional printer and crosslinking the resin composition.

The invention further provides a silicone article comprising a crosslinked polysiloxane according to the invention.

The invention also provides a silicone article comprising a crosslinked resin composition according to the invention.

The invention further provides an adhesive or sealant comprising a liquid polysiloxane or resin composition according to the invention.

Further aspects and/or embodiments of the invention are described in more detail below.

BRIEF DESCRIPTION OF THE DRAWINGS

Embodiments of the invention will now be described with reference to the following non-limiting drawings in which.

DETAILED DESCRIPTION OF THE INVENTION

Figure 1:
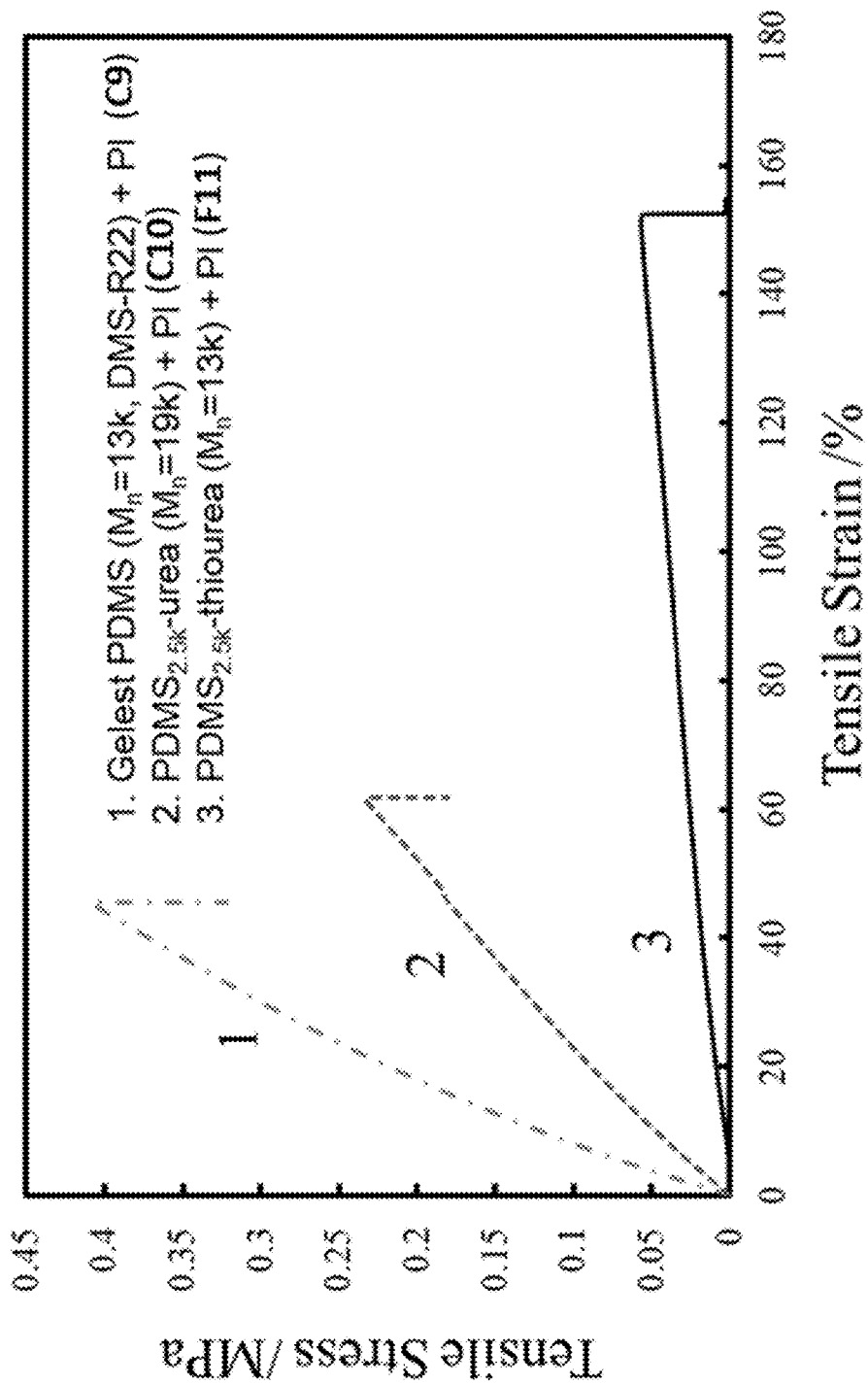
FIG. 1 depicts comparative tensile test results (stress-strain curves) for cured resin samples containing PDMS-thiourea polymer, PDMS-urea polymer and a commercial PDMS after UV crosslinking.

The polysiloxane according to the invention presents in the form of a polymer chain that may be linear or branched.

The polysiloxane comprises as part of that polymer chain one or more siloxane-thiourea segment(s) and one or more crosslinkable functional groups.

The polysiloxane is a liquid polysiloxane. By being a "liquid" is meant the polysiloxane at room temperature (25° C.) can flow under the application of a force such as gravity or an applied pressure. The polysiloxane will therefore have a definite volume but may not have a fixed shape. The liquid form of the polysiloxane can assist with its use as an adhesive, sealant or in three-dimensional printing applications.

The siloxane-thiourea segment(s) is covalently attached to the polysiloxane polymer chain and may be located in-chain, pendent from and/or at the termini of the polymer chain.

By a "siloxane-thiourea segment" is meant a portion or region within the polysiloxane molecular structure that comprises a siloxane moiety (—Si($R^A$)($R^B$)—O—) covalently coupled to a thiourea moiety (—NH—C(S)—NH—). That siloxane moiety may or may not form part of a polysiloxane in its own right. Where the siloxane moiety of the siloxane-thiourea segment does not form part of a polysiloxane, the polysiloxane according to the invention will nevertheless still comprise one or more polysiloxane moieties.

The thiourea moiety of the siloxane-thiourea segment will generally be covalently coupled to a silicon atom of the siloxane moiety through a divalent coupling moiety, for example an optionally substituted alkylene or optionally substituted arylene moiety. Generally, a nitrogen atom of the thiourea moiety will be covalently coupled to a silicon atom of the siloxane moiety through no more than about 10, or about 9, or about 8, or about 7, or about 6, or about 5, or about 4, or about 3 consecutive covalently coupled atoms. Those skilled in the art will appreciate that such consecutively covalently coupled atoms between a nitrogen atom of the thiourea moiety and a silicon atom of the siloxane moiety will represent the divalent coupling moiety.

The polysiloxane according to the invention may have one or more, for example two or more, siloxane-thiourea segments within its molecular (chain) structure. The siloxane-thiourea segment may present pendant from a main backbone chain of the polysiloxane, at the termini of a main backbone chain of the polysiloxane, it may also present in-chain of the main backbone chain structure of the polysiloxane, or it may present as a combination of two or more of pendant, termini and in-chain structures. Further detail in relation to the nature of the siloxane-thiourea segment is outlined below.

In addition to the siloxane-thiourea segment, the polysiloxane according to the invention comprises a crosslinkable functional group(s) selected from one or more ethylenically unsaturated groups, silyl hydride groups, alkylenethiol groups and combinations thereof.

Such crosslinkable functional groups render the polysiloxane itself crosslinkable. The polysiloxane according to the present invention may therefore also be described as being a crosslinkable polysiloxane.

By the polysiloxane comprising such crosslinkable functional groups it presents the potential for undergoing a crosslinking reaction so as to afford a crosslinked product. Such a crosslinking reaction could involve the polysiloxane reacting with itself, another crosslinkable material/reagent (such as a reactive diluent herein described) or a combination thereof to form a thermoset polysiloxane product. In all cases, those skilled in the art will appreciate the crosslinking process requires reaction of suitable complementary functional groups. As will be discussed in more detail below, such a crosslinking reaction may require the presence of an agent for promoting crosslinking of the crosslinkable functional group(s).

The crosslinkable functional group(s) may or may not form part of the siloxane-thiourea segment per se.

Surprisingly, it has now been found the presence of the siloxane-thiourea segment within the polysiloxane molecular structure promotes a higher rate and extent of crosslinking of the polysiloxane and results in improved elastomeric properties, for example flexibility and resilience, of a crosslinked article produced using the polysiloxane. Furthermore, crosslinked articles produced using the polysiloxane have been found to exhibit self-healing properties. Without wishing to be limited by theory, it is believed such advantageous properties stem at least in part from physical crosslinking between polymer chains through H-bonding interactions associated with the siloxane-thiourea segment that suppress unfavourable crystallization.

Again without wishing to be limited by theory, the siloxane-thiourea segment within the polysiloxane molecular structure is believed to improve solubility and stability of dispersions of additives, for example reactive diluents, solid particulate material (e.g. silica) and agents for promoting cross-linking, within the liquid state of the polysiloxane. Such improved solubility and stability of dispersions of additives is believed to be induced by the hydrophilicity and polarity of the thiourea segments. That in turn is believed to enhance the reaction chemistry of the polysiloxane so as to impart improved physical properties to cross-linked articles formed from the polysiloxane.

In one embodiment, the liquid polysiloxane is a homogeneous liquid phase.

The specified crosslinkable functional group(s) of the polysiloxane are believed to be particularly well suited for use in combination with the siloxane-thiourea segment to provide for the improved properties derived from the polysiloxane.

The crosslinkable functional group(s) include one or more ethylenically unsaturated groups. A given ethylenically unsaturated groups will of course be of a type suitable to undergo a reaction to promote crosslinking of the polysiloxane. Such ethylenically unsaturated groups may therefore be described as being crosslinkable ethylenically unsaturated groups.

As would be known to those skilled in the art, ethylenically unsaturated groups suitable to undergo a reaction to promote crosslinking can be broadly classified into two classes, namely so called activated and non-activated ethylenically unsaturated groups. Unless specified otherwise, reference herein to an "ethylenically unsaturated group" is therefore intended to embrace both activated and non-activated ethylenically unsaturated groups.

By an ethylenically unsaturated group being "activated" in the context of crosslinking/polymerisation is meant it is activated by a proximal functional group so as to be capable of undergoing free radical addition. Such activated ethylenically unsaturated group(s) may, for example, form part of a (meth)acryloyl, (meth)acryloyloxy, styrenyl, vinyl ether, vinyl ester or (meth)acrylamide group.

As would be known to those skilled in the art, by an ethylenically unsaturated group being "non-activated" in the context of crosslinking/polymerisation is meant it is not activated by a proximal functional group so as to be capable of undergoing free radical addition. Such non-activated ethylenically unsaturated groups may, for example, be represented by —R—(X)C=C(Y)$_2$, where R is Si or alkylene and X and each Y is independently alkyl or H. If R is alkylene, it may be C1-C6 alkylene or C1-C3 alkylene. R is of course also covalently coupled to the polysiloxane. If X or Y are alkyl, they may be C1-C6 alkyl or C1-C3 alkyl. In one embodiment, each Y is H. In another embodiment, both X and each Y is H.

Those skilled in the art will be able to select a suitable ethylenically unsaturated group and number thereof to provide for the required crosslinking character and viscosity for a given situation.

For example, it will appreciate a polysiloxane chain can be crosslinked provided it contains at least one activated ethylenically unsaturated group. In that case, such a polysiloxane could react with a separate compound/polymer (e.g. reactive diluent described herein) comprising multiple activated ethylenically unsaturated groups to form a crosslinked network. Alternatively, if the polysiloxane comprises two or more activated ethylenically unsaturated groups then it can be crosslinked merely by reacting with itself.

In one embodiment, the polysiloxane according to the invention comprises two or more activated ethylenically unsaturated groups.

Where the crosslinkable functional group(s) of the polysiloxane include only non-activated ethylenically unsaturated groups, to promote crosslinking those skilled in the art will appreciate the polysiloxane will need to comprise two or more of such non-activated ethylenically unsaturated groups.

The crosslinkable functional group(s) of the polysiloxane can include a silyl hydride group (SiH). The silyl hydride group will of course be of a type suitable to undergo a reaction to promote crosslinking of the polysiloxane. Such silyl hydride groups may therefore be described as being crosslinkable silyl hydride groups.

Where the crosslinkable functional group(s) of the polysiloxane include only silyl hydride groups, to promote crosslinking those skilled in the art will appreciate the polysiloxane according to the invention will need to comprise two or more silyl hydride groups.

The silyl hydride groups will typically be of a type suitable to undergo a reaction with an ethylenically unsaturated group, for example a non-activated ethylenically unsaturated group, to promote crosslinking of the polysiloxane.

The crosslinkable functional group(s) of the polysiloxane can include an alkylene thiol group. The alkylene thiol group will of course be of a type suitable to undergo a reaction to promote crosslinking of the polysiloxane. Such alkylene thiol groups may therefore be described as being crosslinkable alkylene thiol groups.

Where the crosslinkable functional group(s) of the polysiloxane include only alkylene thiol groups, to promote crosslinking those skilled in the art will appreciate the polysiloxane according to the invention will need to comprise two or more alkylene thiol groups.

The alkylene thiol groups will typically be of a type suitable to undergo a reaction with an ethylenically unsaturated group, for example a non-activated ethylenically unsaturated group, to promote crosslinking of the polysiloxane.

The polysiloxane in accordance with the invention may of course comprise various combinations of the specified functional groups to enable crosslinking to occur. Such combinations would be known to those skilled in the art and include, for example, a silyl hydride group in combination with an alkylenethiol group, a silyl hydride group in combination with a non-activated ethylenically unsaturated group, an alkylenethiol group in combination with a non-activated ethylenically unsaturated group, or an activated ethylenically unsaturated group in combination with an alkylenethiol group or a silyl hydride group.

Further detail in relation to reaction of the crosslinkable functional groups is provided below.

In one embodiment, the siloxane-thiourea segment comprises a structure of formula (I):

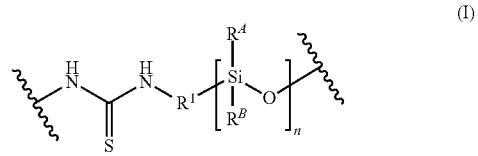

wherein:
each $R^A$ and $R^B$ are each independently selected from H, optionally substituted alkyl, optionally substituted aryl, optionally substituted siloxane, optionally substituted alkylene thiol, and a moiety comprising one or more ethylenically unsaturated groups;
$R^1$ is optionally substituted alkylene or optionally substituted arylene; and
n is an integer of at least 1.

In formulae herein described, unless otherwise indicated the symbol ↯ is intended to represent point of covalent attachment of the siloxane-thiourea segment to the remainder of the polysiloxane molecular structure (not shown).

In one embodiment, at least one of $R^A$ and $R^B$ in formula (I) is selected from H, optionally substituted alkylene thiol, and a moiety comprising one or more ethylenically unsaturated groups.

When $R^A$ and/or $R^B$ are independently selected from H, a moiety comprising an alkylenethiol group, and a moiety comprising one or more ethylenically unsaturated groups, it will be appreciated they may represent one or more of the crosslinkable functional groups of the polysilioxane.

In another embodiment, n in formula (I) is an integer ranging from 1 to about 200, or from 1 to about 180, or from 1 to about 160, or from 1 to about 140, or from 1 to about 120, or from 1 to about 100, or from 1 to about 80, or from 1 to about 60.

In further embodiment, n in formula (I) is an integer ranging from 2 to about 200, or from 2 to about 180, or from 2 to about 160, or from 2 to about 140, or from 2 to about 120, or from 2 to about 100, or from 2 to about 80, or from 2 to about 60.

$R^A$ and $R^B$ in the same or different repeat units defined by n in formula (I) may be independently the same or different.

In a further embodiment, le in formula (I) is optionally substituted $C_2$-$C_{12}$ alkylene or optionally substituted $C_6$-$C_{12}$ arylene.

In one embodiment, the siloxane-thiourea segment of the polysiloxane comprises a structure of formula (III):

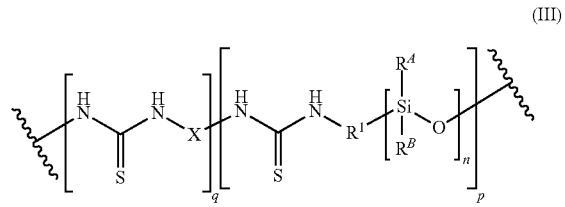

wherein:
each $R^A$ and $R^B$ are independently selected from H, optionally substituted alkyl, optionally substituted aryl, optionally substituted siloxane, optionally substituted alkylenethiol, and a moiety comprising one or more ethylenically unsaturated groups;
each X is independently selected from optionally substituted alkylene, optionally substituted arylene, (poly)siloxane, polyether, polyimide and polyester;
each $R^1$ is independently optionally substituted alkylene or optionally substituted arylene;
n is an integer of at least 1;
p is an integer of at least 1; and
q is an integer of at least 1.

$R^A$, $R^B$, $R^1$ and n in formula (III) may be independently the same as herein described in respect of formula (I).

In one embodiment, at least one of $R^A$ and $R^B$ in formula (III) is selected from H, optionally substituted alkylene thiol, and a moiety comprising one or more ethylenically unsaturated groups.

When $R^A$ and/or $R^B$ are independently selected from H, a moiety comprising an alkylenethiol group, and a moiety comprising one or more ethylenically unsaturated groups, it will be appreciated they may represent one or more of the crosslinkable functional groups of the polysiloxane.

In a further embodiment X in formula (III) may be selected from optionally substituted $C_1$-$C_{12}$ alkylene, optionally substituted $C_6$-$C_{12}$ arylene, polysiloxane, polyether, and polyester.

In a further embodiment, p and q in formula (III) may range from 1 to about 50, or from 1 to about 20.

$R^A$ and $R^B$ in the same or different repeat units defined by n in formula (III) may be independently the same or different.

$R^1$ in repeat units defined by p in formula (III) may be the same or different.

Polysiloxanes suitable for use in accordance with the invention may include, but are not limited to, those having a structure of formula (IV):

n is an integer of at least 1;
m is an integer of at least 1; and
p is an integer of at least 1.

In formula (IV) $R^1$, $R^A$, $R^B$ and n may be as herein described in respect of formula (I).

In one embodiment, at least one of $R^A$ and $R^B$ in formula (IV) is selected from H, optionally substituted alkylene thiol, and a moiety comprising one or more ethylenically unsaturated groups.

When $R^A$ and/or $R^B$ are independently selected from H, a moiety comprising an alkylenethiol group, and a moiety comprising one or more ethylenically unsaturated groups, it will be appreciated they may represent one or more of the crosslinkable functional groups of the polysiloxane.

In formula (IV), $R^E$, $R^F$, $R^G$ and $R^H$, $R^C$ and $R^D$ may each independently be defined as herein described in respect of $R^A$ or $R^B$.

Each $R^2$, $R^3$, $R^4$, $R^5$ and $R^6$ may be defined as herein described for In formula (IV), Y may be selected from —NH—C(O)—NH— or —NH—C(S)—NH—

$Z^1$ and $Z^2$ in formula (IV) are each independently selected from a moiety comprising one or more silyl hydride groups, a moiety comprising one or more alkylenethiol groups, and a moiety comprising one or more ethylenically unsaturated groups. As described herein, such groups are intended to represent functionality capable of promoting crosslinking of the polysiloxane. Features of $Z^1$ and $Z^2$ may therefore be defined as herein described for $R^A$ or $R^B$ in the context of the same crosslinkable functionality.

In formula (IV), n may be defined as herein described in the context of formula (I).

In formula (IV), p may be an integer ranging from 1 to about 200, or from 1 to about 180, or from 1 to about 160, or from 1 to about 140, or from 1 to about 120, or from 1 to about 100, or from 1 to about 80, or from 1 to about 60.

In formula (IV), m may be an integer ranging from 1 to about 50, or from 1 to about 40, or from 1 to about 30, or from 1 to about 20.

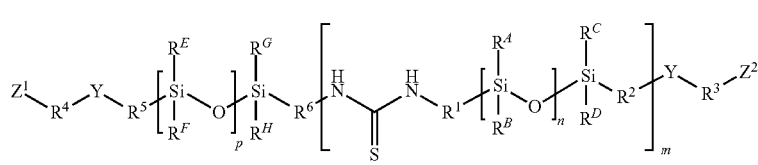

(IV)

wherein:
each $R^A$, $R^B$, $R^C$, $R^D$, $R^E$ and $R^F$, and $R^G$ and $R^H$ are independently selected from H, optionally substituted alkyl, optionally substituted aryl, optionally substituted siloxane, optionally substituted alkylenethiol, and a moiety comprising one or more ethylenically unsaturated groups;
each $R^1$ and $R^2$ are independently optionally substituted alkylene or optionally substituted arylene;
$R^3$, $R^4$, $R^5$ and $R^6$ are each independently optionally substituted alkylene or optionally substituted arylene;
Y represents a divalent linking group;
$Z^1$ and $Z^2$ are each independently selected from a moiety comprising one or more silyl hydride groups, a moiety comprising one or more alkylenethiol groups, and a moiety comprising one or more ethylenically unsaturated groups;

$R^A$ and $R^B$ in the same or different repeat units defined by n in formula (IV) may be independently the same or different.

$R^C$, $R^D$, $R^1$ and $R^2$ in the same or different repeat units defined by m in formula (IV) may be independently the same or different.

$R^E$ and $R^F$ in the same or different repeat units defined by p in formula (IV) may be independently the same or different.

There is no particular limitation on the molecular weight of a polysiloxane according to the invention. The molecular weight of the polysiloxane will typically be dictated by its intended application. For example, viscosity parameters for adhesive, sealant and 3D printing applications may different to those resin compositions that are made for extrusion printing used in the production of artificial spinal disks or meniscus. Generally, the molecular weight of the polysiloxane will range from about 30,000 to about 200,000 g/mol, or about 30,000 to about 150,000 g/mol, or about 30,000 to about 120,000 g/mol, or about 30,000 to about 100,000 g/mol.

process. As will be discussed below, viscosity modifiers may also be employed to adjust the viscosity of the composition being printed.

Further examples of a polysiloxane in accordance with the invention include, but are not limited to, those of formulae (V)-(X):

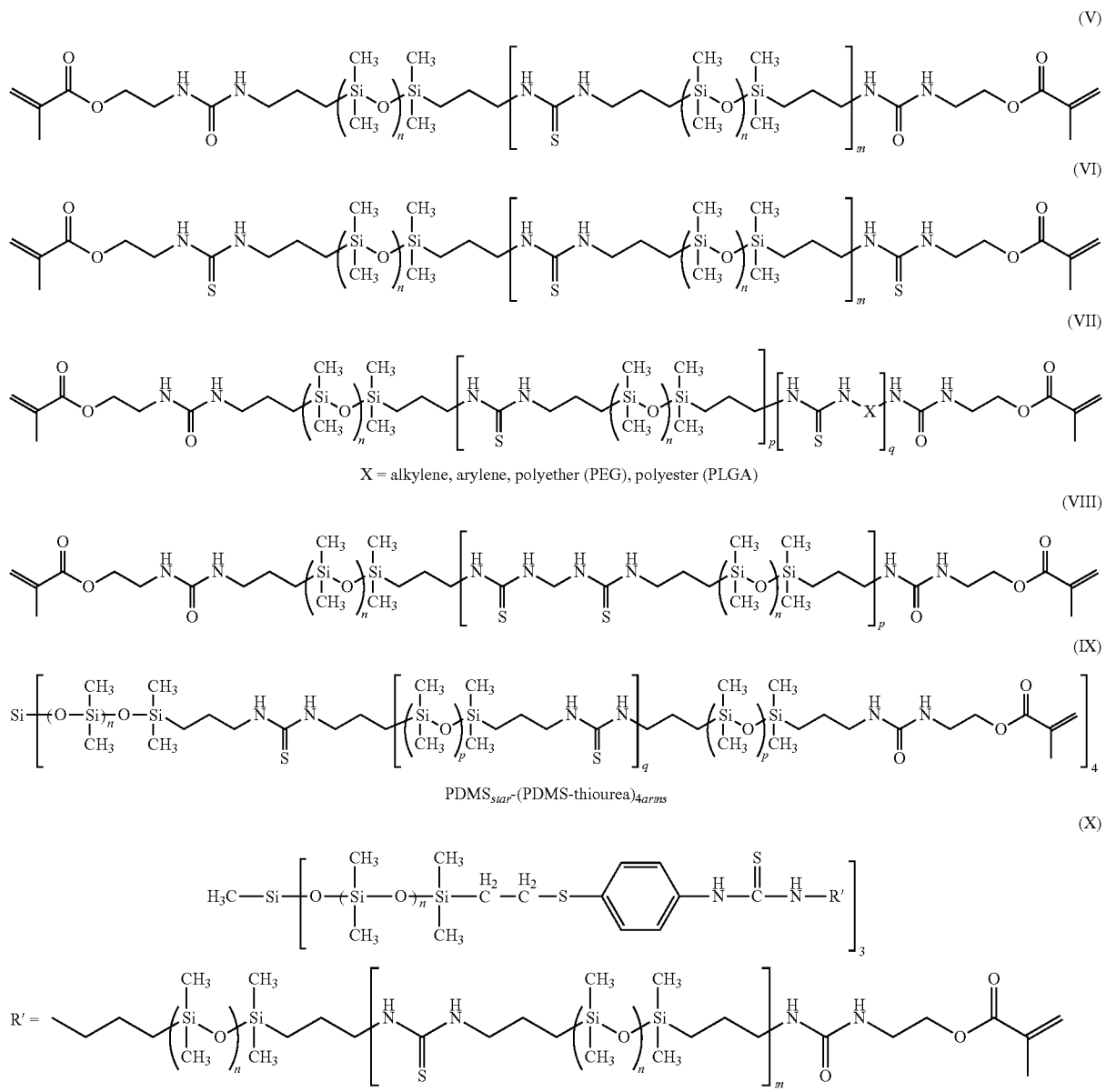

Reference herein to molecular weight of the polysiloxane is that determined by size exclusion chromatography (SEC) as described herein.

A person skilled in the art would appreciate that different 3D printing processes require different formulation (resin) properties. Typically ink jet printing requires a very low viscosity, digital light processing (DLP) can tolerate a higher viscosity whilst extrusion printing can tolerate a much higher viscosity still. Furthermore, the viscosity of the formulation is also dependent on the temperature and elevated temperatures (e.g. greater than room temperature) may be used to lower the viscosity during the 3D printing wherein each X in formulate (VII) is independently selected from optionally substituted alkylene, optionally substituted arylene, polyether (e.g. polyethylene glycol—PEG) and polyester (poly(lactic-co-glycolic acid-PLGA); and n, m, p and q are each independently an integer of at least 1.

In formulae (V)-(X), n may be an integer of 1 to about 1000, or about 30 to about 360; m may be an integer of 1 to about 100, or 1 to about 30, or about 5 to about 30; p may be an integer of 1 to about 100, or 1 to about 30, or about 5 to about 30; and q may be an integer of 1 to about 100, or 1 to about 30, or about 5 to about 30.

In formula (I) and formulae (III)-(X), a thiourea moiety presents in-chain relative to the siloxane of the siloxane-thiourea segment. A thiourea moiety of the siloxane-thiourea segment may also present pendant to the siloxane moiety of the siloxane-thiourea segment. For example, the siloxane-thiourea segment of the polysiloxane may comprise a structure of formula (II) as herein described.

Examples of polysiloxanes that may be used in accordance with the invention also include those of formulae (XI) and (XII):

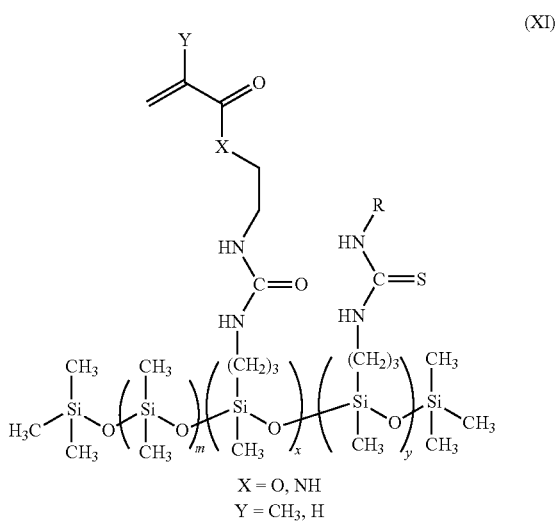

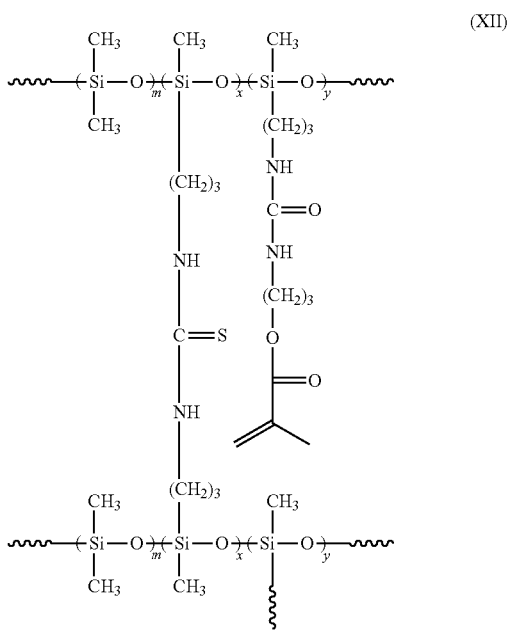

wherein in formula (XI) each R is independently optionally substituted alkyl, optionally substituted siloxane, optionally substituted alkylenethiol, a moiety comprising one or more ethylenically unsaturated groups or other group as herein defined for $R^y$ in Formula (II), and wherein in formula (XI) and (XII) each m, x and y is independently an integer ranging from 1 to about 30, or about 5 to about 20.

Where a polysiloxane in accordance with the invention includes two or more reactive functional groups, including crosslinkable functional groups, it will be appreciated those functional groups will be selected to not be spontaneously reactive with each other. Such spontaneous reactivity would of course render the polysiloxane impractical for use.

The polysiloxane according to the invention may be linear or branched. Branched polymer structures include, but are not limited to, comb polymers, star polymers and hyperbranched polymers.

The polysiloxane according to the invention may be a homopolymer or a copolymer.

In one embodiment, the polysiloxane according to the invention is a copolymer.

Polysiloxanes suitable for use in accordance with the present invention can advantageously be prepared using synthetic techniques known to those skilled in the art.

A typical synthetic procedure for preparing such polysiloxanes might, for example, include reacting a bis-amino terminated polysiloxane (amino-siloxane precursor) with 1,1'-thiocarbonyl diimidazole to form an intermediate polysiloxane comprising a siloxane-thiourea segment. That intermediate polysiloxane may then be reacted with a compound for introducing to the polysiloxane the required crosslinkable functional groups. For example, that intermediate polysiloxane may be reacted with a compound comprising one or more ethylenically unsaturated groups. Such a compound comprising one or more ethylenically unsaturated groups might, for example, include an amino or isocyanate terminated (meth)acrylate compound.

Examples of general suitable synthetic pathways for producing polysiloxanes according to the present invention include, but are not limited to, reaction schemes 1-9:

Scheme 1
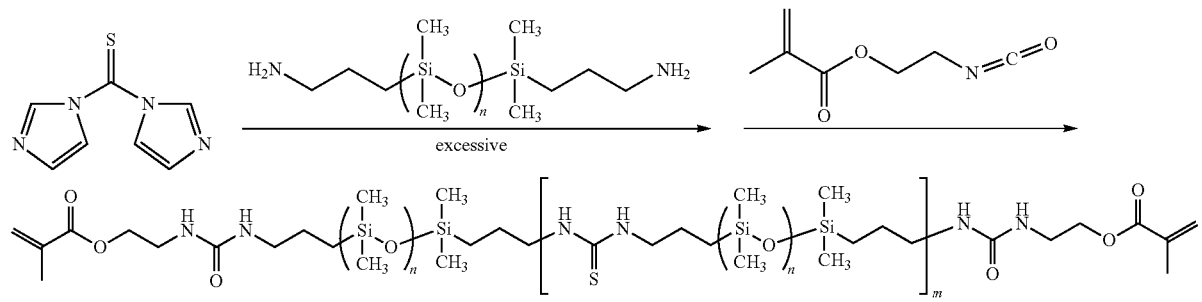
Scheme 2
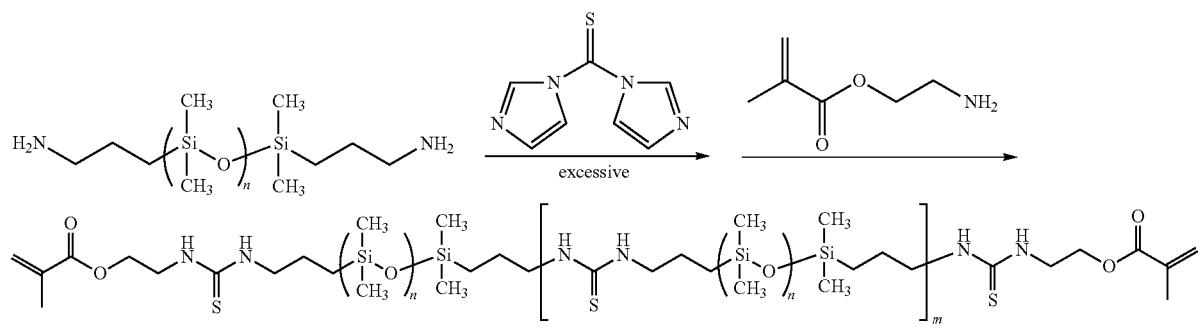
Scheme 3
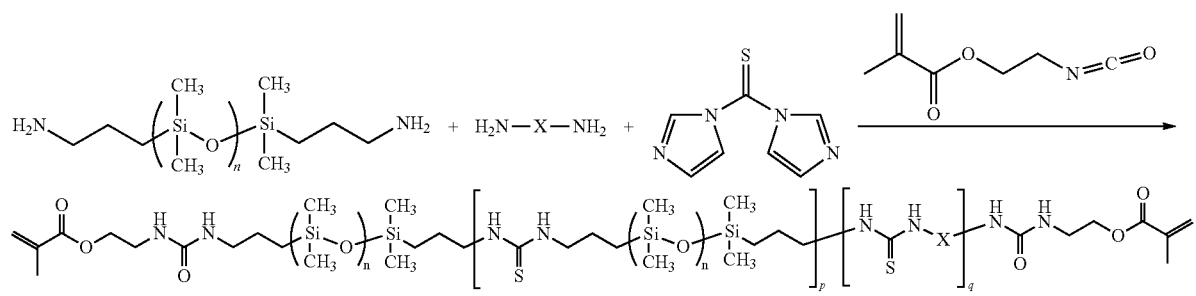
X = alkylene, arylene, polyether (PEG), polyester (PLGA)
Scheme 4
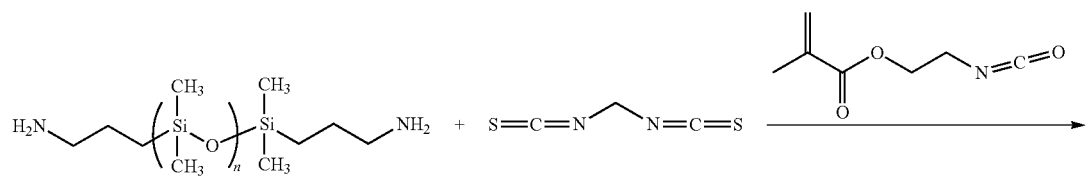

-continued
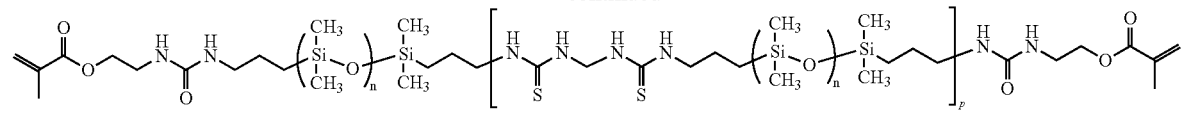
Scheme 5
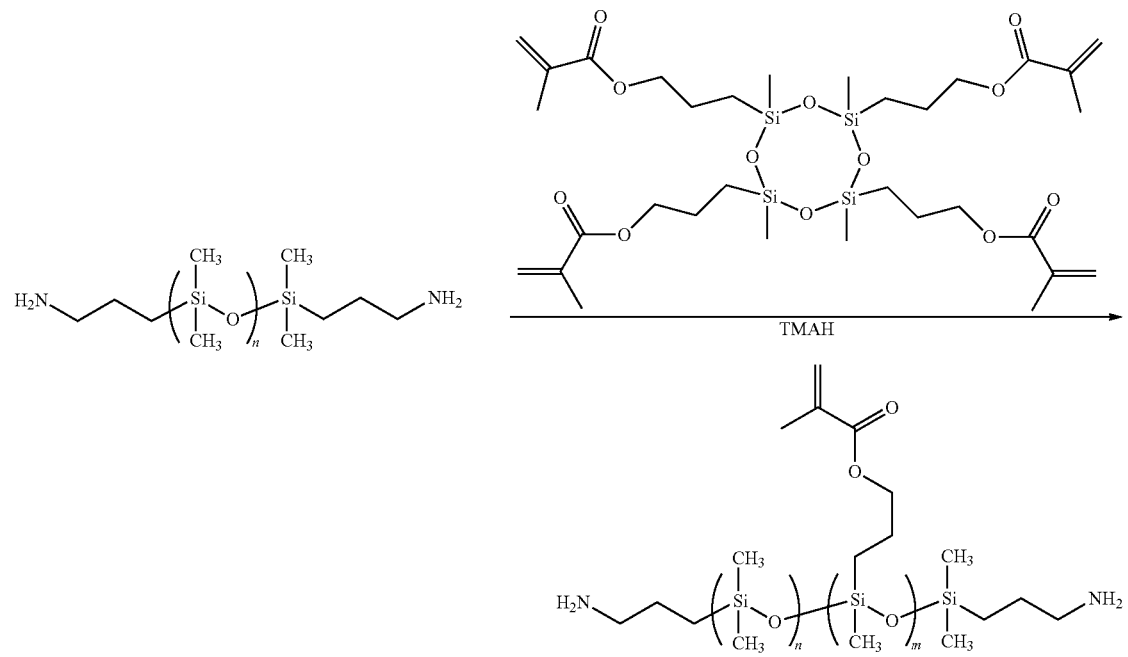
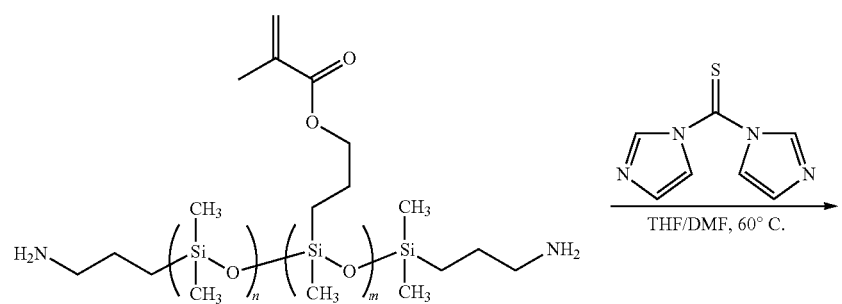
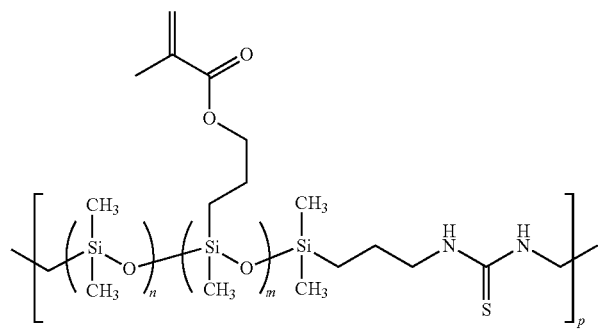

Scheme 6
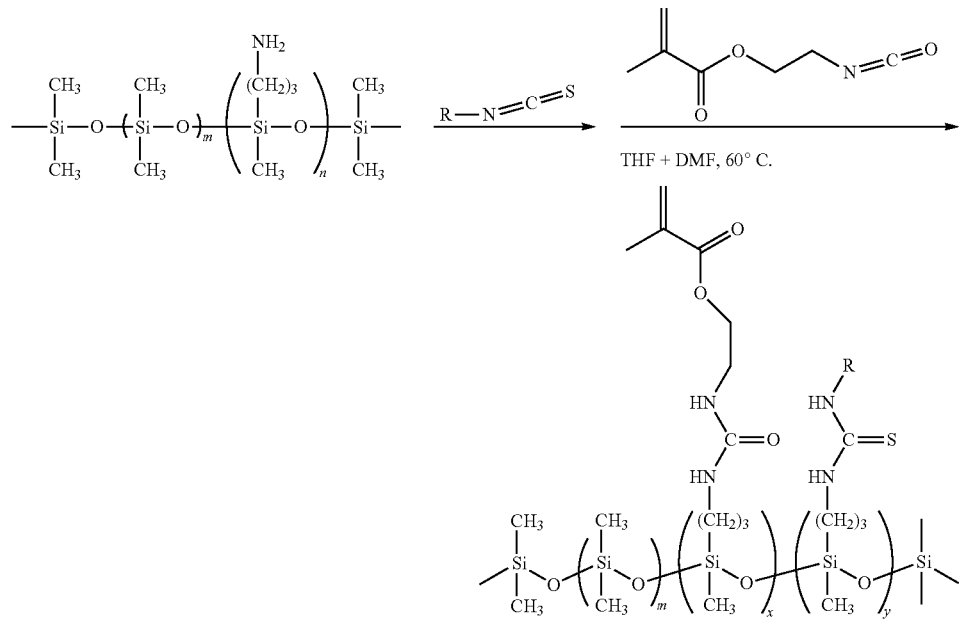
R = alkyl, aryl, polyether, polyester
Scheme 7
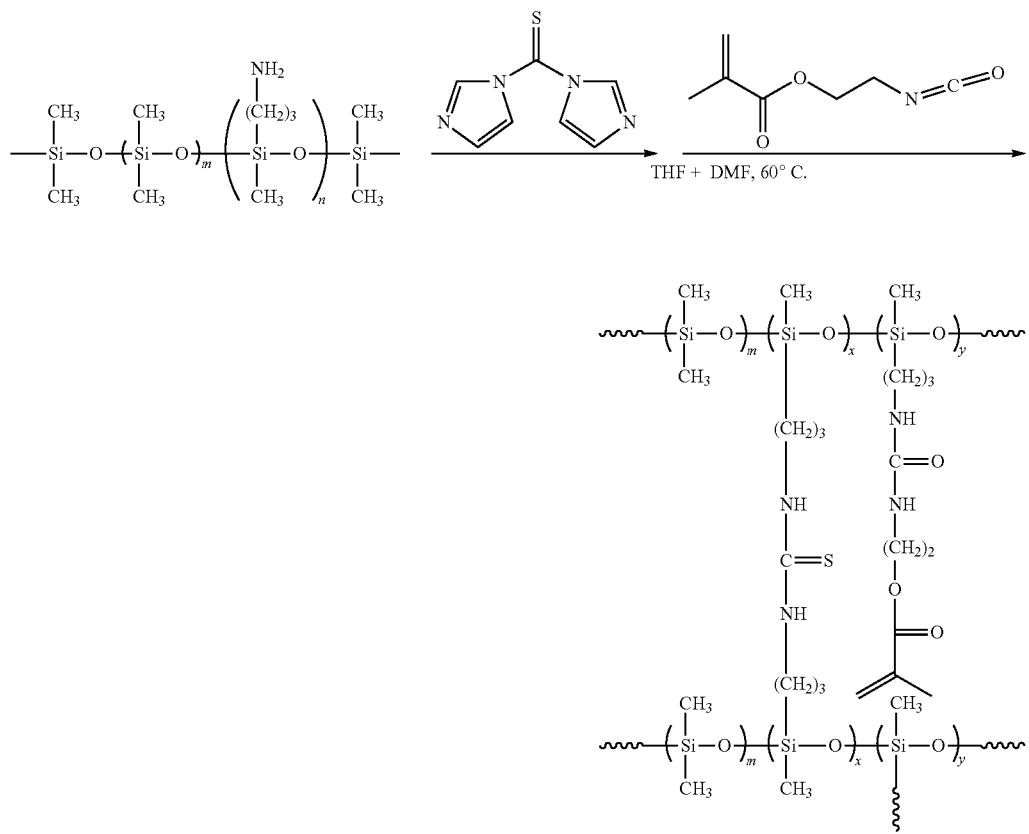

Scheme 8
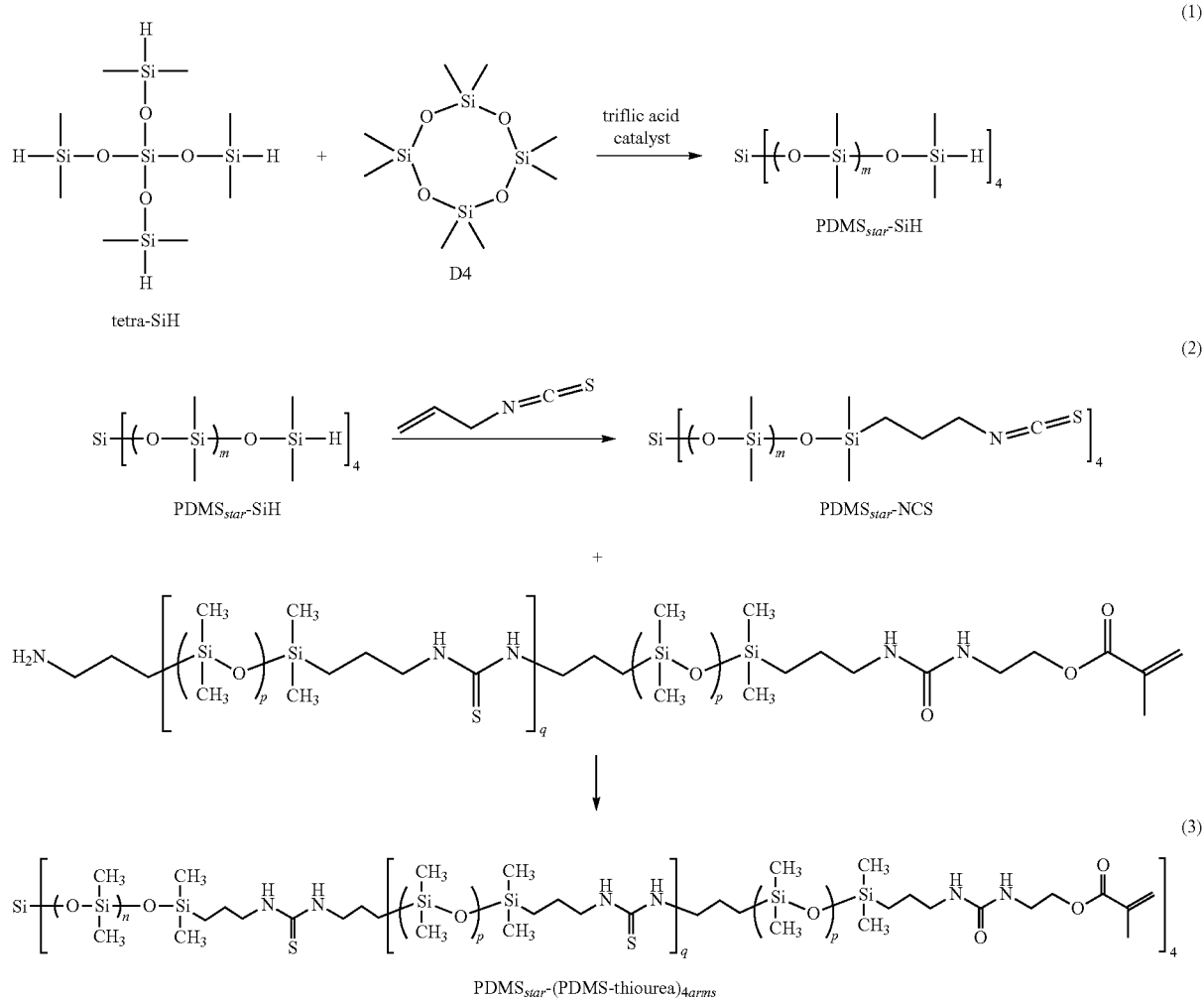
Scheme 9
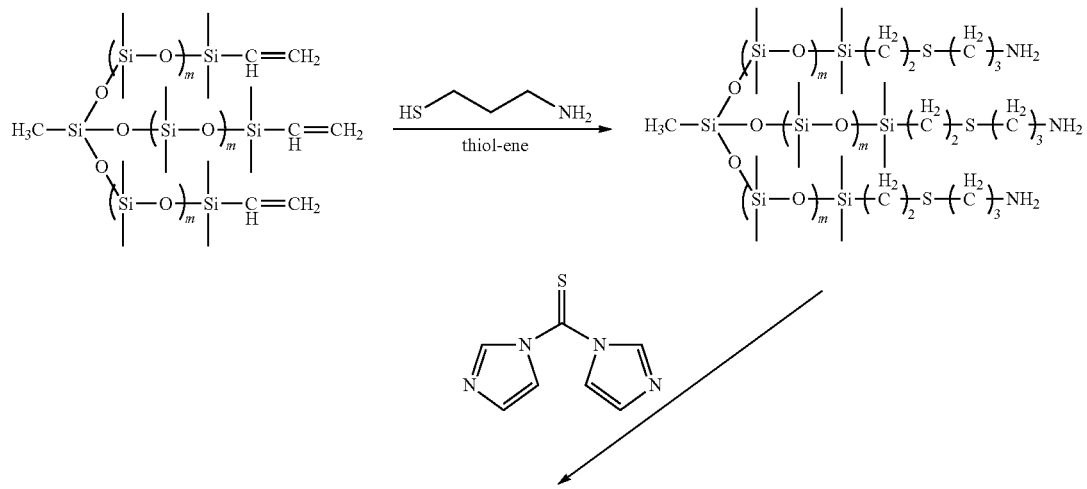

-continued

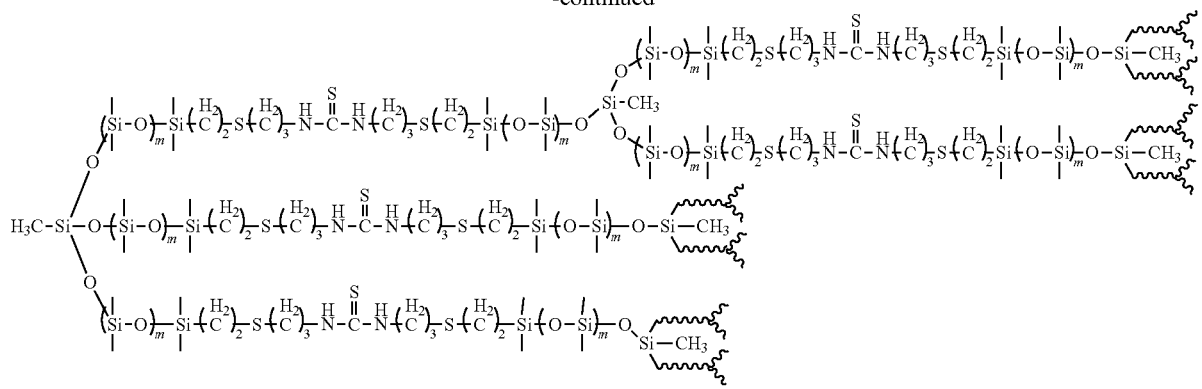

wherein n, m, p, x and y are as herein described.

The molar ratio between the siloxane and thiourea segments in the polysiloxane can, for example, be adjusted by varying the molecular weight of the amino-siloxane precursor and its mixing ratio with thiocarbonyl bis(imidazole). Different molecular weight of the amino-siloxane precursor can be mixed to vary the distribution of the thiourea segment within the polysiloxane chain.

The polysiloxane in accordance with the invention is particularly well suited for use in adhesive, sealant and 3D printing applications. For such applications the polysiloxane may be provided in the form of a resin composition.

The present invention therefore provides a liquid resin composition comprising a polysiloxane according to the invention and an agent for promoting crosslinking of the crosslinkable functional group(s).

By being a "liquid" resin composition is meant that at room temperature (25° C.) the resin composition can flow under the application of a force such as gravity or an applied pressure. The resin composition will therefore have a definite volume but may not have a fixed shape.

The polysiloxane in accordance with the invention may not undergo crosslinking in the absence of an agent for promoting that crosslinking. Furthermore, combining the polysiloxane with such an agent will generally not in itself give rise to spontaneous crosslinking of the polysiloxane. Activity of the agent to promote crosslinking will generally need to be invoked through, for example, application to the resin composition of an energy source such as heat and/or electromagnetic radiation.

A resin composition in accordance with the invention will therefore generally be stable and not undergo crosslinking until being exposed to a suitable energy source. In that way, the resin composition can advantageously be manufactured and stored until it is ready for use in, for example adhesive, sealant and 3D printing applications.

In 3D printing applications, the resin composition may be printed in layers to form a 3D article where during the printing process the printed resin composition is exposed to a suitable energy source which causes crosslinking of the polysiloxane contained therein. The resin composition may be prepared so as to contain one or more polysiloxanes having two or more different crosslinkable functional groups which undergo crosslinking by different means. In that way, the 3D printed article produced from the resin composition can undergo staged crosslinking to promote structural integrity of the final 3D article.

Those skilled in the art will appreciate the type of agent for promoting crosslinking of the crosslinkable functional groups of the polysiloxane contained in the resin composition will be determined by the nature of those crosslinkable functional groups.

Generally, the agent for promoting crosslinking of the crosslinkable functional groups will be selected from a catalyst and/or a radical initiator.

Those skilled in the art will be able to determine the amount of agent to use for promoting crosslinking of the crosslinkable functional groups. In one embodiment, the agent is present in the resin composition in an amount ranging from about 0.1 wt % to about 5 wt. %.

Radical initiators are known in the art for promoting reaction of (i) activated ethylenically unsaturated functional groups with the same or different type of activated ethylenically unsaturated groups, or (ii) non-activated ethylenically unsaturated groups with thiol functional groups.

For example, a radical initiator can function to promote reaction between activated ethylenically unsaturated groups such as (meth)acryloyl, (meth)acryloyloxy, styrenyl, and (meth)acrylamide groups.

Radical initiators are a type of compound or system used for generating a source of radicals which then proceed to promote the desired crosslinking reaction. Radicals are typically generated through thermal induced homolytic scission of a suitable radical initiator compound (for example thermal radical initiators such as peroxides, peroxy esters or azo compounds), through redox initiating systems, photo-initiating systems or high energy radiation such as electron beam, X- or gamma-radiation. The radical initiator or radical initiation system is chosen to provide radicals at conditions under which the desired crosslinking reaction is intended to take place.

Examples of radical initiators include thermal radical initiators such as one or more of the following compounds: 2,2'-azobis(isobutyronitrile), 2,2'-azobis(2-cyanobutane), dimethyl 2,2'-azobis(isobutyrate), 4,4'-azobis(4-cyanovaleric acid), 1, 1'-azobis(cyclohexanecarbonitrile), 2-(t-butylazo)-2-cyanopropane, 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N,N'-dimethyleneisobutyramidine) dihydrochloride, 2,2'-azobis(2-amidinopropane) dihydrochloride, 2,2'-azobis(N, N'-dimethyleneisobutyramidine), 2,2'-azobis{2-methyl-N-[1,1-bis(hydroxymethyl)-2-hydroxyethyl]propionamide}, 2,2'-azobis{2-methyl-N-[1,1-bis(hydroxymethyl)-2-ethyl] propionamide}, 2,2'-azobis[2-methyl-N-(2-hydroxyethyl) propionamide], 2,2'-azobis(isobutyramide) dihydrate, 2,2'-azobis(2,2,4-trimethylpentane), 2,2'-azobis(2-methylpropane), t-butyl peroxyacetate, t-butyl peroxybenzoate, t-butyl peroxyneodecanoate, t-butylperoxy isobutyrate, t-amyl peroxypivalate, t-butyl peroxypivalate, diisopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, dicumyl hyponitrite. This list is not exhaustive.

Suitable radical initiators also include photo-radical initiators such as benzoin derivatives, benzophenone, acyl phosphine oxides, phosphinate derivatives and photo-redox systems. Specific examples of such photo-radical initiators include photo radical initiators such as one or more of the following compounds: ethyl (2,4,6-trimethylbenzoyl) phenylphosphinate, bis-(2,4,6-trimethylbenzoyl) phenyl phosphine oxide), 2,4,6-trimethylbenzoyl-diphenylphosphine oxide, 2-hydroxy-2-methyl-1-phenyl-1-propanone, 2-hydroxy-1-[4-(2-hydroxyethoxy)phenyl]-2-methyl-1-propanone, [1-(4-[phenylsulfanylbenzoyl)heptylideneamino] benzoate, [149-ethyl-6-(2-methylbenzoyl)carbazol-3-yl] ethylideneamino]acetate, and 2-benzyl-2-dimethylamino-1-(4-morpholinophenyl)-butanone-1.

Other suitable radical initiators include redox initiator systems such as combinations of the following oxidants and reductants:
oxidants: potassium, peroxydisulfate, hydrogen peroxide, t-butyl hydroperoxide.
reductants: iron (II), titanium (III), potassium thiosulfite, potassium bisulfite.

Other suitable radical initiators are described in known texts. See, for example, Moad and Solomon "the Chemistry of Free Radical Polymerisation", Pergamon, London, 1995, pp 53-95.

The agent for promoting crosslinking of the crosslinkable functional groups may also be a catalyst. Those skilled in the art will appreciate that type of agent may be required where crosslinking is through reaction between a silane functional group and a non-activated vinyl functional group, known as a hydrosilylation reaction. Numerous catalyst systems are available for facilitating such hydrosilylation reactions. Suitable catalysts include, but are not limited to, platinum ruthenium, and rhodium catalysts, such as Speier's or Karstedt's catalysts.

More specific examples of suitable catalysts include, but are not limited to, chloroplatinic acid hydrate, platinum(0)-1,3-divinyl-1,1,3,3-tetramethyldisiloxane complex, platinum (II) acetylacetonate, tetrakis(1-phenyl-3-hexyl-triazenido) platinum, pentamethylcyclopentadienyltris (acetonitrile)-ruthenium(II) hexafluorophosphate, dichloro (p-cymene)ruthenium(II) dimer, pentamethylcyclopentadienyltris(acetonitrile)-ruthenium(II), hexafluorophosphate-benzylidenebis(tricyclohexylphosphine)dichloro-ruthenium (II), tris(triphenylphosphine)rhodium(I) chloride, (bicyclo [2.2.1]hepta-2,5-diene)rhodium(I) chloride dimer, and bis(1, 5-cyclooctadiene)rhodium(I) tetrafluoroborate hydrate.

While an agent for promoting crosslinking of the crosslinkable function groups is provided in the resin composition according to the invention, crosslinking of the crosslinkable functional groups will generally not take place until that composition is exposed to a suitable energy source such as heat and/or a particular wavelength of the electromagnetic spectrum. For example, where a catalyst or a thermal radical initiator is used the resin composition will need to be heated to a required temperature in order for the crosslinking reaction to proceed. Alternatively, where a photo-radical initiator is used the resin composition will need to be exposed to a suitable wavelength of the electromagnetic spectrum, for example in the ultraviolet region, for the crosslinking reaction to proceed.

Temperatures at which thermal induced crosslinking may occur will depend on the thermal radical initiator used. Generally, thermal induced crosslinking will occur at temperatures ranging from about 15° C. to about 300° C., or form about 20° C. to about 180° C., or from about 30° C. to about 180° C., or from about 40° C. to about 180° C., or from about 50° C. to about 180° C.

Wavelength(s) of the electromagnetic spectrum used to photo-induce crosslinking will depend on a number of factors, but primarily the type of photo-radical initiator used. Generally, photo-induced crosslinking will occur at wavelengths ranging from about 200 nm to about 600 nm, or from about 300 nm to about 550 nm.

The resin composition according to the present invention may comprise one or more different polysiloxanes according to the invention that can undergo crosslinking. Such different polysiloxanes may undergo crosslinking with the aid of the same or different agent. For example, the resin composition may comprise polysiloxane(s) having two different types of crosslinkable functional groups, one type that requires the presence of a catalyst to undergo crosslinking and the other type that requires the presence of a radical initiator to undergo crosslinking. In that case, the catalyst and radical initiator system will generally be selected so as to promote crosslinking upon exposing the resin composition to different energy inputs. For example, the catalyst and radical initiator system may require a different temperature to promote crosslinking, or the radical initiator could be a photo-radical initiator (thereby requiring exposure a specific wavelength(s) of the electromagnetic spectrum).

Providing the resin composition with crosslinkable functional groups that undergo crosslinking using different agents enables the composition to be crosslinked in a multistage process. Such multistage crosslinking might be desirable, for example, to enhance crosslinking between layers of the resin composition formed during a 3D printing process.

To enable crosslinking to occur, the resin composition must of course contain a required complement of crosslinkable functional groups. That required complement may be provided by a single polysiloxane according to the invention. The resin composition may comprise two or more of such polysiloxanes which provide for the required complement of crosslinkable functional groups. Alternatively, the resin composition may comprise a polysiloxane according to the invention and one or more other reagents that provides for the required complement of reactive functional groups to enable crosslinking to occur.

For example, the resin composition may comprise one or more reagents such as reactive diluent that comprises a crosslinkable functional group(s) selected from one or more ethylenically unsaturated groups, silyl hydride groups, alkylenethiol groups and combinations thereof. That reagent may itself be polysiloxane. Where a reagent other than a polysiloxane according to the invention is present in the resin composition and that reagent is a polysiloxane, it will be appreciated the intention is for such a "reagent" polysiloxane to not comprise a siloxane-thiourea segment.

The present invention contemplates resin compositions comprising a number of permutations of a polysiloxane(s) according to the invention and optionally one or more other reagents comprising crosslinkable functional groups selected from one or more ethylenically unsaturated groups, silyl hydride groups, alkylenethiol groups and combinations thereof as described herein.

For example, in embodiment the resin composition comprises (i) a polysiloxane comprising (a) a siloxane-thiourea segment, and (b) one or more ethylenically unsaturated groups, and (ii) a reactive diluent comprising one or more ethylenically unsaturated groups.

In a further embodiment, the resin composition comprises (i) a polysiloxane comprising (a) a siloxane-thiourea segment, and (b) one or more ethylenically unsaturated groups, and (ii) a reactive diluent comprising two or more silyl hydride groups.

In a further embodiment, the resin composition comprises (i) a polysiloxane comprising (a) a siloxane-thiourea segment, and (b) two or more silyl hydride groups, and (ii) a reactive diluent comprising one or more ethylenically unsaturated groups.

In another embodiment, the resin composition comprises (i) a polysiloxane comprising (a) a siloxane-thiourea segment, and (b) two or more alkylenethiol groups, and (ii) a reactive diluent comprising one or more ethylenically unsaturated groups.

In another embodiment, the resin composition comprises (i) a polysiloxane comprising (a) a siloxane-thiourea segment, and (b) one or more ethylenically unsaturated groups, and (ii) a reactive diluent comprising two or more alkylenethiol groups.

Reference herein to "one or more" crosslinkable functional groups is intended to embrace "two or more" of such crosslinking functional groups.

A "reactive diluent" used in accordance with the invention is intended to mean a compound or polymer that contains one or more functional group that can react to form at least one covalent bond with the crosslinked polysiloxane formed according to the invention. Typically, such a reactive diluent will react with the one or more crosslinkable groups of the polysiloxane during the crosslinking reaction so as to become covalently bound to the so formed crosslinked polysiloxane.

Use of a reactive diluent may assist with formulation of the resin composition or its use in a given application. For example, a reactive diluent may be used to adjust the viscosity of the resin composition for use in adhesive, sealant and printing applications.

Examples of suitable reactive diluents include, but are not limited to, 3-[tris(trimethylsiloxy)silyl]propyl methacrylate, mono- or bis-functional urethane acrylate, e.g. sold commercially as Genomer 1122™ or CN991, dimethyl acrylamide, hydroxyethyl methacrylate, ethylene glycol dimethacrylate, pentaerythritol tetramethacrylate, trimethylolpropane trimethacrylate, pentaerythritol tetrakis (3-mercaptopropionate), trimethylolpropane tris(3-mercaptopropionate), 3-[tris(trimethylsiloxy)silyl] propyl methacrylate, vinyl terminated polydimethylsiloxane, vinyl terminated diphenyl siloxane-dimethylsiloxane copolymer, vinyl terminated polyphenylmethylsiloxane, vinyl terminated trifluoropropylmethylsiloxane-dimethylsiloxane copolymer, vinylmethylsiloxane-dimethylsiloxane copolymers (vinyl or hydride terminated), hydride terminated polydimethylsiloxane, α-monovinyl-ω-monohydride terminated polydimethylsiloxane, methylhydrosiloxane-dimethylsiloxane copolymer, methacryloxypropyl terminated polydimethylsiloxane, (3-acryloxy-2-hydroxypropoxy-propyl) terminated polydimethylsiloxane, (methacryloxypropyl)methylsiloxane-dimethylsiloxane copolymer, monomethacryloxypropyl functional polydimethylsiloxane, (bicycloheptenyl)ethyl terminated polydimethylsiloxane, mercaptopropyl terminated polydimethylsiloxane, (mercaptopropyl)methylsiloxane-dimethylsiloxane copolymer.

The resin composition according to the present invention may further comprise one or more additional components (i.e. additives). The need for including additional components will generally be determined by the intended application for the resin composition.

Additives used in conventional polysiloxane based resins tend to precipitate out of solution over time due to their poor solubility thereby reducing the working time/shelf-life of the resins. Surprisingly, it has been found the polysiloxanes in accordance with the invention exhibit improved solubility of additives which in turn improves their working time/shelf-life and also broadens the range of additives that can be solubilized in the resin. Without wishing to be limited by theory, it is believed the siloxane-thiourea segment of the polysiloxanes plays in important role in the improvement in additive solubilisation.

Additives such as nanoparticles, or conducting polymers such as polyaniline (PANT) may impart useful additional properties to articles produced from the polysiloxane/resin, for example high tear strength and conductivity.

In one embodiment, the liquid resin composition is a homogeneous liquid phase.

Provision of a liquid polysiloxane or resin composition with a homogeneous liquid phase is believed to enhance reaction chemistry during crosslinking affording crosslinked articles with improved properties, such as those described herein.

Examples of other additives that may be included in the polysiloxane or resin include free radical inhibitors and photo-absorbers.

In applications of the resin composition according to the invention where its viscosity may be an important parameter, for example in adhesive, sealant and printing applications, a number of factors may be taken into account to achieve a desired viscosity of the composition.

In one embodiment, the resin composition in accordance with the invention has a viscosity ranging from about 100-10 000 mPa·s.

Viscosity of the resin composition may be adjusted through manipulation of the polysiloxane molecular structure and/or its molecular weight, and also through use of the aforementioned reactive diluents.

Moreover, there are several 3D printing techniques that typically use photocurable resins including inkjet, stereolithography (SLA), digital light processing (DLP), and material extrusion. Each of those different processes work best with a preferred viscosity range (inkjet the lowest, DLP/SLA moderate and material extrusion being the highest). Hence, a formulation that has too high viscosity or too low viscosity for one process may be more suitable for an alternative 3D process. In addition, the temperature of the 3D printing conditions may also be altered to allow a more viscous formulations to be 3D printed for a selected 3D printing technique.

The resin composition may, for example, comprise a radical inhibitor. Use of a radical inhibitor may assist with formulation of the resin composition or its use in a given application. For example, low concentrations of radical inhibitors are required to prevent premature gelation of acrylates on storage.

Examples of inhibitors that may be used in the resin composition according to the invention include, but are not limited to, butylated hydroxy toluene (BHT) and methoxy hydroquinone (MEHQ), which are two of the most common radical inhibitors. The inhibitors and are normally used at concentrations from 50 to 200 ppm.

The resin composition in accordance with the invention may further comprise a photo-absorber. A photo-absorber may be used in the composition when the agent for inhibiting crosslinking of the crosslinkable functional group(s) of the polysiloxane is a photo-radical initiator. The photo-absorber reduces the depth of cure from the light source so that the curing occurs in a more controlled volume, so its purpose is to reduce curing from 'stray' light.

Examples of photo-absorbers include, but are not limited to, isopropyl thioxanthone, 2,5-bis(5-tert-butyl-2-benzoxazolyl) thiophene (Uvitex OB™), 2-ethyl-9,10-dimethoxy anthracene (EDMA), 1,4-bis(2-dimethylstyryl)benzene (BMSB), 2-(4,6-Diphenyl-1,3,5-triazin-2-yl)-5-[(hexyl)oxy]-phenol, 2-Ethylhexyl-2-cyano-3,3-diphenylpropenoate, N,N'-Bis(4-ethoxycarbonylphenyl)-N-benzylformamidine, 2,2'-dihydroxy-4,4'-dimethoxy-benzophenon, 2,2'-p-phenylenebis-4H-3,1-benzoxazin-4-one, N-(Ethoxycarbonylphenyl)-N'-methyl-N'-phenyl formamidine, 2-(2-Hydroxy-4-methoxyphenyl)-4,6-diphenyl-1,3,5-triazine, 2-(2'-Hydroxy-3'-t-butyl-5'-methylphenyl)-5-chlorobenzotriazole, 2-(2'-hydroxy-3',5'-di-t-butylphenyl)-5-chlorobenzotriazole, Phenol 2,2'-methylene(6-(2h-benzotriazol-2-yl)-4-(1,1,3,3tetramethylbutyl)) and 2-(2'-hydroxy-5-methylphenyl)-5-benzotriazole, 1,5-dibenzamidoanthraquinone.

If used in the resin composition, a photo-absorber will generally be present in an amount ranging from about 0.01 wt % to about 2 wt %, or about 0.05 to about 0.1 wt %.

The resin composition according to the present invention may comprise as an additive particulate material, for example nanoparticulate material. That particulate material may be solid particulate material.

As used herein, the expression "nanoparticulate material" is intended to mean particulate material having at least one dimension that is less than 100 nm. In some embodiment, all dimensions of the nanoparticulate material are less than 100 nm.

Examples of suitable particulate material, including nanoparticulate material, include, but a are not limited to, fumed silica, allyl substituted poly(Isobutylsilsesquioxane), T8 cube with single substitution, silver nanoparticles, gold nanoparticles, nickel nanoparticles, nano-cellulose particles, nano-fibres, clays, graphene, graphene oxide, carbon nanotubes.

Where the resin composition comprises solid particulate material, the solid particulate material may be dispersed throughout homogeneous liquid phase of the resin composition.

The present invention also provides a silicone article comprising a crosslinked form of the polysiloxane according to the invention.

Such a silicone article will generally be produced using a resin composition according to the invention. Accordingly, the silicone article may also be described as comprising a crosslinked form of the resin composition according to the invention. Either way, it will be appreciated "a crosslinked form" of the resin composition or the polysiloxane is intended to mean the silicone article comprises polysiloxane according to the invention that has undergone crosslinking to form a thermoset polymer structure. Such articles will therefore comprise the crosslinked reaction residues of the crosslinkable functional groups.

The article according to the present invention can take the form of any desired shape, with that shape typically being dictated by the technique used to form the article. The article may be in the form of simple or complex shapes.

Examples of techniques that may be used to form an article according to the present invention include, but are not limited to, extrusion, moulding (e.g. injection moulding), printing, including 3D printing.

In one embodiment, the article is formed using a printing technique, for example a 3D printing technique.

Examples of 3D printing techniques include, but are not limited to, vat photopolymerization, which includes stereolithography (SLA), digital light processing (DLP); material extrusion; and material Jetting (MJ)/Polyj et, i.e. inkjet.

A silicone article according to the present invention can advantageously exhibit improved properties relative to silicone articles produced using conventional polysiloxanes (i.e. those not containing a siloxane-thiourea segment).

For example, articles produced using the polysiloxane according to the present invention can exhibit excellent adhesion, elastomeric and/or self-healing properties.

By such an article exhibiting "self-healing properties" is intended to mean the article presents an ability to substantially heal otherwise irreversible defects such as microcracks and surface scratches, which can significantly reduce the load-bearing capacity properties of the article and shorten its application lifetime, or alternatively may provide for an undesirable appearance.

As those skilled in the art will appreciate, elastomeric properties may be expressed in terms of flexibility and resilience. Articles according to the present invention can advantageously exhibit excellent flexibility and resilience.

Polymers that exhibit rubber-like elasticity are commonly known as elastomers. Elastomers can be damaged by external factors. Elastomers can change their structure in an undesirable way, for example under the effect of elevated temperature, pressure, mechanical stress, the effect of chemicals like ozone, or external stress. Surface damage, cracks in particular, can thus develop. After the occurrence of the first crack or surface damage the material often is especially susceptible to further damage. For instance, an initially fine crack can become deeper with further stress and can lead to a situation where the material overall can no longer perform its function. For that reason, elastomers often have to be frequently checked and mended or replaced in many applications.

Such damage is particularly problematic when the elastomers are used in, for example, (bio)medical applications. Materials used in medical implants could benefit from self-healing properties. Having self-healing properties might afford an added advantage to elastomers as it minimises the need for checking, mending and/or replacing By "self healing properties" is meant the polymer has an inherent capacity to repair defects including micro-cracks and surface scratches that occur in or on the polymer.

The polysiloxanes according to the present invention exhibits hydrogen bonding between polysiloxane chains via the thiourea segment. Without wishing to be limited by theory, it is believed such hydrogen bonds between polysiloxane chains via the thiourea segment can increase the mechanical strength of the polymer. Increased elongation and tensile strength were demonstrated in Instron measurement of the cured polysiloxane-thiourea based polymer, in comparison to the cured conventional polysiloxane.

In addition, the dynamic hydrogen bonding between thiourea polymer segment enables self-healing of the polymer.

Self-healing properties can be also be introduced through incorporation into the polysiloxane of a moiety that provides for reversible covalent bond formation, such as norcantharimide through cycloaddition between furan and maleimide groups or other Diels-Alder product.

A Diels-Alder reaction is a reversible reaction wherein the Diels-Alder adduct may undergo a so-called retro Diels-Alder reaction (rDA) to reform the diene and dienophile moieties from which they are derived. An example of the reversibility of the Diels-Alder reaction is shown in Scheme 10 below, where heating the Diels-Alder adduct (on the right hand side of the reaction) causes regeneration of the substituted furan (diene) and the substituted maleimide (dienophile) upon cooling (on the left hand side of the reaction).

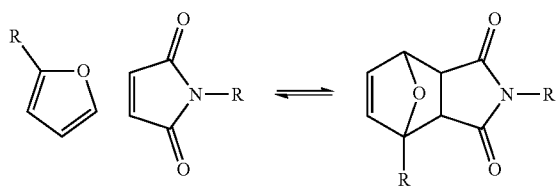

Scheme 10: A Diels-Alder reaction (forward direction) and retro Diels-Alder reaction (backward direction). In accordance with the invention, R in Scheme 10 would represent a coupling point within the polysiloxane structure.

In one embodiment, the polysiloxane comprises a Diels-Alder adduct that can undergo a retro Diels-Alder reaction.

The present invention provides a silicone article comprising a crosslinked form of the polysiloxane according to the invention. In one embodiment, that polysiloxane comprises a Diels-Alder adduct that can undergo a retro Diels-Alder reaction.

As for the reversible covalent bond, in one embodiment, the polysiloxane contains also reversible covalent bonds between furan and bismaleimide through Diels-Alder cycloaddition. The self-healing property is attribute to the dual effects of hydrogen bonding from thiourea and dynamic covalent bond from Diels-Alder reaction.

Resin compositions in accordance with the present invention are particularly well suited for use in printing applications, for example 3D printing applications. One embodiment of the invention uses the DLP printing technique, i.e. Kudo 3D Titan 1 printer or Asiga freeform 3D printer. In a typical DLP printing procedure, once the 3D design file (typical STL format) is programed to the printer, a vat of liquid polymer is exposed to light from a DLP projector under safelight conditions. The DLP projector displays the image of the 3D model onto the liquid polymer layer. The exposed liquid polymer layer hardens onto a build platform, which moves up and down for iterative curing process of next polymer layers. The process is repeated until the 3D model is fully printed. DLP 3D printing is generally faster than SLA, inkjet (drop-on-demand) or extrusion printer. Typically, higher printing resolution (<100 µm) can be achieved. Once the 3D printing process is finished, the printed article can be cleaned (e.g. with isopropanol) to extract any unreacted (macro)monomers, and may then be subjected to further curing, for example by being subjected to UV light.

Polysiloxanes are a class of flexible and elastic materials that have high thermal and chemical stability. As such they are used in a number of high-performance application including medical devices. Currently 3D printable polysiloxane based resins are not commercially available. Most polysiloxanes are liquids and require a chemical reaction to induce crosslinking to form a solid (thermoset).

The inherent high viscosity of polysiloxanes can be challenging for some 3D printing processes, e.g. DLP and inkjet. Therefore, reactive diluent can be added to decrease the viscosity. However, the limited solubility of other reactive component or diluent in polysiloxanes can be a problem. The use of solvent is typically avoided to avoid shrinkage problems. The polysiloxane according to this invention exhibits a benefit of improved miscibility with reactive diluents, for example Genomer 1122™, which results in better mechanical property upon curing. In contrast, poor miscibility between Genomer 1122™ and conventional methacryloxypropyl terminated polydimethylsiloxane gives rise to poor mechanical properties of the cured article.

In addition to additive manufacturing methods, the invention is also useful in conventional manufacturing methods such as casting/moulding (compression, injection, extrusion etc.) and sealing (i.e. architecture and electronic) subsequent or as extruded light exposure to cure.

The polysiloxane and resin composition of the present invention can advantageously be used as an adhesive material. The polysiloxane and resin composition has been found to exhibit high adhesive strength, adhering particularly well to glass, metal and/or plastic material.

As used herein, the singular forms "a," "an," and "the" designate both the singular and the plural, unless expressly stated to designate the singular only.

The term "about" and the use of ranges in general, whether or not qualified by the term about, means that the number comprehended is not limited to the exact number set forth herein, and is intended to refer to ranges substantially within the quoted range while not departing from the scope of the invention. As used herein, "about" will be understood by persons of ordinary skill in the art and will vary to some extent on the context in which it is used. If there are uses of the term which are not clear to persons of ordinary skill in the art given the context in which it is used, "about" will mean up to plus or minus 10% of the particular term.

All percentages (%) referred to herein are percentages by weight (w/w or w/v), unless otherwise indicated.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

In this specification "optionally substituted" is taken to mean that a group may or may not be substituted or fused (so as to form a condensed polycyclic group) with one, two, three or more of organic and inorganic groups (i.e. the optional substituent) including those selected from: alkyl, alkenyl, alkynyl, carbocyclyl, aryl, heterocyclyl, heteroaryl, acyl, aralkyl, alkaryl, alkheterocyclyl, alkheteroaryl, alkcarbocyclyl, halo, haloalkyl, haloalkenyl, haloalkynyl, haloaryl, halocarbocyclyl, haloheterocyclyl, haloheteroaryl, haloacyl, haloaryalkyl, hydroxy, hydroxyalkyl, hydroxyalkenyl, hydroxyalkynyl, hydroxycarbocyclyl, hydroxyaryl, hydroxyheterocyclyl, hydroxyheteroaryl, hydroxyacyl, hydroxyaralkyl, alkoxyalkyl, alkoxyalkenyl, alkoxyalkynyl, alkoxycarbocyclyl, alkoxyaryl, alkoxyheterocyclyl, alkoxyheteroaryl, alkoxyacyl, alkoxyaralkyl, alkoxy, alkenyloxy, alkynyloxy, aryloxy, carbocyclyloxy, aralkyloxy, heteroaryloxy, heterocyclyloxy, acyloxy, haloalkoxy, haloalkenyloxy, haloalkynyloxy, haloaryloxy, halocarbocyclyloxy, haloaralkyloxy, haloheteroaryloxy, haloheterocyclyloxy, haloacyloxy, nitro, nitroalkyl, nitroalkenyl, nitroalkynyl, nitroaryl, nitroheterocyclyl, nitroheteroayl, nitrocarbocyclyl, nitroacyl, nitroaralkyl, amino ($NH_2$), alkylamino, dialkylamino, alkenylamino, alkynylamino, acylamino, diarylamino, aralkylamino, diaralkylamino, acylamino, diacylamino, heterocyclamino, heteroarylamino, carboxy, carboxyester, amido, alkylsulphonyloxy, arylsulphenyloxy, alkylsulphenyl, arylsulphenyl, thio, alkylthio, alkenylthio, alkynylthio, arylthio, aralkylthio, carbocyclylthio, heterocyclylthio, heteroarylthio, acylthio, sulfoxide, sulfonyl, sulfonamide, aminoalkyl, aminoalkenyl, aminoalkynyl, aminocarbocyclyl, aminoacyl, aminoheterocyclyl, aminoheteroaryl, aminoacyl, aminoaralkyl, thioalkyl, thioalkenyl, thioalkynyl, thiocarbocyclyl, thioaryl, thioheterocyclyl, thioheteroaryl, thioacyl, thioaralkyl, carboxyalkyl, carboxyalkenyl, carboxyalkynyl, carboxycarbocyclyl, carboxyaryl, carboxyheterocyclyl, carboxyheteroaryl, carboxyacyl, carboxyaralkyl, carboxyesteralkyl, carboxyesteralkenyl, carboxyesteralkynyl, carboxyestercarbocyclyl, carboxyesteraryl, carboxyesterheterocyclyl, carboxyesterheteroaryl, carboxyesteracyl, carboxyesteraralkyl, amidoalkyl, amidoalkenyl, amidoalkynyl, amidocarbocyclyl, amidoaryl, amidoheterocyclyl, amidoheteroaryl, amidoacyl, amidoaralkyl, formylalkyl, formylalkenyl, formylalkynyl, formylcarbocyclyl, formylaryl, formylheterocyclyl, formylheteroaryl, formylacyl, formylaralkyl, acylalkyl, acylalkenyl, acylalkynyl, acylcarbocyclyl, acylaryl, acylheterocyclyl, acylheteroaryl, acylacyl, acylaralkyl, sulfoxidealkyl, sulfoxidealkenyl, sulfoxidealkynyl, sulfoxidecarbocyclyl, sulfoxidearyl, sulfoxideheterocyclyl, sulfoxideheteroaryl, sulfoxideacyl, sulfoxidearalkyl, sulfonylalkyl, sulfonylalkenyl, sulfonylalkynyl, sulfonylcarbocyclyl, sulfonylaryl, sulfonylheterocyclyl, sulfonylheteroaryl, sulfonylacyl, sulfonylaralkyl, sulfonamidoalkyl, sulfonamidoalkenyl, sulfonamidoalkynyl, sulfonamidocarbocyclyl, sulfonamidoaryl, sulfonamidoheterocyclyl, sulfonamidoheteroaryl, sulfonamidoacyl, sulfonamidoaralkyl, nitroalkyl, nitroalkenyl, nitroalkynyl, nitrocarbocyclyl, nitroaryl, nitroheterocyclyl, nitroheteroaryl, nitroacyl, nitroaralkyl, cyano, sulfate and phosphate groups.

In some embodiments, it may be desirable that a group is optionally substituted with a polymer chain. An example of such a polymer chain includes a polysiloxane, polyether, polyester, polyurethane, or copolymers thereof.

Optional substituents may include the aforementioned polymer chains, alkyl (e.g. $C_{1-6}$ alkyl such as methyl, ethyl, propyl, butyl, cyclopropyl, cyclobutyl, cyclopentyl or cyclohexyl), hydroxyalkyl (e.g. hydroxymethyl, hydroxyethyl, hydroxypropyl), alkoxyalkyl (e.g. methoxymethyl, methoxyethyl, methoxypropyl, ethoxymethyl, ethoxyethyl, ethoxypropyl etc) alkoxy (e.g. $C_{1-6}$ alkoxy such as methoxy, ethoxy, propoxy, butoxy, cyclopropoxy, cyclobutoxy), halo, trifluoromethyl, trichloromethyl, tribromomethyl, hydroxy, phenyl (which itself may be further substituted e.g., by $C_{1-6}$ alkyl, halo, hydroxy, hydroxy$C_{1-6}$ alkyl, $C_{1-6}$ alkoxy, halo$C_{1-6}$alkyl, cyano, nitro $OC(O)C_{1-6}$ alkyl, and amino), benzyl (wherein benzyl itself may be further substituted e.g., by $C_{1-6}$ alkyl, halo, hydroxy, hydroxy$C_{1-6}$alkyl, $C_{1-6}$ alkoxy, halo$C_{1-6}$ alkyl, cyano, nitro $OC(O)C_{1-6}$ alkyl, and amino), phenoxy (wherein phenyl itself may be further substituted e.g., by $C_{1-6}$ alkyl, halo, hydroxy, hydroxy$C_{1-6}$ alkyl, $C_{1-6}$ alkoxy, halo$C_{1-6}$ alkyl, cyano, nitro $OC(O)C_{1-6}$ alkyl, and amino), benzyloxy (wherein benzyl itself may be further substituted e.g., by $C_{1-6}$ alkyl, halo, hydroxy, hydroxy$C_{1-6}$ alkyl, $C_{1-6}$ alkoxy, halo$C_{1-6}$ alkyl, cyano, nitro $OC(O)C_{1-6}$ alkyl, and amino), amino, alkylamino (e.g. $C_{1-6}$ alkyl, such as methylamino, ethylamino, propylamino etc), dialkylamino (e.g. $C_{1-6}$ alkyl, such as dimethylamino, diethylamino, dipropylamino), acylamino (e.g. $NHC(O)CH_3$), phenylamino (wherein phenyl itself may be further substituted e.g., by $C_{1-6}$ alkyl, halo, hydroxy hydroxy$C_{1-6}$ alkyl, $C_{1-6}$ alkoxy, halo$C_{1-6}$ alkyl, cyano, nitro $OC(O)C_{1-6}$ alkyl, and amino), nitro, formyl, —C(O)-alkyl (e.g. $C_{1-6}$ alkyl, such as acetyl), O—C(O)-alkyl (e.g. $C_{1-6}$alkyl, such as acetyloxy), benzoyl (wherein the phenyl group itself may be further substituted e.g., by $C_{1-6}$ alkyl, halo, hydroxy hydroxy$C_{1-6}$ alkyl, $C_{1-6}$ alkoxy, halo$C_{1-6}$ alkyl, cyano, nitro $OC(O)C_{1-6}$alkyl, and amino), replacement of $CH_2$ with C=O, $CO_2H$, $CO_2$alkyl (e.g. $C_{1-6}$ alkyl such as methyl ester, ethyl ester, propyl ester, butyl ester), $CO_2$phenyl (wherein phenyl itself may be further substituted e.g., by $C_{1-6}$ alkyl, halo, hydroxy, hydroxyl $C_{1-6}$ alkyl, $C_{1-6}$ alkoxy, halo $C_{1-6}$ alkyl, cyano, nitro $OC(O)C_{1-6}$ alkyl, and amino), $CONH_2$, CONHphenyl (wherein phenyl itself may be further substituted e.g., by $C_{1-6}$ alkyl, halo, hydroxy, hydroxyl $C_{1-6}$ alkyl, $C_{1-6}$ alkoxy, halo $C_{1-6}$ alkyl, cyano, nitro $OC(O)C_{1-6}$ alkyl, and amino), CONHbenzyl (wherein benzyl itself may be further substituted e.g., by $C_{1-6}$ alkyl, halo, hydroxy hydroxyl $C_{1-6}$ alkyl, $C_{1-6}$ alkoxy, halo $C_{1-6}$ alkyl, cyano, nitro $OC(O)C_{1-6}$ alkyl, and amino), CONHalkyl (e.g. $C_{1-6}$ alkyl such as methyl ester, ethyl ester, propyl ester, butyl amide) CONHdialkyl (e.g. $C_{1-6}$ alkyl) aminoalkyl (e.g., HN $C_{1-6}$ alkyl-, $C_{1-6}$alkylHN-$C_{1-6}$ alkyl- and ($C_{1-6}$ alkyl)$_2$N—$C_{1-6}$ alkyl-), thioalkyl (e.g., HS $C_{1-6}$ alkyl-), carboxyalkyl (e.g., $HO_2CC_{1-6}$ alkyl-), carboxyesteralkyl (e.g., $C_{1-6}$ alkyl$O_2CC_{1-6}$ alkyl-), amidoalkyl (e.g., $H_2N(O)CC_{1-6}$ alkyl-, H($C_{1-6}$ alkyl)N(O) $CC_{1-6}$ alkyl-), formylalkyl (e.g., $OHCC_{1-6}$alkyl-), acylalkyl (e.g., $C_{1-6}$ alkyl(O)$CC_{1-6}$ alkyl-), nitroalkyl (e.g., $O_2NC_{1-6}$ alkyl-), sulfoxidealkyl (e.g., $R^3(O)SC_{1-6}$ alkyl, such as $C_{1-6}$ alkyl(O)$SC_{1-6}$ alkyl-), sulfonylalkyl (e.g., $R^3(O)_2SC_{1-6}$ alkyl- such as $C_{1-6}$ alkyl(O)$_2SC_{1-6}$ alkyl-), sulfonamidoalkyl (e.g., $_2$HRN(O)$SC_{1-6}$ alkyl, H($C_{1-6}$ alkyl)N(O)$SC_{1-6}$ alkyl-).

As used herein, the term "alkyl", used either alone or in compound words denotes straight chain, branched or cyclic alkyl, for example $C_{1-40}$ alkyl, or $C_{1-20}$ or $C_{1-10}$. Examples of straight chain and branched alkyl include methyl, ethyl, n-propyl, isopropyl, n-butyl, sec-butyl, t-butyl, n-pentyl, 1,2-dimethylpropyl, 1,1-dimethyl-propyl, hexyl, 4-methylpentyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, heptyl, 5-methylhexyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethyl-pentyl, 1,2,3-trimethylbutyl, 1,1,2-trimethylbutyl, 1,1,3-trimethylbutyl, octyl, 6-methylheptyl, 1-methylheptyl, 1,1,3,3-tetramethylbutyl, nonyl, 1-, 2-, 3-, 4-, 5-, 6- or 7-methyloctyl, 1-, 2-, 3-, 4- or 5-ethylheptyl, 1-, 2- or 3-propylhexyl, decyl, 1-, 2-, 3-, 4-, 5-, 6-, 7- and 8-methylnonyl, 1-, 2-, 3-, 4-, 5- or 6-ethyloctyl, 1-, 2-, 3- or 4-propylheptyl, undecyl, 1-, 2-, 3-, 4-, 5-, 6-, 7-, 8- or 9-methyldecyl, 1-, 2-, 3-, 4-, 5-, 6- or 7-ethylnonyl, 1-, 2-, 3-, 4- or 5-propyloctyl, 1-, 2- or 3-butylheptyl, 1-pentylhexyl, dodecyl, 1-, 2-, 3-, 4-, 5-, 6-, 7-, 8-, 9- or 10-methylundecyl, 1-, 2-, 3-, 4-, 5-, 6-, 7- or 8-ethyldecyl, 1-, 2-, 3-, 4-, 5- or 6-propylnonyl, 1-, 2-, 3- or 4-butyloctyl, 1-2-pentylheptyl, tridecyl, tetradecyl, pentadecyl, hexadecyl, heptadecyl, octadecyl, nonadecyl, eicosyl and the like. Examples of cyclic alkyl include mono- or polycyclic alkyl groups such as cyclopropyl, cyclobutyl, cyclopentyl, cyclohexyl, cycloheptyl, cyclooctyl, cyclononyl, cyclodecyl and the like. Where an alkyl group is referred to generally as "propyl", butyl" etc, it will be understood that this can refer to any of straight, branched and cyclic isomers where appropriate. An alkyl group may be optionally substituted by one or more optional substituents as herein defined.

As used herein, term "alkenyl" denotes groups formed from straight chain, branched or cyclic hydrocarbon residues containing at least one carbon to carbon double bond including ethylenically mono-, di- or polyunsaturated alkyl or cycloalkyl groups as previously defined, for example $C_{2-40}$ alkenyl, or $C_{2-20}$ or $C_{2-10}$. Thus, alkenyl is intended to include propenyl, butylenyl, pentenyl, hexaenyl, heptaenyl, octaenyl, nonaenyl, decenyl, undecenyl, dodecenyl, tridecenyl, tetradecenyl, pentadecenyl, hexadecenyl, heptadecenyl, octadecenyl, nondecenyl, eicosenyl hydrocarbon groups with one or more carbon to carbon double bonds. Examples of alkenyl include vinyl, allyl, 1-methylvinyl, butenyl, isobutenyl, 3-methyl-2-butenyl, 1-pentenyl, cyclopentenyl, 1-methyl-cyclopentenyl, 1-hexenyl, 3-hexenyl, cyclohexenyl, 1-heptenyl, 3-heptenyl, bicycloheptenyl, 1-octenyl, cyclooctenyl, 1-nonenyl, 2-nonenyl, 3-nonenyl, 1-decenyl, 3-decenyl, 1,3-butadienyl, 1,4-pentadienyl, 1,3-cyclopentadienyl, 1,3-hexadienyl, 1,4-hexadienyl, 1,3-cyclohexadienyl, 1,4-cyclohexadienyl, 1,3-cycloheptadienyl, 1,3,5-cycloheptatrienyl and 1,3,5,7-cyclooctatetraenyl. An alkenyl group may be optionally substituted by one or more optional substituents as herein defined.

As used herein the term "alkynyl" denotes groups formed from straight chain, branched or cyclic hydrocarbon residues containing at least one carbon-carbon triple bond including ethylenically mono-, di- or polyunsaturated alkyl or cycloalkyl groups as previously defined, for example, $C_{2-40}$ alkenyl, or $C_{2-20}$ or $C_{2-10}$. Thus, alkynyl is intended to include propynyl, butylynyl, pentynyl, hexaynyl, heptaynyl, octaynyl, nonaynyl, decynyl, undecynyl, dodecynyl, tridecynyl, tetradecynyl, pentadecynyl, hexadecynyl, heptadecynyl, octadecynyl, nondecynyl, eicosynyl hydrocarbon groups with one or more carbon to carbon triple bonds. Examples of alkynyl include ethynyl, 1-propynyl, 2-propynyl, and butynyl isomers, and pentynyl isomers. An alkynyl group may be optionally substituted by one or more optional substituents as herein defined.

An alkenyl group may comprise a carbon to carbon triple bond and an alkynyl group may comprise a carbon to carbon double bond (i.e. so called ene-yne or yne-ene groups).

As used herein, the term "aryl" (or "carboaryl") denotes any of single, polynuclear, conjugated and fused residues of aromatic hydrocarbon ring systems. Examples of aryl include phenyl, biphenyl, terphenyl, quaterphenyl, naphthyl, tetrahydronaphthyl, anthracenyl, dihydroanthracenyl, benzanthracenyl, dibenzanthracenyl, phenanthrenyl, fluorenyl, pyrenyl, idenyl, azulenyl, chrysenyl. Preferred aryl include phenyl and naphthyl. An aryl group may be optionally substituted by one or more optional substituents as herein defined.

As used herein, the terms "alkylene", "alkenylene", and "arylene" are intended to denote the divalent forms of "alkyl", "alkenyl", and "aryl", respectively, as herein defined.

The term "halogen" ("halo") denotes fluorine, chlorine, bromine or iodine (fluoro, chloro, bromo or iodo). Preferred halogens are chlorine, bromine or iodine.

The term "carbocyclyl" includes any of non-aromatic monocyclic, polycyclic, fused or conjugated hydrocarbon residues, preferably $C_{3-20}$ (e.g. $C_{3-10}$ or $C_{3-8}$). The rings may be saturated, e.g. cycloalkyl, or may possess one or more double bonds (cycloalkenyl) and/or one or more triple bonds (cycloalkynyl). Particularly preferred carbocyclyl moieties are 5-6-membered or 9-10 membered ring systems. Suitable examples include cyclopropyl, cyclobutyl, cyclopentyl, cyclohexyl, cycloheptyl, cyclooctyl, cyclononyl, cyclodecyl, cyclopentenyl, cyclohexenyl, cyclooctenyl, cyclopentadienyl, cyclohexadienyl, cyclooctatetraenyl, indanyl, decalinyl and indenyl.

The term "heterocyclyl" when used alone or in compound words includes any of monocyclic, polycyclic, fused or conjugated hydrocarbon residues, preferably $C_{3-20}$ (e.g. $C_{3-10}$ or $C_{3-8}$) wherein one or more carbon atoms are replaced by a heteroatom so as to provide a non-aromatic residue. Suitable heteroatoms include O, N, S, P and Se, particularly O, N and S. Where two or more carbon atoms are replaced, this may be by two or more of the same heteroatom or by different heteroatoms. The heterocyclyl group may be saturated or partially unsaturated, i.e. possess one or more double bonds. Particularly preferred heterocyclyl are 5-6 and 9-10 membered heterocyclyl. Suitable examples of heterocyclyl groups may include azridinyl, oxiranyl, thiiranyl, azetidinyl, oxetanyl, thietanyl, 2H-pyrrolyl, pyrrolidinyl, pyrrolinyl, piperidyl, piperazinyl, morpholinyl, indolinyl, imidazolidinyl, imidazolinyl, pyrazolidinyl, thiomorpholinyl, dioxanyl, tetrahydrofuranyl, tetrahydropyranyl, tetrahydropyrrolyl, tetrahydrothiophenyl, pyrazolinyl, dioxalanyl, thiazolidinyl, isoxazolidinyl, dihydropyranyl, oxazinyl, thiazinyl, thiomorpholinyl, oxathianyl, dithianyl, trioxanyl, thiadiazinyl, dithiazinyl, trithianyl, azepinyl, oxepinyl, thiepinyl, indenyl, indanyl, 3H-indolyl, isoindolinyl, 4H-quinolazinyl, chromenyl, chromanyl, isochromanyl, pyranyl and dihydropyranyl.

The term "heteroaryl" includes any of monocyclic, polycyclic, fused or conjugated hydrocarbon residues, wherein one or more carbon atoms are replaced by a heteroatom so as to provide an aromatic residue. Preferred heteroaryl have 3-20 ring atoms, e.g. 3-10. Particularly preferred heteroaryl are 5-6 and 9-10 membered bicyclic ring systems. Suitable heteroatoms include, O, N, S, P and Se, particularly O, N and S. Where two or more carbon atoms are replaced, this may be by two or more of the same heteroatom or by different heteroatoms. Suitable examples of heteroaryl groups may include pyridyl, pyrrolyl, thienyl, imidazolyl, furanyl, benzothienyl, isobenzothienyl, benzofuranyl, isobenzofuranyl, indolyl, isoindolyl, pyrazolyl, pyrazinyl, pyrimidinyl, pyridazinyl, indolizinyl, quinolyl, isoquinolyl, phthalazinyl, 1,5-naphthyridinyl, quinozalinyl, quinazolinyl, quinolinyl, oxazolyl, thiazolyl, isothiazolyl, isoxazolyl, triazolyl, oxadialzolyl, oxatriazolyl, triazinyl, and furazanyl.

The term "acyl" either alone or in compound words denotes a group containing the agent C=O (and not being a carboxylic acid, ester or amide) Preferred acyl includes $C(O)$—$R^x$, wherein $R^x$ is hydrogen or an alkyl, alkenyl, alkynyl, aryl, heteroaryl, carbocyclyl, or heterocyclyl residue. Examples of acyl include formyl, straight chain or branched alkanoyl (e.g. $C_{1-20}$) such as, acetyl, propanoyl, butanoyl, 2-methylpropanoyl, pentanoyl, 2,2-dimethylpropanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, nonadecanoyl and icosanoyl; cycloalkylcarbonyl such as cyclopropylcarbonyl cyclobutylcarbonyl, cyclopentylcarbonyl and cyclohexylcarbonyl; aroyl such as benzoyl, toluoyl and naphthoyl; aralkanoyl such as phenylalkanoyl (e.g. phenylacetyl, phenylpropanoyl, phenylbutanoyl, phenylisobutylyl, phenylpentanoyl and phenylhexanoyl) and naphthylalkanoyl (e.g. naphthylacetyl, naphthylpropanoyl and naphthylbutanoyl]; aralkenoyl such as phenylalkenoyl (e.g. phenylpropenoyl, phenylbutenoyl, phenylmethacryloyl, phenylpentenoyl and phenylhexenoyl and naphthylalkenoyl (e.g. naphthylpropenoyl, naphthylbutenoyl and naphthylpentenoyl); aryloxyalkanoyl such as phenoxyacetyl and phenoxypropionyl; arylthiocarbamoyl such as phenylthiocarbamoyl; arylglyoxyloyl such as phenylglyoxyloyl and naphthylglyoxyloyl; arylsulfonyl such as phenylsulfonyl and napthylsulfonyl; heterocycliccarbonyl; heterocyclicalkanoyl such as thienylacetyl, thienylpropanoyl, thienylbutanoyl, thienylpentanoyl, thienylhexanoyl, thiazolylacetyl, thiadiazolylacetyl and tetrazolylacetyl; heterocyclicalkenoyl such as heterocyclicpropenoyl, heterocyclicbutenoyl, heterocyclicpentenoyl and heterocyclichexenoyl; and heterocyclicglyoxyloyl such as thiazolyglyoxyloyl and thienylglyoxyloyl. The $R^x$ residue may be optionally substituted as described herein.

The term "sulfoxide", either alone or in a compound word, refers to a group —S(O)$R^y$ wherein $R^y$ is selected from hydrogen, alkyl, alkenyl, alkynyl, aryl, heteroaryl, heterocyclyl, carbocyclyl, and aralkyl. Examples of preferred $R^y$ include $C_{1-20}$alkyl, phenyl and benzyl.

The term "sulfonyl", either alone or in a compound word, refers to a group S(O)$_2$-$R^y$, wherein $R^y$ is selected from hydrogen, alkyl, alkenyl, alkynyl, aryl, heteroaryl, heterocyclyl, carbocyclyl and aralkyl. Examples of preferred $R^y$ include $C_{1-20}$alkyl, phenyl and benzyl.

The term "sulfonamide", either alone or in a compound word, refers to a group S(O)NR$^y$R$^y$ wherein each $R^y$ is independently selected from hydrogen, alkyl, alkenyl, alkynyl, aryl, heteroaryl, heterocyclyl, carbocyclyl, and aralkyl. Examples of preferred $R^y$ include $C_{1-20}$alkyl, phenyl and benzyl. In a preferred embodiment at least one $R^y$ is hydrogen. In another form, both $R^y$ are hydrogen.

The term, "amino" is used here in its broadest sense as understood in the art and includes groups of the formula NR$^A$R$^B$ wherein R$^A$ and R$^B$ may be any independently selected from hydrogen, alkyl, alkenyl, alkynyl, aryl, carbocyclyl, heteroaryl, heterocyclyl, aralkyl, and acyl. R$^A$ and R$^B$, together with the nitrogen to which they are attached, may also form a monocyclic, or polycyclic ring system e.g. a 3-10 membered ring, particularly, 5-6 and 9-10 membered systems. Examples of "amino" include NH$_2$, NHalkyl (e.g. $C_{1-20}$alkyl), NHaryl (e.g. NHphenyl), NHaralkyl (e.g. NHbenzyl), NHacyl (e.g. NHC(O)$C_{1-20}$alkyl, NHC(O)phenyl), Nalkylalkyl (wherein each alkyl, for example $C_{1-20}$, may be the same or different) and 5 or 6 membered rings, optionally containing one or more same or different heteroatoms (e.g. O, N and S).

The term "amido" is used here in its broadest sense as understood in the art and includes groups having the formula C(O)NR$^A$R$^B$, wherein R$^A$ and R$^B$ are as defined as above. Examples of amido include C(O)NH$_2$, C(O)NHalkyl (e.g. $C_{1-20}$alkyl), C(O)NHaryl (e.g. C(O)NHphenyl), C(O)NHaralkyl (e.g. C(O)NHbenzyl), C(O)NHacyl (e.g. C(O)NHC(O)$C_{1-20}$alkyl, C(O)NHC(O)phenyl), C(O)Nalkylalkyl (wherein each alkyl, for example $C_{1-20}$, may be the same or different) and 5 or 6 membered rings, optionally containing one or more same or different heteroatoms (e.g. O, N and S).

The term "carboxy ester" is used here in its broadest sense as understood in the art and includes groups having the formula CO$_2$R$^z$, wherein R$^z$ may be selected from groups including alkyl, alkenyl, alkynyl, aryl, carbocyclyl, heteroaryl, heterocyclyl, aralkyl, and acyl. Examples of carboxy ester include CO$_2$C$_{1-20}$alkyl, CO$_2$aryl (e.g., CO$_2$phenyl), CO$_2$aralkyl (e.g. CO$_2$benzyl).

The term "heteroatom" or "hetero" as used herein in its broadest sense refers to any atom other than a carbon atom which may be a member of a cyclic organic group. Particular examples of heteroatoms include nitrogen, oxygen, sulfur, phosphorous, boron, silicon, selenium and tellurium, more particularly nitrogen, oxygen and sulfur.

The invention will now be described with reference to the following examples. However, it is to be understood that the examples are provided by way of illustration of the invention and that they are in no way limiting to the scope of the invention.

EXAMPLES

Chemicals and Materials:

Poly(dimethylsiloxane) (PDMS), bis (3-aminopropyl) terminated (average Mn=2,500) was purchased from Sigma-Aldrich; Poly(dimethylsiloxane), bis (3-aminopropyl) terminated (average Mn=27,000) was purchased from Sigma-Aldrich; Poly(dimethylsiloxane) bis(3-aminopropyl) terminated (Mn=5000 and 850) were purchased from Gelest. These PDMS materials were dried to remove water before further use. 1,1'-Thiocarbonyldiimidazole was purchased from Sigma-Aldrich; methacryloxypropyl terminated polydimethylsiloxanes with different molecular weights were purchased from Gelest. 2-Isocyanatoethyl methacrylate was purchased from Sigma-Aldrich; 1,3-bis(aminopropyl)tetramethyldisiloxane ("Short PDMS" or PDMS$_{248}$) was purchased from Alfa Aesar. 3-[Tris(trimethylsiloxy)silyl] propyl methacrylate ("tris") was purchased from Sigma-Aldrich. GENOMER 1122, a monofunctional urethane acrylate, was purchased from Rahn USA Corp. The solvents were purchased from Sigma-Aldrich. These chemicals were used as obtained, unless otherwise specified.

To test the adhesive bonding strength of some of the embodiments the following method was used. An adhesive is applied to at least one adherend surface of the two adherends so as to have a thickness of 0.0001 to 5 mm, preferably 0.3 mm, and then the adherends are bonded to each other upon curing under light with wavelength ranging from 300-600 nm. A method in which the adhesive is cured under the conditions of 140 mW/cm$^2$ and irradiation time of 1 to 60 seconds to adhere the adherend is preferable.

Example 1: Synthesis of PDMS-Thiourea Polymers

A PDMS-thiourea was prepared according to the following reaction scheme:

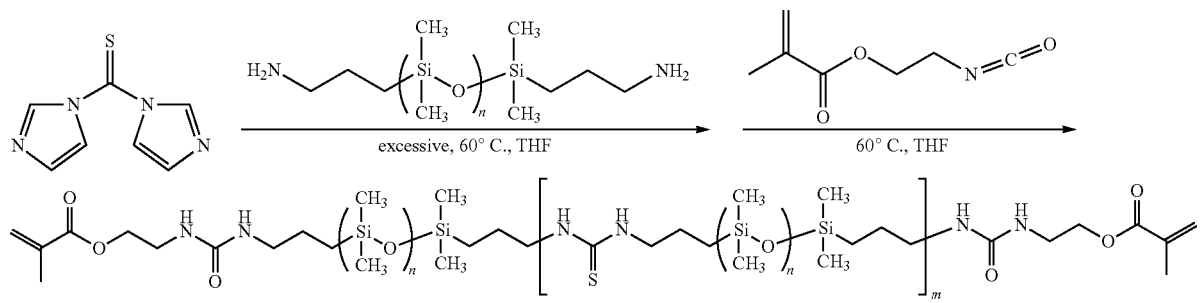

In a typical example, poly(dimethylsiloxane) bis(3-aminopropyl) terminated (Mn=2,500, 10.32 g, 0.0041 mol) was added to a 100 mL round bottomed flask. 1,1'-thiocarbonyldiimidazole (0.62 g, 0.0035 mol) and THF (20 ml) were then added, and the mixture was stirred for 24 h at 60° C. under the dry $N_2$. Then excessive 2-isocyanatoethyl methacrylate was added to the reaction solution and stirred from another three hours. Then the reaction solution was precipitated in methanol and viscous liquid was obtained. The product was precipitated three times from THF/methanol. The product was then dried in a vacuum oven for two days, yielding PDMS-thiourea (P3 in Table 1) in the form of clear yellow viscous oil.

Various PDMS-thiourea polymers were prepared in the same way, using PDMS precursors with differing molecular weight, as seen in Table 1 (P1~P3, P5 and P9).

Example 1A: Synthesis of PDMS-Thiourea Polymers Comprising a Diels-Alder Adduct

A PDMS-thiourea comprising a Diels-Alder adduct was prepared according to the following reaction scheme:

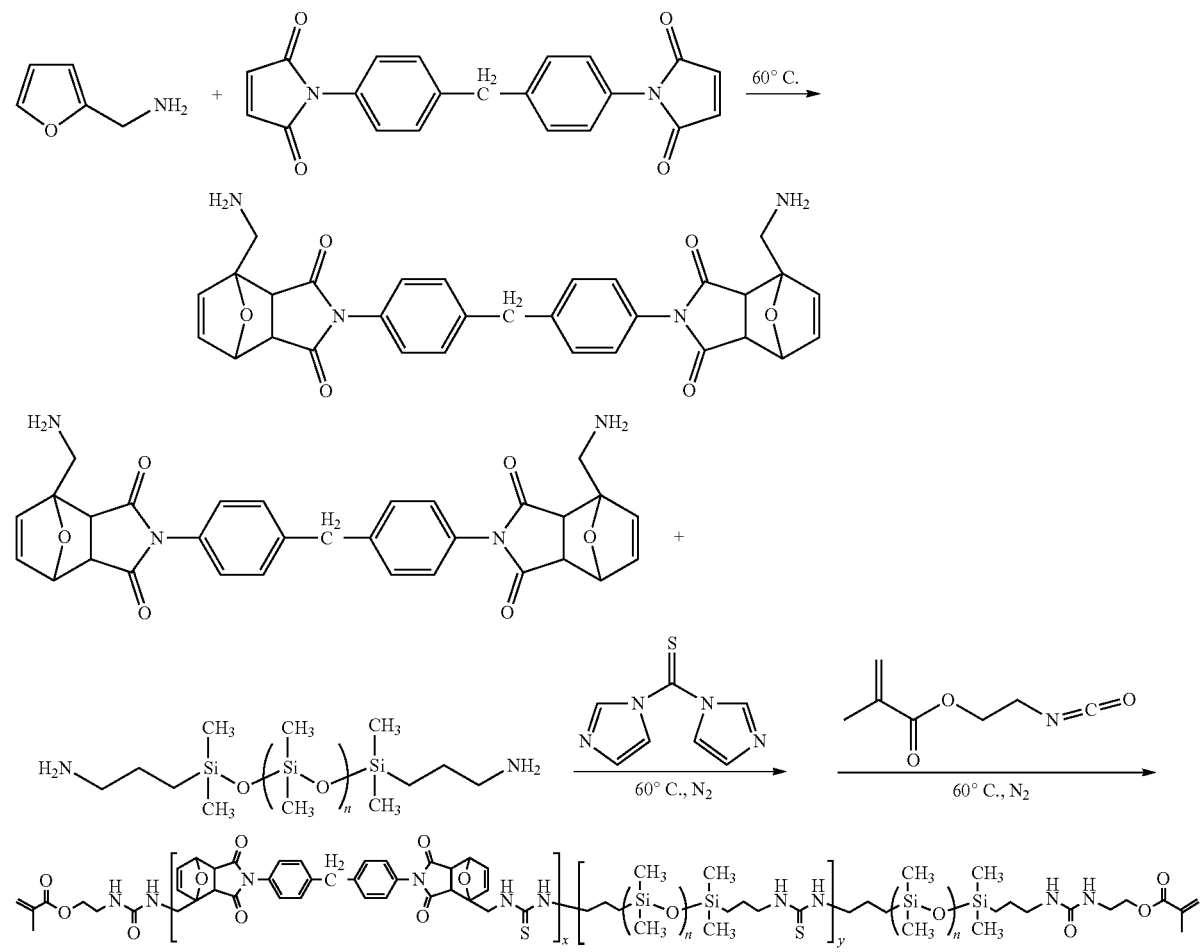

In a typical example, Poly(dimethylsiloxane) bis(3-aminopropyl) terminated (Mn=2,500, 11.63 g, 0.0023 mol) were added to a 100 mL round bottomed flask. 1,1'-thiocarbonyldiimidazole (0.445 g, 0.0025 mol) and THF (20 ml) were then added, and the mixture was stirred for 2 h at 60° C. under a nitrogen atmosphere. At the meantime 0.051 g furfuryl amine (0.00052 mol) and 0.094 g bismaleimide (0.00026 mol) was mixed in anhydrous THF at 60° C. for 2 h. The resultant mixture was added to the previous solution dropwise and continued to react for 24 h. Finally, excessive 2-Isocyanatoethyl methacrylate was added to the reaction solution and stirred from another three hours. Then the reaction solution was precipitated in methanol and the final product was obtained. The product was precipitated three times from THF/methanol and then dried in a vacuum oven for two days, yielding PDMS-DA (9:1)-thiourea polymer (P17 in Table 1) in the form of brown viscous liquid.

TABLE 1

Synthesis of PDMS-thiourea, PDMS-urea and PDMS-urethane

| Batch code | Chain extender | Starting PDMS | SEC Mw (THF) | Đ | Viscosity[a] Pa·s |
|---|---|---|---|---|---|
| P1 | (thiocarbonyldiimidazole) | Sigma-Aldrich Mn~248 | 4,300 | 1.90 | 2,500 |
| P2 | (thiocarbonyldiimidazole) | Sigma-Aldrich Mn~850 | 7,300 | 1.82 | 300 |
| P3 | (thiocarbonyldiimidazole) | Sigma-Aldrich Mn~2.5k | 18,200 | 1.49 | 30 |
| P4 | (carbonyldiimidazole) | Sigma-Aldrich Mn~2.5k | 21,700 | 1.47 | 210 |
| P5 | (thiocarbonyldiimidazole) | Gelest DMS-A21 Mn~5k | 29,700 | 1.24 | 50 |
| P6 | (thiocarbonyldiimidazole) | Mixture in 75:25 molar ratio: 1. Gelest DMS-A21(5K) 2. Short PDMS | 33,900 | 2.09 | 40 |
| P7 | (thiocarbonyldiimidazole) | Mixture in 50:50 molar ratio: 1. Gelest DMS-A21(5K) 2. Short PDMS | 51,000 | 2.66 | 320 |
| P8 | (thiocarbonyldiimidazole) | Mixture in 25:75 molar ratio: 1. Gelest DMS-A21(5K) 2. Short PDMS | 20,300 | 2.27 | 90 |
| P9 | (thiocarbonyldiimidazole) | Sigma-Aldrich Mn~27k | 111,400 | 1.50 | 450 |

TABLE 1-continued

Synthesis of PDMS-thiourea, PDMS-urea and PDMS-urethane

| Batch code | Chain extender | Starting PDMS | SEC Mw (THF) | Đ | Viscosity[a] Pa·s |
|---|---|---|---|---|---|
| P10 | 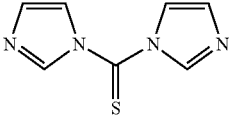 | Mixture in 75:25 molar ratio:<br>1. Sigma-Aldrich (27k)<br>2. Short PDMS | 113,500 | 1.51 | 790 |
| P11 | 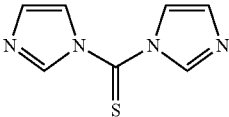 | Mixture in 50:50 molar ratio:<br>1. Sigma-Aldrich (27k)<br>2. Short PDMS | 66,100 | 1.51 | 1,300 |
| P12 | 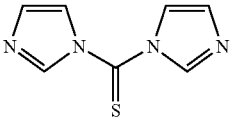 [SMILES: S=C(n1ccnc1)n1ccnc1] | Mixture in 25:75 molar ratio:<br>1. Sigma-Aldrich (27k)<br>2. Short PDMS | 59,500 | 1.56 | 500 |
| P13 | 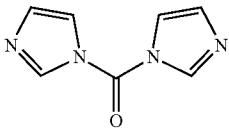 [SMILES: O=C(n1ccnc1)n1ccnc1] | Sigma-Aldrich Mn~27k | 100,200 | 1.83 | 130 |
| P14 | 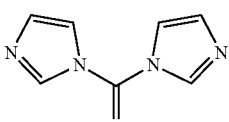 | Mixture in 75:25 molar ratio:<br>1. Sigma-Aldrich (27k)<br>2. Short PDMS | 95,100 | 1.72 | 190 |
| P15 | 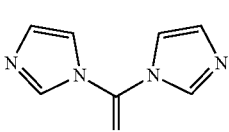 | Mixture in 50:50 molar ratio:<br>1. Sigma-Aldrich (27k)<br>2. Short PDMS | 77,900 | 1.75 | 800 |
| P16 | 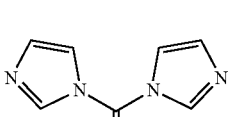 | Mixture in 25:75 molar ratio:<br>1. Sigma-Aldrich (27k)<br>2. Short PDMS | 63,600 | 1.65 | 1,140 |
| P17 | 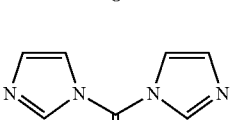 | Mixture in 90:10 molar ratio:<br>1. Gelest DMS-A21(5K)<br>2. Furfuryl amine (FA) and Bismaleimide (BMI) | 41,600 | 1.76 | 90 |
| P18 | 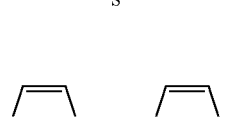 | Mixture in 75:25 molar ratio:<br>1. Gelest DMS-A21(5K)<br>2. Furfuryl amine (FA) and Bismaleimide (BMI) | 26,100 | 1.51 | 7,700 |

[a] at shear rate of 0.1 s$^{-1}$, 20° C.

Example 2: Synthesis of PDMS (L)-PDMS (S)-Thiourea Polymer

In order to adjust the thiourea ratio and increase the hydrogen bonding density in the polymer, short PDMS with only one —Si(CH$_3$)$_2$—O— unit was mixed into the PDMS-thiourea polymer. A reaction scheme for synthesis of PDMS (L)-PDMS (S)-thiourea polymer is shown below:

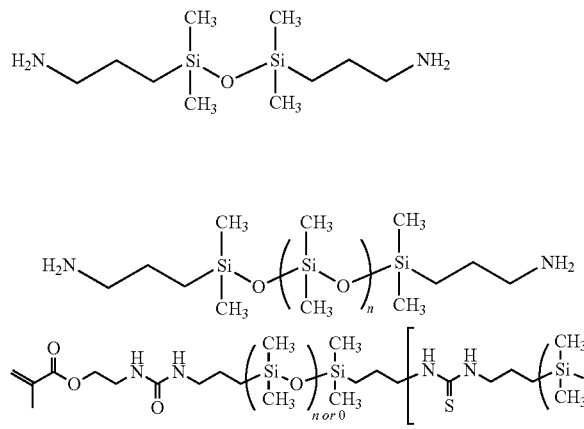
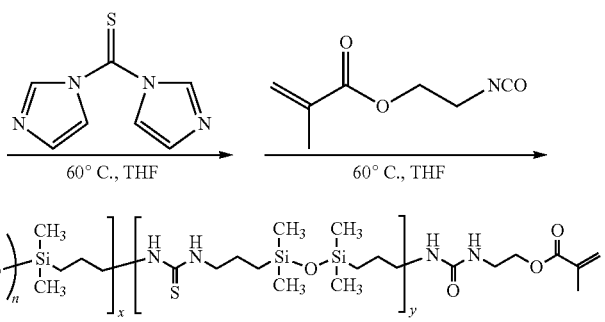

In a typical example, 1,3-bis(aminopropyl) tetramethyldisiloxane (0.130 g, 0.0005 mol) and Poly(dimethylsiloxane) bis(3-aminopropyl) terminated (Mn=27,000, 13.12 g, 0.0005 mol) with certain ratio were added to a 100 mL round bottomed flask. 1,1'-thiocarbonyldiimidazole (0.178 g, 0.001 mol) and THF (20 ml) were then added, and the mixture was stirred for 24 h at 60° C. under the dry N$_2$. Then excessive 2-Isocyanatoethyl methacrylate was added to the reaction solution and stirred from another three hours. Then the reaction solution was precipitated in methanol and viscous oil was obtained. The product was precipitated three times from THF/methanol and then dried in a vacuum oven for two days, yielding PDMS (L)-PDMS (S)-thiourea (P11 in Table 1) in the form of pale-yellow viscous oil.

Various PDMS (L)-PDMS (S)-thiourea polymers with different ratio were prepared in the same way, using PDMS precursors with differing molecular weight and different precursor siloxane ratios, as seen in Table 1 (P6, P7, P8, P10, P11, P12).

Example 3: Synthesis of PDMS-Urea Polymers (Comparative)

PDMS-urea polymers (P4 and P13 in Table 1) was prepared by the methodology of example 1, except that 1,1'-carbonyldiimidazole was used instead of 1,1'-thiocarbonyldiimidazole.

Similarly, PDMS (L)-PDMS (S)-urea polymers (P14-P16 in Table 1) were prepared by the method of example 2, except that 1,1'-carbonyldiimidazole was used instead of 1,1'-thiocarbonyldiimidazole.

Example 4: Characterization of Polymers of Examples 1-3

The polymers were characterised by Nuclear Magnetic Resonance spectroscopy ($^1$H-NMR, $^{11}$B-NMR, $^{13}$C-NMR, $^{19}$F-NMR, $^{29}$Si-NMR), confirming the expected structures. The NMR experiments were performed on the devices Bruker Avance III HD 400 MHz spectrometer ($^1$H, 400.1 MHz, $^{11}$B, 128.3 MHz, $^{13}$C, 100.6 MHz, $^{29}$Si, 79.5 MHz), Bruker Avance III 400 MHz spectrometer ($^1$H, 400.1 MHz, $^{11}$B, 128.3 MHz, $^{13}$C, 100.6 MHz, $^{19}$F, 376.5 MHz, $^{29}$Si, 79.5 MHz), and Bruker Avance III HD 500 MHz spectrometer ($^1$H, 500.5 MHz, $^{13}$C, 125.8 MHz, $^{29}$). The experiments were performed with the sample held at 25±0.1° C. for routine analysis. The chemical shifts δ of the individual peaks of the proton spectra are given in parts per million (ppm) and are calibrated to the internal residual proton signal of the deuterated solvent. $^{13}$C spectra were obtained via proton decoupling. The values of the coupling constants (J) are indicated in Hz. The following abbreviations were used to indicate the multiplicities: s=singlet, d=doublet, t=triplet, q=quartet, sept=septet, m=multiplet, br=broad.

For PDMS-thiourea polymer sample P3, the 1H NMR (400 MHz, Acetone-d6) spectrum was characterised as follows: δ 0.50-0.60 (br, —CH$_2$Si(CH$_3$)$_2$—), δ 1.60-1.70 (br, —CH$_2$CH$_2$—), δ 3.42-3.59 (br, —C(S)NHCH$_2$—), δ 5.10, 6.10 (—C(CH$_3$)═CH$_2$), δ 6.50 (br, —C(S)NH—). The average number of repeating units was estimated on the basis of the intensity ratio between the signals at δ 5.10 (—C(CH$_3$)═CH$_2$) and δ 3.42-3.59 (br, —C(S)NHCH$_2$—) for PDMS segment; or δ 5.10 (—C(CH$_3$)═CH$_2$) and 6.50 ppm (thiourea-H) for thiourea segment.

For PDMS-urea polymer sample P4, the 1H NMR (400 MHz, Acetone-d6) spectrum of was characterised as follows: δ 0.50-0.60 (br, —CH$_2$Si(CH$_3$)$_2$—), δ 1.50 (br, —CH$_2$CH$_2$—), δ 2.96-3.20 (br, —C(O)NHCH$_2$—), δ 5.57, 6.08 (—C(CH$_3$)═CH$_2$), δ 5.36-5.62 (br, —C(O)NH—). The average number of repeating units was estimated on the basis of the intensity ratio between the signals at δ 6.08 (1H, —C(CH$_3$)═CH$_2$) and δ 2.96-3.20 (br, —C(O)NHCH$_2$—) for PDMS segment; or and δ 6.08 (1H, —C(CH$_3$)═CH$_2$) and δ 5.36-5.62 (br, —C(O)NH—) for urea segment.

The polymers were also characterised by size exclusion chromatography (SEC). Size exclusion chromatography (SEC) was performed on a Waters SEC equipped with RI and UV detectors and Styrogel HT16 and HT3 columns run in series. THF was used as an eluent at a temperature of 40° C. and a constant flow rate of 1 mL min$^{-1}$. The SEC system was calibrated using linear polystyrene standards, ranging from 1350 to 1 300 000 g/mol (Polymer Laboratories).

The results are shown in Table 1. For the PDMS-(thio)urea polymers with PDMS (L) segments only, 1,1'-thiocarbonyldiimidazole or 1,1'-carbonyldiimidazole was used as chain extender and three molecular weights of PDMS were mainly used in this study: 2.5 k, 5 k and 27 k (P3, P4, P5, P9 and P13). For the PDMS (L)-PDMS (S)-thiourea polymers, PDMS$_{5k}$ and PDMS$_{27k}$ were used as long PDMS chain, while PDMS$_{248}$ was used as short PDMS chain (P6-P8, P$_{10}$-P12). With increasing ratio of short PDMS in the copolymers, the ratio of thiourea increases correspondingly. As a result, an increasing impact of hydrogen bonds on the polymer viscosity is expected because hydrogen bonds will enhance the interactions between polymer chains via non-covalent interactions. However, since molecular weight also contributes to the viscosity of the polymer, the copolymer has highest viscosity when long PDMS: short PDMS=50:50 (P7 and P11).

The polymer precursors were characterised by Fourier transform infrared (FT-IR) tests. Fourier transform infrared (FT-IR) spectra were recorded using a Fourier transform infrared spectrometer (PE Spectrum 100) for wavelengths ranging from 400 to 4000 cm$^{-1}$. Infrared spectra were recorded on a Fourier transformed-infrared spectrometer (Perkin Elmer Spectrum Two, with a Universal ATR sampling accessory and diamond crystal, Perkin Elmer Instruments, The Netherlands).

FTIR spectra were obtained for PDMS-thiourea polymers with different PDMS molecular weights, i.e. P9 (PDMS MW=27 k), P5 (PDMS MW=5 k), P3 (PDMS MW=2.5 k), P2 (PDMS MW=850) and P1 (PDMS MW=248). The results demonstrated that all the PDMS-thiourea polymers show two broad vibrational bands at around 3,290 and 3,060 cm$^{-1}$, which is in the range of the N—H stretching vibration, with the spectra strongly influenced by H-bonding. The peak around 3,290 cm$^{-1}$ is assigned to the N—H stretching vibration peak, while the peak near 3,060 cm$^{-1}$ is characteristic of a N—H deformation vibration of nonlinearly H-bonded thiourea units. With decreasing molecular weight of the PDMS segment, the ratio of thiourea units increases and there is thus an increasing amount of hydrogen bond interactions in the copolymers.

FTIR spectra were also obtained for PDMS (L)-PDMS (S)-thiourea polymers P5, P6, P7 and P8, with different ratios of thiourea groups. Broad vibrational bands were again evident at around 3,290 and 3,060 cm$^{-1}$, the former of which can be assigned to the N—H stretching vibration peak, while the latter is characteristic of a N—H deformation vibration of nonlinearly H-bonded thiourea units. By varying the ratio of long PDMS and short PDMS in the copolymers, the amount of H bonding could be adjusted corresponding to the amount of thiourea units.

Example 5. Preparation of Dog-Bone Crosslinked Polymer Specimens for Tensile Tests Irgacure 819 (100 mg) and Irgacure TPO-L (450 mg), Darocur 1173 (450 mg) photo-radical initiators were weighed into a glass vial. The three components were mixed thoroughly using a vortex mixer or a magnetic stirrer. This typically took about 24 hours for the solid to completely incorporate into the liquid, producing a clear yellow suspension.

The PDMS-(thio)urea polymers (10 g) as prepared in examples 1-3 and a commercial methacryloxypropyl terminated PDMS lacking thiourea groups (Gelest, 10 g) were diluted in 20 ml dichloromethane (DCM) separately. The initiator mixture (0.1 g) was added to each solution, and mixed until a homogenous solution was obtained. The mixture solutions were kept covered using aluminium foil to minimise the exposure to light. A rotary evaporator was used to remove dichloromethane for each solution. Residual solvent was dried using a high vacuum pump.

For the diluted samples, taking F21 in Table 2 as an example, PDMS $_{5K}$-PDMS$_{248}$ (100:0)-thiourea (2.4 g), 3-[Tris(trimethylsiloxy)silyl] propyl methacrylate (Tris, 2.4 g) and Genomer 1122 (2.4 g) were added into a vial and stirred for three hours. The initiator mixture (72 mg) was then added to the solution and continued stirred overnight. The mixture solutions were kept covered using aluminium foil to minimise the exposure to light before use.

Dog-bone specimens (Type V, ASTM638) were prepared by pouring the resin solution into the metal mould, followed by UV crosslinking under the UV lamp (Wavelength 365 nm, Intensity 150 mW·cm$^{-2}$) for 30 min. Then the dog-bone specimen was peeled off from metal mould for further characterization.

Example 6: Formulation Study of PDMS Based Resins

Formulations of PDMS based resin were prepared as summarized in Table 2.

Reactive prior art polymers (commercial methacryloxypropyl terminated PDMS) were purchased (C1-C9), formulated into resins as outlined in examples 5. The formulations were prepared and cured into dog bone shaped samples as outlined in example 5.

Typically, crosslinkable polysiloxanes are viscous and required to be mixed with reactive diluents to be processable and printable using, for instance, DLP. In these experiments, 3-[tris(trimethylsiloxy)silyl]propyl methacrylate was used as reactive diluent for its siloxane functionality and Genomer 1122™ was used due to the additional hydrogen bonding potentially contributed through the urethane group. The main challenge for incorporation of these reactive diluents in the polysiloxane crosslinked network is their miscibility. Phase separation will likely contribute to poor mechanical stability as well, which were exhibited by reactive urea-siloxane and siloxane only. Reactive siloxane-thiourea has better miscibility with the reactive diluents, and the resultant hydrogen bonding between the each thiourea segment as well as the urethane seemed to impart better mechanical properties in the tensile measurement.

As shown in Table 2, resins C1-C9 based on commercial methacryloxypropyl terminated PDMS (Gelest, product codes DMS-R31, RMS-033 and DMS-R22) had a lower photo crosslinking rate compared with those containing crosslinkable PDMS-thiourea polymers according to the invention (The photo-crosslinking rates were characterized via photorheology test, which is described in example 8). Moreover, the miscibility of commercial PDMS with reactive diluents (3-[Tris(trimethylsiloxy)silyl] propyl methacrylate and monofunctional urethane acrylate, Genomer 1122) is poor, thus phase separation occurred in resin C8.

Resins F11-F19 contained only PDMS-thiourea polymers according to the invention and photoinitiators. The viscosities of these resin formulations are quite high and not suitable for DLP printing. The PDMS$_{5k}$-thiourea polymers (resins F12-F15) show faster crosslinking rate compared with commercial PDMS based on the photorheology results. Both PDMS$_{5k}$-thiourea (resins F12-F15) and PDMS$_{27K}$-thiourea polymers (resins F16-F19) show better mechanical properties compared with commercial PDMS based on the Tensile test results.

Resins F20-F28 contain PDMS-thiourea polymers with reactive diluents and photoinitiators. The presence of diluents significantly decreases the viscosity of the resin solutions. Resins F21-F24 had the most suitable properties for DLP printing. An article printed with F23 resin (PDMS$_{5K}$-PDMS$_{248}$ (50:50)-thiourea+tris+Genomer1122 (1:1:1 wt %)+PI) could be printed in good resolution and showed good mechanical properties (high stretchability and flexibility, see FIG. 7).

For comparative purposes, resins C29-C32 contain PDMS-urea polymers with reactive diluents and photoinitiators. The PDMS-urea polymers were generally not miscible with the reactive diluents and obvious phase separation occurred in C29-C31. PDMS-urea based resin C32 could be used, but the mechanical properties were worse than PDMS-thiourea based resin.

TABLE 2

Resin formulations (Samples C1-C9 are comparative examples, which were purchased from Gelest; F11-F28 are examples from this invention (thiourea); C10, C29-C32 are comparative examples (urea)

| Code | Composition | PI | PI Ratio (wt %) | Comment |
|---|---|---|---|---|
| C1 | Gelest PDMS (DMS-R31) | TPO-L + Irgacure 819 (9:1) | 0.8 | Low crosslinking rate; low viscosity |
| C2 | Gelest PDMS (DMS-R31) | TPO-L + Irgacure 819 (9:1) | 1.6 | Blur solution; Low crosslinking rate and viscosity |
| C3 | Gelest PDMS (DMS-R31) | Darocur 1173 + Irgacure 819 (9:1) | 0.8 | Low crosslinking rate; low viscosity |
| C4 | Gelest PDMS (DMS-R31) | Darocur 1173 + Irgacure 819 (7:3) | 0.8 | Blur solution; Low crosslinking rate and viscosity; |
| C5 | Gelest PDMS (DMS-R31) | TPO-L + ITX (6:1) | 0.6 | Blur solution, low transparency after crosslinking |
| C6 | Gelest PDMS DMS-R31 | TPO-L + Darocur 1173 + Irgacure 819 (4.5:4.5:1) | 0.8 | Clear photoinitiator solution; Relatively low crosslinking rate; brittle after curing |
| C7 | Gelest PDMS DMS-R31 + RMS-033 (19:1) | TPO-L + Darocur 1173 + Irgacure 819 (4.5:4.5:1) | 0.8 | Clear photoinitiator solution; Relatively low crosslinking rate; brittle after curing |
| C8 | Gelest PDMS (DMS-R31) + Tris + Genomer 1122 | TPO-L + Darocur 1173 + Irgacure 819 (4.5:4.5:1) | 0.8 | Low crosslinking rate; Phase separation occurs |
| C9 | Gelest PDMS (DMS-R22) | TPO-L + Darocur 1173 + Irgacure 819 (4.5:4.5:1) | 0.8 | Very brittle after crosslinking; low crosslinking rate |
| C10 | P4: PDMS$_{2.5\,K}$-urea | TPO-L + Darocur 1173 + Irgacure 819 (4.5:4.5:1) | 0.8 | Very brittle after crosslinking; |
| F11 | P3: PDMS$_{2.5\,K}$-PDMS$_{248}$ (100:0)-thiourea | TPO-L + Darocur 1173 + Irgacure 819 (4.5:4.5:1) | 0.8 | Higher viscosity than PDMS; better mechanical property; high transparency after crosslinking; |
| F12 | P5. PDMS$_{5\,K}$-PDMS$_{248}$ (100:0)-thiourea | TPO-L + Darocur 1173 + Irgacure 819 (4.5:4.5:1) | 0.8 | High viscosity; better mechanical property than PDMS |
| F13 | P6: PDMS$_{5\,K}$-PDMS$_{248}$ (75:25)-thiourea | TPO-L + Darocur 1173 + Irgacure 819 (4.5:4.5:1) | 0.8 | Fast crosslinking rate |
| F14 | P7: PDMS$_{5\,K}$-PDMS$_{248}$ (50:50)-thiourea | TPO-L + Darocur 1173 + Irgacure 819 (4.5:4.5:1) | 0.8 | Fast crosslinking rate |
| F15 | P8: PDMS$_{5\,K}$-PDMS$_{248}$ (25:75)-thiourea | TPO-L + Darocur 1173 + Irgacure 819 (4.5:4.5:1) | 0.8 | Fast crosslinking rate |
| F16 | P9: PDMS$_{27\,K}$-PDMS$_{248}$ (100:0)-thiourea | TPO-L + Darocur 1173 + Irgacure 819 (4.5:4.5:1) | 0.8 | High viscosity; slow crosslinking rate |
| F17 | P10: PDMS$_{27\,K}$-PDMS$_{248}$ (75:25)-thiourea | TPO-L + Darocur 1173 + Irgacure 819 (4.5:4.5:1) | 0.8 | High viscosity; slow crosslinking rate |
| F18 | P11: PDMS$_{27\,K}$-PDMS$_{248}$ (50:50)-thiourea | TPO-L + Darocur 1173 + Irgacure 819 (4.5:4.5:1) | 0.8 | Flexible and stretchable after crosslinking |
| F19 | P12: PDMS$_{27\,K}$-PDMS$_{248}$ (25:75)-thiourea | TPO-L + Darocur 1173 + Irgacure 819 (4.5:4.5:1) | 0.8 | Flexible and stretchable after crosslinking |
| F20 | P7: PDMS$_{5\,K}$-PDMS$_{248}$ (50:50)-thiourea + tris (1:2) | TPO-L + Darocur 1173 + Irgacure 819 (4.5:4.5:1) | 0.8 | Clear solution, non-printable |
| F21 | P5: PDMS$_{5\,K}$-PDMS$_{248}$ (100:0)-thiourea + tris + Genomer 1122 (1:1:1 wt %) | TPO-L + Darocur 1173 + Irgacure 819 (4.5:4.5:1) | 0.8 | Less stable solution, fast crosslinking rate; |
| F22 | P6: PDMS$_{5\,K}$-PDMS$_{248}$ (75:25)-thiourea + tris + Genomer 1122 (1:1:1 wt %) | TPO-L + Darocur 1173 + Irgacure 819 (4.5:4.5:1) | 0.8 | Stable solution, fast crosslinking rate; low viscosity; good mechanical property |

TABLE 2-continued

Resin formulations (Samples C1-C9 are comparative examples, which were purchased from Gelest; F11-F28 are examples from this invention (thiourea); C10, C29-C32 are comparative examples (urea)

| Code | Composition | PI | PI Ratio (wt %) | Comment |
|---|---|---|---|---|
| F23 | P7: $PDMS_{5K}$-$PDMS_{248}$ (50:50)-thiourea + tris + Genomer 1122 (1:1:1 wt %) | TPO-L + Darocur 1173 + Irgacure 819 (4.5:4.5:1) | 0.8 | Stable solution, fast crosslinking rate; low viscosity; good mechanical property |
| F24 | P8: $PDMS_{5K}$-$PDMS_{248}$ (25:75)-thiourea + tris + Genomer 1122 (1:1:1 wt %) | TPO-L + Darocur 1173 + Irgacure 819 (4.5:4.5:1) | 0.8 | Very stable solution, fast crosslinking rate; low viscosity; high tensile strength |
| F25 | P9: $PDMS_{27K}$-$PDMS_{248}$ (100:0)-thiourea + tris + Genomer 1122 (1:1:1 wt %) | TPO-L + Darocur 1173 + Irgacure 819 (4.5:4.5:1) | 0.8 | Less stable; phase separated; low crosslinking rate |
| F26 | P10: $PDMS_{27K}$-$PDMS_{248}$ (75:25)-thiourea + tris + Genomer 1122 (1:1:1 wt %) | TPO-L + Darocur 1173 + Irgacure 819 (4.5:4.5:1) | 0.8 | Less stable; phase separated; low crosslinking rate |
| F27 | P11: $PDMS_{27K}$-$PDMS_{248}$ (50:50)-thiourea + tris + Genomer 1122 (1:1:1 wt %) | TPO-L + Darocur 1173 + Irgacure 819 (4.5:4.5:1) | 0.8 | A little phase separated; good mechanical property |
| F28 | P12: $PDMS_{27K}$-$PDMS_{248}$ (25:75)-thiourea + tris + Genomer 1122 (1:1:1 wt %) | TPO-L + Darocur 1173 + Irgacure 819 (4.5:4.5:1) | 0.8 | Stable solution; good mechanical property; viscosity relatively high; |
| C29 | P13: $PDMS_{27K}$-$PDMS_{248}$ (100:0)-urea + tris + Genomer 1122 (1:1:1 wt %) | TPO-L + Darocur 1173 + Irgacure 819 (4.5:4.5:1) | 0.8 | Not miscible; phase separated; poor stability |
| C30 | P14: $PDMS_{27K}$-$PDMS_{248}$ (75:25)- urea + tris + Genomer 1122 (1:1:1 wt %) | TPO-L + Darocur 1173 + Irgacure 819 (4.5:4.5:1) | 0.8 | Not miscible; phase separated; poor stability |
| C31 | P15: $PDMS_{27K}$-$PDMS_{248}$ (50:50)-urea + tris + Genomer 1122 (1:1:1 wt %) | TPO-L + Darocur 1173 + Irgacure 819 (4.5:4.5:1) | 0.8 | Not miscible; phase separated; poor stability |
| C32 | P16: $PDMS_{27K}$-$PDMS_{248}$ (25:75)-urea + tris + Genomer 1122 (1:1:1 wt %) | TPO-L + Darocur 1173 + Irgacure 819 (4.5:4.5:1) | 0.8 | A little phase separated; poor mechanical property |

Example 7. Characterisation and Mechanical Properties of the Crosslinked Polymers The crosslinked polymers as prepared in example 5 (using resins prepared in example 6) were characterised by mechanical tensile-stress tests, performed using INSTRON-5566 based on the ASTM D638 standard using type V specimen samples. For mechanical tensile stress tests, a sample size of 40 mm length×5 mm width×2 mm height, gauge length of 10 mm, and strain rate of 10 mm·min$^{-1}$ was adopted. Cyclic tensile elongation was performed on INSTRON-5566 using ASTM D638 Type V dog bone specimens. Samples were elongated to 200% strain then back to 0 MPa stress at a different strain rate. A total of 10/100 cycles of testing were performed for all samples.

For self-healing tests, a specimen of the same size was cut into two pieces and then put together. The polymer specimen was then healed at 120° C. The healed specimen was then loaded with certain weight to test its self-healing property.

FIG. 1 shows the results of tensile tests for crosslinked samples of commercial PDMS (Gelest, DMS-R22, C9 in Table 2), $PDMS_{2.5k}$-urea (P4 in Table 1, C10 in Table 2) and $PDMS_{2.5k}$-thiourea (P3 in Table 1 and F11 in Table 2) with similar molecular weights. Tensile testing result revealed a relatively low elongation to break and rigid property for the commercial PDMS (sample 1) compared with PDMS-urea and PDMS-thiourea polymers. The PDMS-thiourea polymer showed highest elongation at break among the three materials. Without wishing to be bound by theory, this may be because the breakage of hydrogen bonds dissipates energy and therefore results in the high stretchability of the material. H-bonded thiourea arrays may be geometrically non-linear and less ordered, so that they do not induce crystallization. By contrast, in the case of PDMS-urea polymer the H-bonds may lead to crystallization or clustering of polymer chains so that the polymer containing urea units are rigid and brittle.

Figure 2:
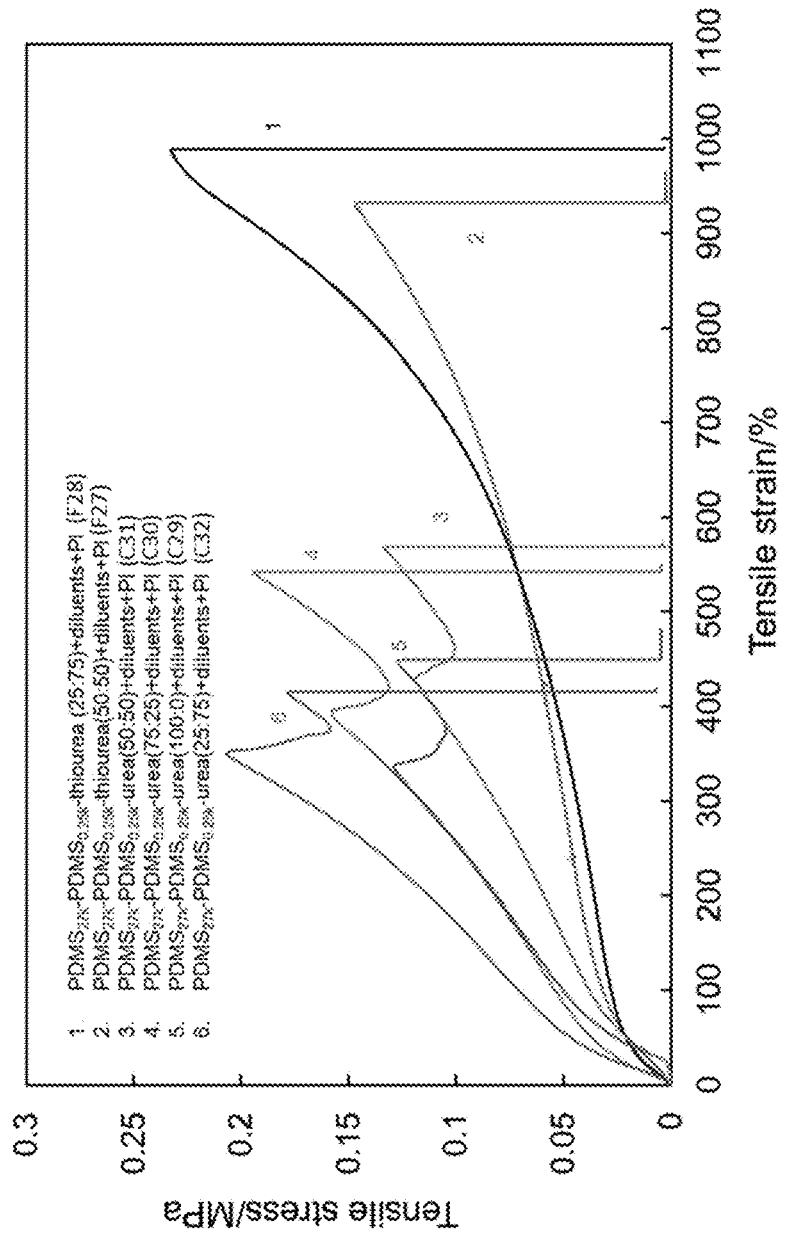
FIG. 2 depicts tensile test results (stress-strain curves) for cured resin samples containing PDMS-thiourea polymer and reactive diluents compared with PDMS-urea polymer and reactive diluents after UV crosslinking.

FIG. 2 shows a comparison of the mechanical properties of crosslinked samples of $PDMS_{27k}$-thiourea based samples (resins F27 and F28, Table 2) and $PDMS_{27k}$-urea based samples (resins C31 and C32, Table 2). The preparation process of diluted samples (F21~C32) is quite similar, which is described in example 5. Crosslinked polymer from the PDMS-thiourea based resins demonstrated substantially higher elongation at break compared with the same composition of PDMS-urea based resin. For instance, the cured sample derived from PDMS (L)-PDMS (S) (25:75)-thiourea+reactive diluents (resin F28) has elongation-at-break of ~1000%, which is about five times that of the PDMS (L)-PDMS (S) (25:75)-urea+reactive diluents (resin C32). This result demonstrates that PDMS-thiourea polymers are better suited for additive manufacturing of silicone-based elastomers. It was also observed that an increase in the thiourea ratio in the polymer not only leads to an increase in tensile stress from about 0.15 to 0.24 MPa, but also increases the elongation at break (resin F27 vs F28). It is believed that breakage of a greater amount of hydrogen bonds could reduce the force applied on the sample and dissipate energy, thus leading to improved stretchability of the material.

Figure 3:
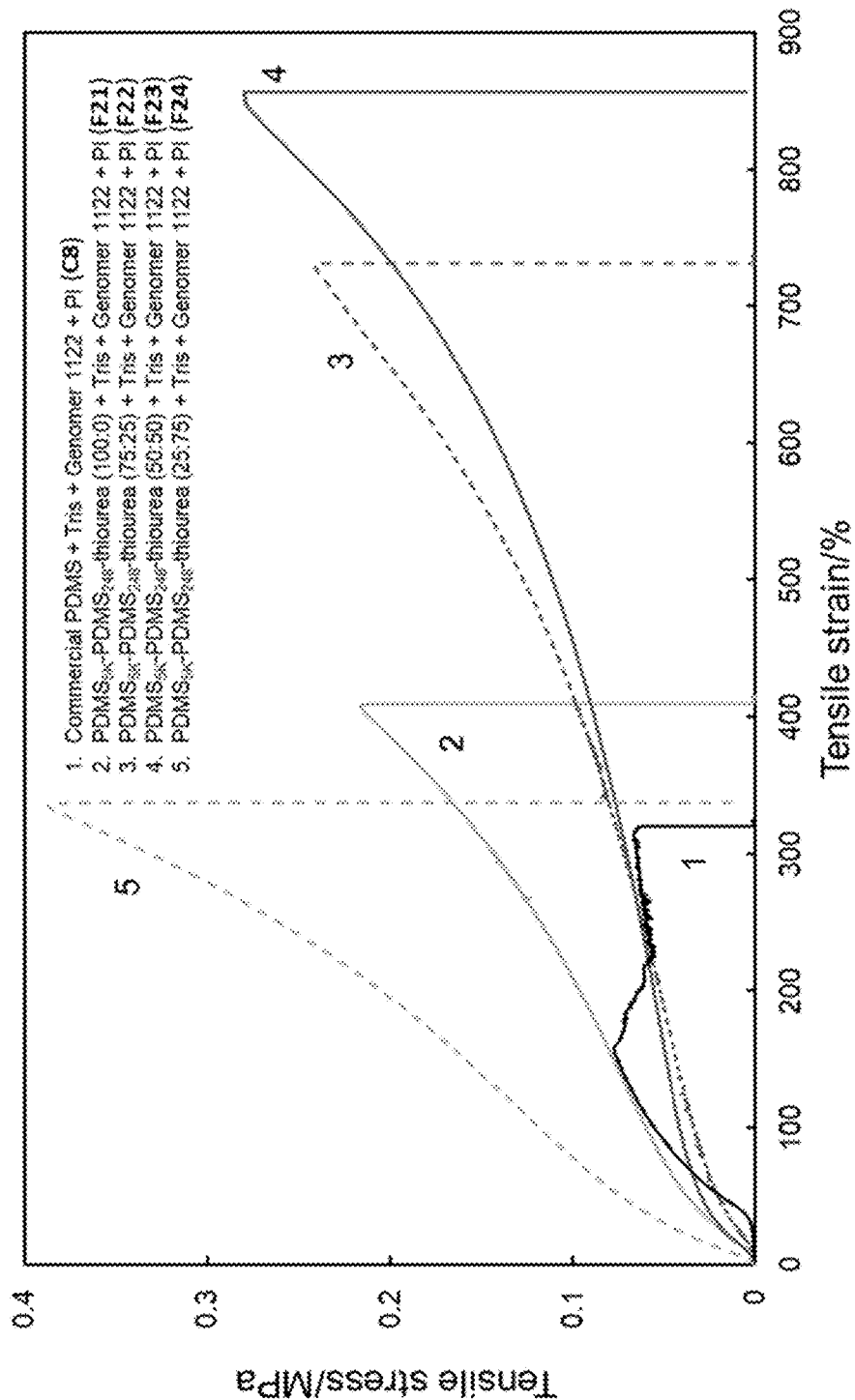
FIG. 3 depicts tensile test results (stress-strain curves) for cured resin samples containing PDMS-thiourea polymers with differing ratios of long PDMS segments to short PDMS segments, with comparison against a commercial PDMS polymer, after UV crosslinking.

FIG. 3 shows a comparison of tensile properties between cured samples (S2-S5) produced from $PDMS_{5k}$-$PDMS_{248}$-thiourea based resins (F21 to F24, Table 2) and cured sample (S1) produced from commercial PDMS based resin (C8 Table 2). Since the miscibility of commercial PDMS with monofunctional urethane acrylate (Genomer 1122) is poor, phase separation occurred in the cured sample. Thus, the tensile curve shows two stages before breaking. However, for the PDMS-thiourea based samples, there is an increase in ultimate tensile strength with increasing ratio of thiourea units in the polymers. It is believed that the presence of hydrogen bonds and the molecular weight both contribute to the mechanical properties of the samples. With increasing amounts of short PDMS segments (and thus thiourea ratio) in the polymer, the amount of hydrogen bonds increases while the molecular weight decreases correspondingly (see Table 1). Among all the ratios, crosslinked polymer P7, i.e. $PDMS_{5k}$-$PDMS_{248}$ (50:50)-thiourea with reactive diluents shows the highest elongation at break and relatively good tensile strength.

Figure 4:
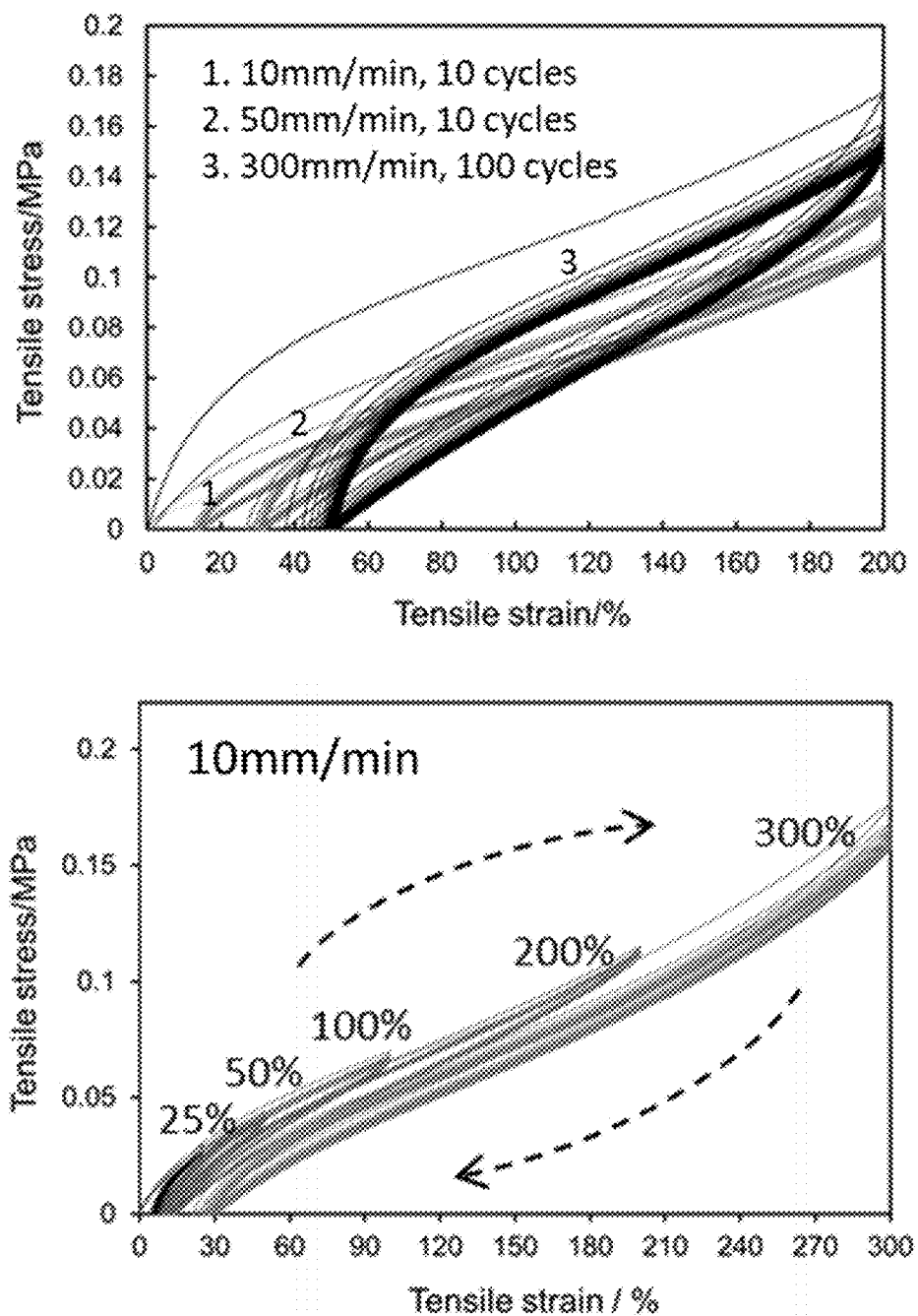
FIG. 4 depicts the cyclic tensile results for cured resin samples containing PDMS-thiourea polymer at different tensile strains and strain rates.

Along with its good mechanical properties as measured in the elongation to break tensile test, the crosslinked polymer from resin F23, i.e. $PDMS_{5k}$-$PDMS_{248}$ (50:50)-thiourea (P7) with reactive diluents also possesses a good fatigue durability as measured by cyclic tensile tests, as shown in FIG. 4. At a low strain rate of 10 mm/min, the residual strain is 15% after the first loading—unloading cycle (i.e. after tensile stress went back to 0 MPa). The observed hysteresis can be partially attributed to the energy dissipation from the physical bonding dissociation, indicating that the crosslinked polymer requires a delayed "reset" period to allow for re-equilibration and full property recovery. At higher strain rates of 300 mm/min, obvious effects of softening and a greater hysteresis effect is observed. After about 5 cycles, the cyclic tensile curves can be repeated very well, showing a very good fatigue durability. After stretching for 100 times, no obvious cracks were observed.

Figure 5:
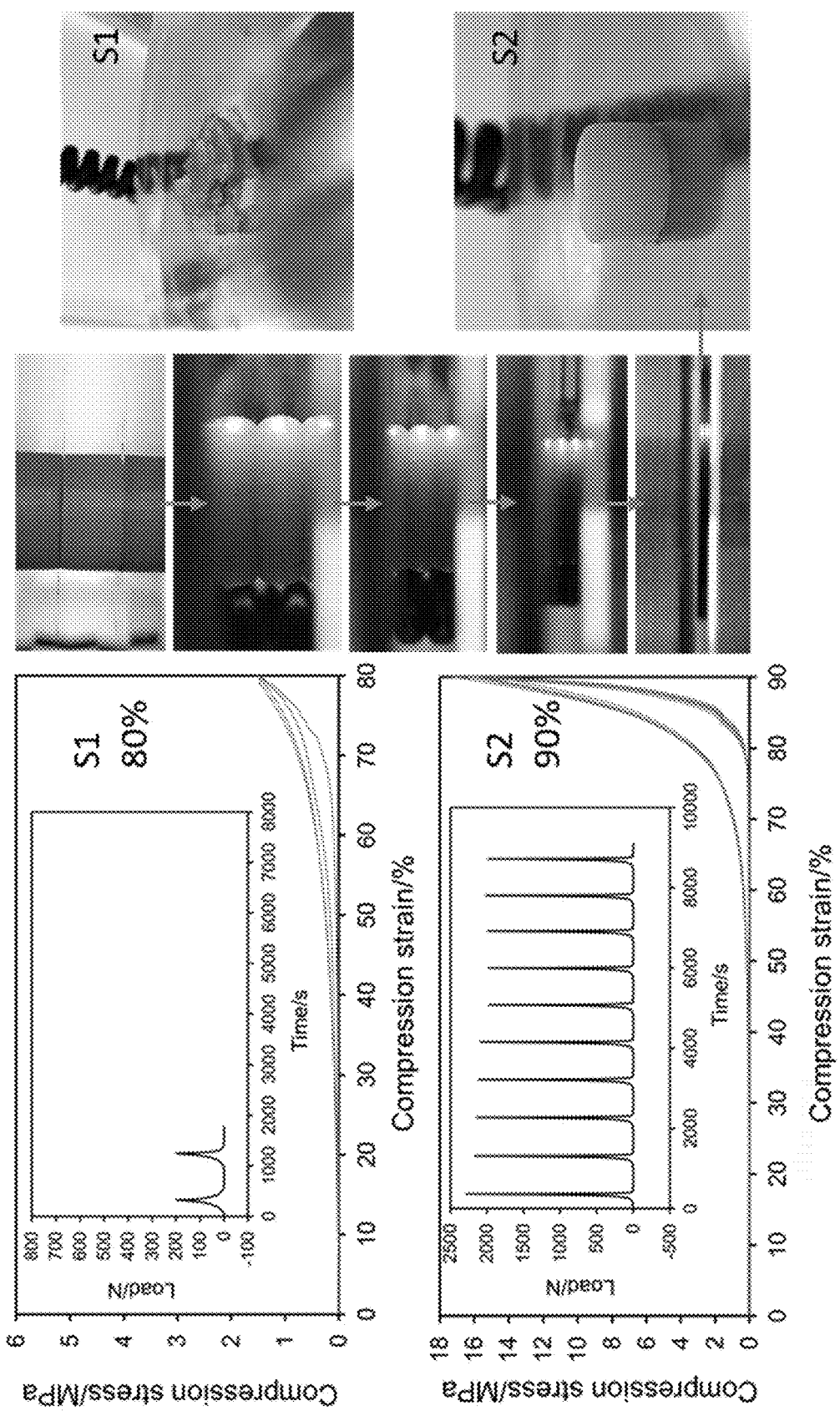
FIG. 5 depicts the compressive property test for cured resin containing PDMS-thiourea polymer with comparison against a commercial PDMS polymer, after UV crosslinking.

FIG. 5 shows a comparison of compressive properties between cured sample (Si) produced from commercial PDMS based resin (C7 Table 2) and cured sample produced from $PDMS_{5k}$-$PDMS_{248}$-thiourea based resin (F24). In the case of cylindrical shaped 3D printed specimens prepared from resin formulations containing $PDMS_{5k}$-$PDMS_{248}$-thiourea (25:75 mol %) macromonomer and diluents, the stress reached up to 17.2 MPa at applied compressive strain of 90%, at which the corresponding load force applied on the specimen could achieve up to 2,000 N. After 10 cycles of cyclic compression tests, there were no obvious cracks, fracture, shape deformation or collapse observed (FIG. 5-S2). The cylindrical shaped specimen could completely recover to its original shape after successive tests. By contrast, the resin formulation containing PDMS dimethacrylate (Gelest) was much more fragile and brittle. The maximum compressive stress applied on the specimen was 1.3 MPa, at the compressive strain of 80%. Moreover, the specimen was catastrophically fractured during the second cycle of 80% strain compression (as shown in FIG. 5-S1), when the corresponding load force was about 200 N, about 10 times less than that applied on samples prepared with $PDMS_{5k}$-$PDMS_{0.25k}$-thiourea (25:75 mol %) macromonomers and diluents.

It was also observed that the PDMS-thiourea polymer possesses a certain self-healing property. For example, the $PDMS_{2.5k}$-thiourea specimen (from polymer P3, resin F11 in Table 2) was cut into two pieces. After being compressed together and healed at 120° C., the healed sample could bear force which is two time its own weight. Without wishing to be bound by theory, it is proposed that the healing properties of polymer containing thiourea are dominated by a segmental motion such as the exchange of H-bonded thiourea pairs, leading to the interpenetration of polymer chains at the fractured portions upon compression. This unique self-healing property of the material is capable of repairing fractures or damages at the microscopic scale and restoring mechanical strengths at the macroscopic scale.

Example 8. Rheological Experiments

For all rheology experiments, an Anton Paar MCR 702 rheometer was used. A peltier element and a thermostatic hood were used for temperature control. The measurements were performed using a cone-plate geometry (25 mm) with non-humidified atmosphere in the measuring chamber. Measurements were performed at 20° C. for a gap size of 300 µm. The samples characterized for photorheology test were $PDMS_{5k}$-thiourea resin (F12 in Table 2), $PDMS_{5k}$-thiourea with reactive diluents resin (F21 in Table 2) and Gelest PDMS resin (C6 in Table 2). The samples characterized for viscosity measurement were (S1) $PDMS_{5k}$-thiourea resin (F12); (S2) $PDMS_{5k}$-$PDMS_{248}$ (75:25)-thiourea resin (F13); (S3) $PDMS_{5k}$-$PDMS_{248}$ (50:50)-thiourea resin (F14); (S4) $PDMS_{5k}$-$PDMS_{248}$ (25:75)-thiourea resin (F15); (S5) $PDMS_{5k}$-$PDMS_{248}$ (100:0)-thiourea with reactive diluents resin (F21); (S6) $PDMS_{5k}$-$PDMS_{248}$ (75:25)-thiourea with reactive diluents resin (F22); (S7) $PDMS_{5k}$-$PDMS_{248}$ (50:50)-thiourea with reactive diluents resin (F23); (S8) $PDMS_{5k}$-$PDMS_{248}$ (25:75)-thiourea with reactive diluents resin (F24).

Figure 6:
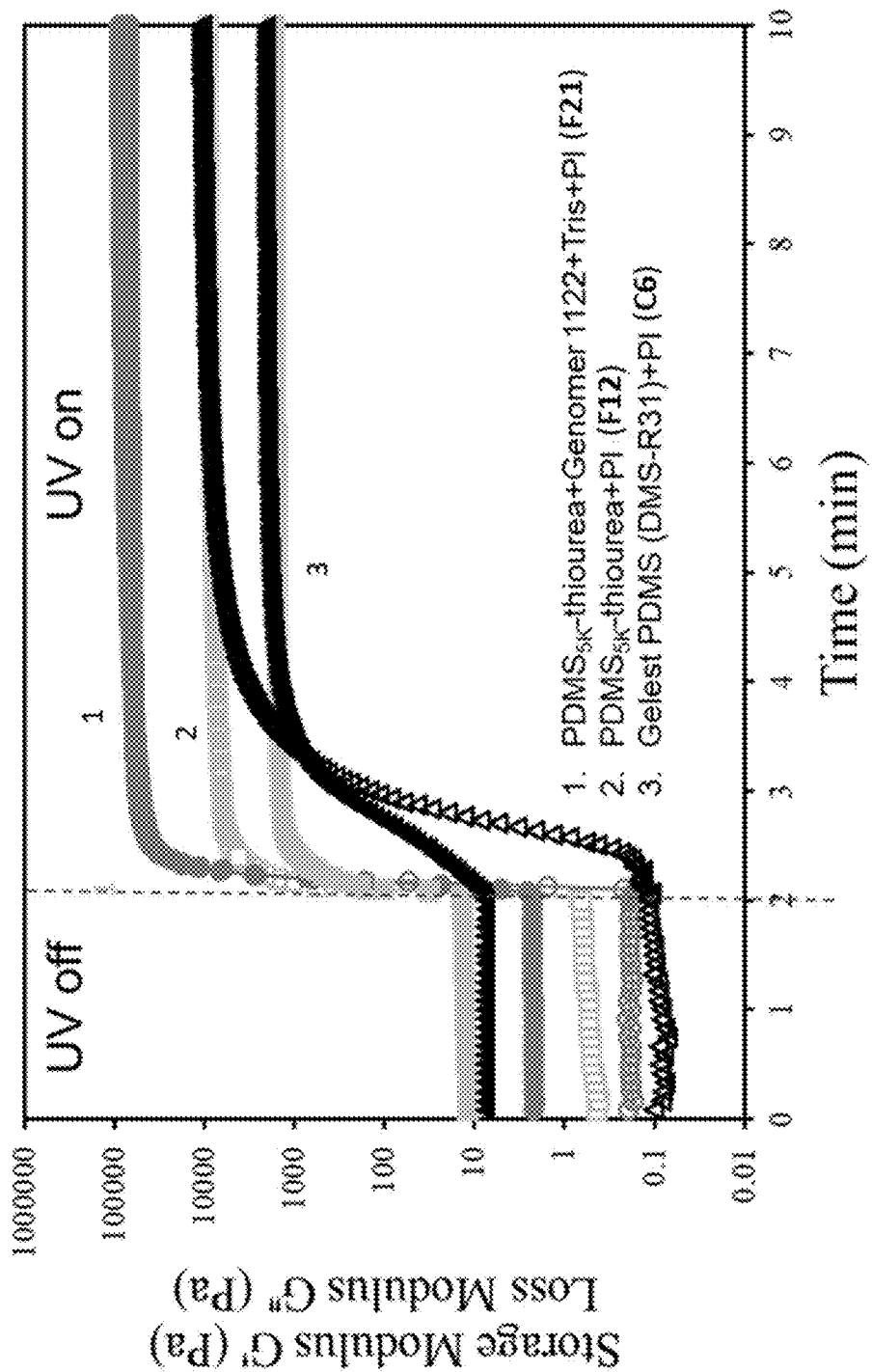
FIG. 6 depicts photorheology results comparing the crosslink rates of PDMS-thiourea polymers and commercial PDMS resins when exposed to UV light.

FIG. 6 shows results from photorheology which compare the UV crosslink rates of PDMS-thiourea, this PDMS-thiourea diluted with reactive diluent and commercial PDMS resins. The results showed that samples containing PDMS-thiourea polymer have a higher photo crosslinking rate compared with commercial methacryloxypropyl terminated PDMS (PDMS-thiourea polymer>PDMS-thiourea with reactive diluents>commercial PDMS). The higher UV crosslinking rate can lead to a faster printing rate, which will greatly reduce the time it takes to print.

Rheological analysis (in the absence of crosslinking) also revealed that the viscosity of resins F12-F14 was well above 10 Pa·s across the full range of measured shear rates (0.01 to 100 $s^{-1}$). However, when diluted with tris monomer (3-[Tris(trimethylsiloxy)silyl]propyl methacrylate) and Genomer 1122 (monofunctional urethane acrylate), i.e. resins F21-F24, the viscosity was below 5 Pa·s across the full shear range and thus suitable for DLP 3D printing.

Example 9. UV LED DLP Stereolithography

An Asiga Freeform PRO2™ printer was used to produce stereolithography prints. The printer was fitted with high-power UV 385 nm LED. Before starting the print, the resin was poured into the vat. After the printing was completed, the printed object was detached from the build plate (using a razor blade). The uncured resin was rinsed off by immersing in an isopropyl alcohol bath and the printed object was further cured under a UV lamp. The 3D printability of a resin comprising PDMS-thiourea polymer was tested in this manner. Based on the properties determined in the previous examples, the resin was formulated as follows: polymer P8: $PDMS_{5k}$-$PDMS_{248}$(25:75)-thiourea+reactive diluents (Tris+Genomer 1122)+photoinitiators (Irgacure 819+Daroncur 1173+TPO-L). (F24)

Figure 7:
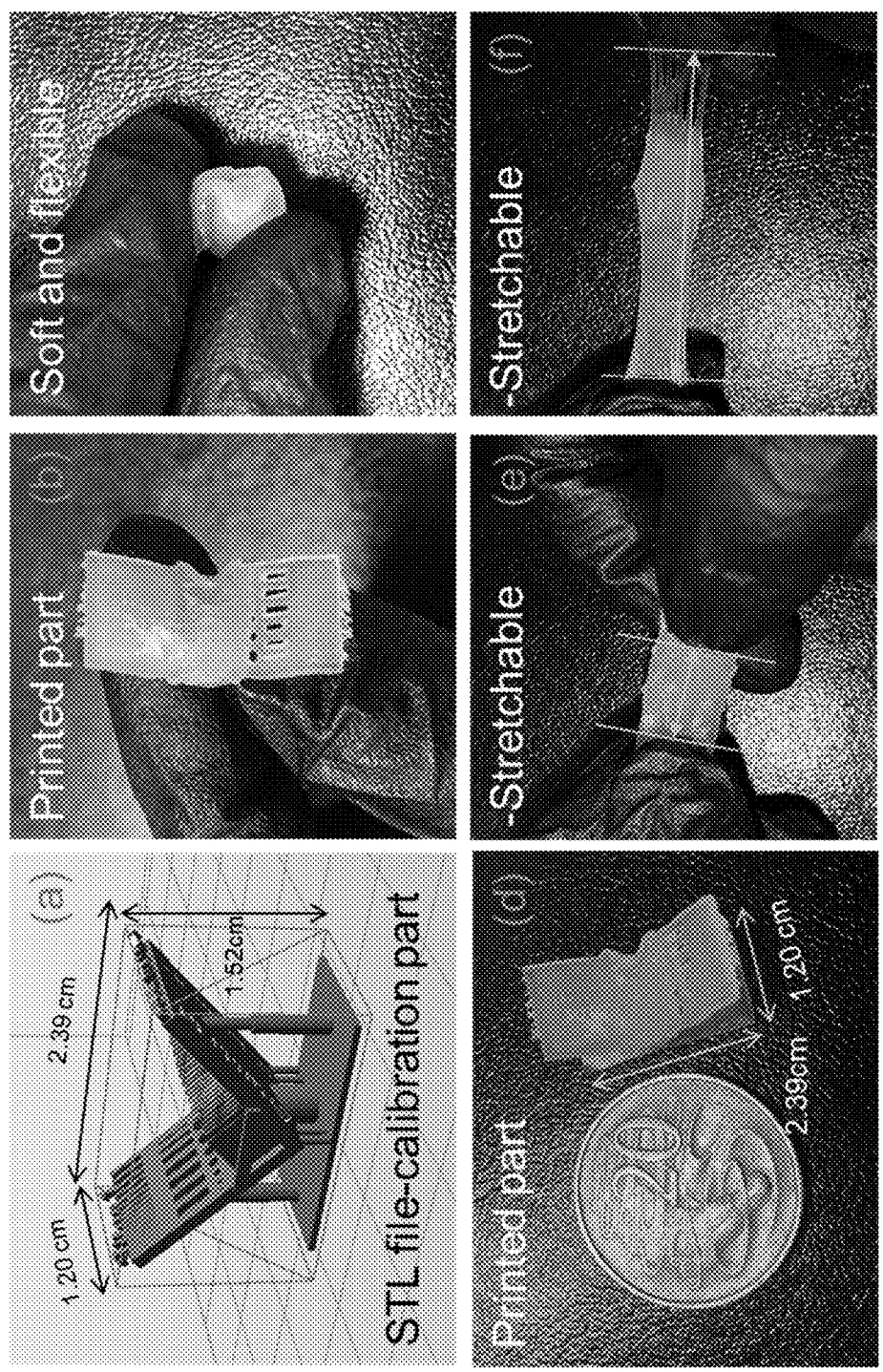
FIG. 7 shows photographs of a complex 3D-printed part produced from resin containing PDMS-thiourea polymer, with comparison against the STL file executed by the printer.

The results are depicted in FIG. 7. FIG. 7(a) shows the original STL file which was executed by the printer. FIGS. 7(b) and 7(d) depicts the cured 3D printed part produced with good resolution and intact structure compared with the original STL file. The printed part also demonstrated good stretchability and flexibility as shown in FIGS.

7(c), (e) and (f), which suggests its potential applications in flexible electronics, soft robotics and biomedical devices.

Example 10. Use of Diluent 3-Propylbis(Trimethylsiloxy)Methylsilane-3-[(2-Methacryloyloxyethyl) Urea] Formula XIII

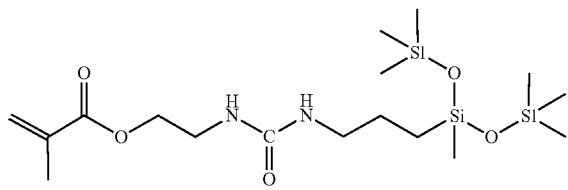

Use of the above diluent was explored to make resins that were stable, clear, and once 3D printed with the use of radicals provided strong, elastic complex 3D articles.

Synthesis of 3-propylbis(trimethylsiloxy)methylsilane-3-[(2-methacryloyloxyethyl) urea]

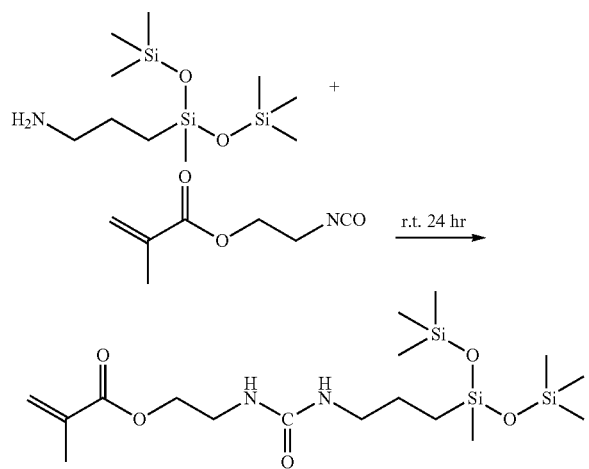

In a typical example, 3-aminopropylmethylbis(trimethylsiloxy)silane (22.6 g, 0.081 mol) was added into a 100 mL round bottomed flask. 2-Isocyanatoethyl methacrylate (12.4 g, 0.08 mol) was then added into the round bottomed flask at 0° C. under a nitrogen atmosphere, and the mixture was stirred for 24 h at room temperature under a nitrogen atmosphere. The product was used as reactive diluent directly without purification.

The resins were made according to methodology of Example 1 and 6 except for the following differences. In order to prepare the resin, 3-[tris(trimethylsiloxy)silyl]propyl methacrylate was used as reactive diluent for its siloxane functionality and 3-propylbis(trimethylsiloxy)methylsilane-3-[(2-methacryloyloxyethyl) urea] was used due to the additional hydrogen bonding potentially contributed through the urea group. The final resin turned out to be clear, stable and a flowable liquid with pale yellow colour.

Like F21 but instead of F21 composition, Formula XIII above was used as the reactive diluent (PDMS-thiourea: Tris: Formula XIII=1:1:1 wt %) replacing Genomer 1122.

The results of using this are depicted in FIGS. 8 to 12.

Figure 8:
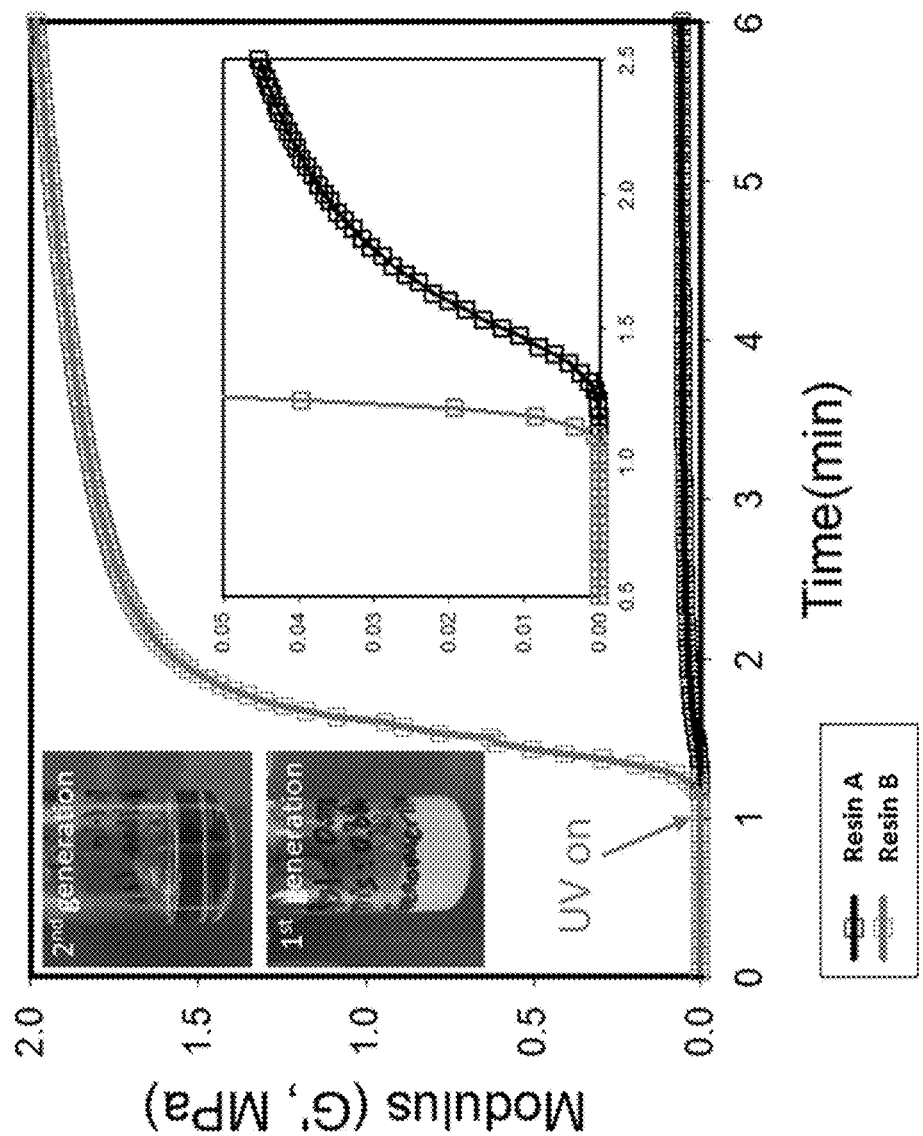
FIG. 8 depicts photorheology result for crosslinking resins containing different reactive diluents (the results demonstrated the modulus change during the UV curing)
Figure 9:
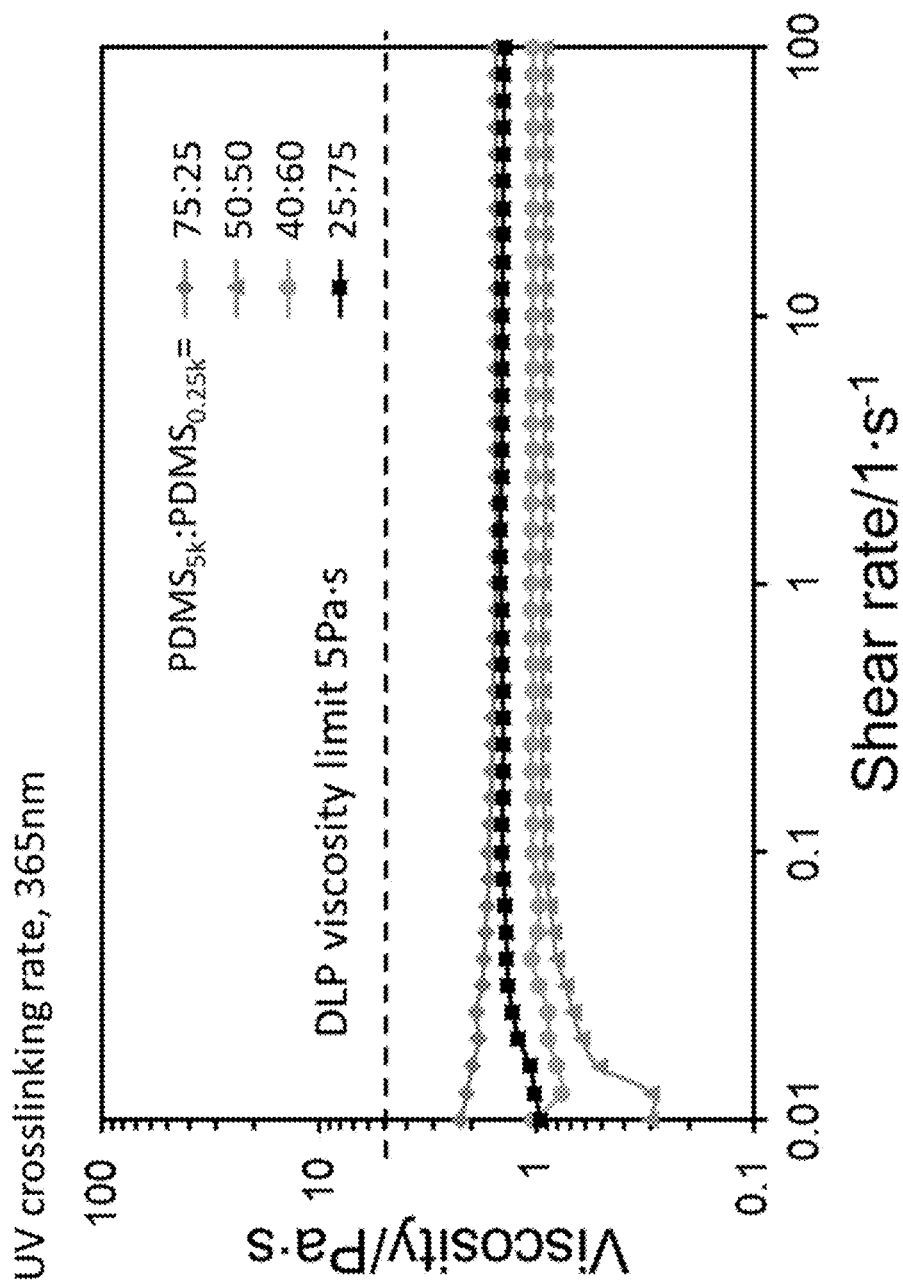
FIG. 9 depicts viscosity versus shear rate plots for different liquid resins containing different PDMS-thiourea polymers with differing ratios of long PDMS segments to short PDMS segments, using the reactive diluent 3-propylbis (trimethylsiloxy) methylsilane-3-[(2-methacryloyloxyethyl) urea]
Figure 10:
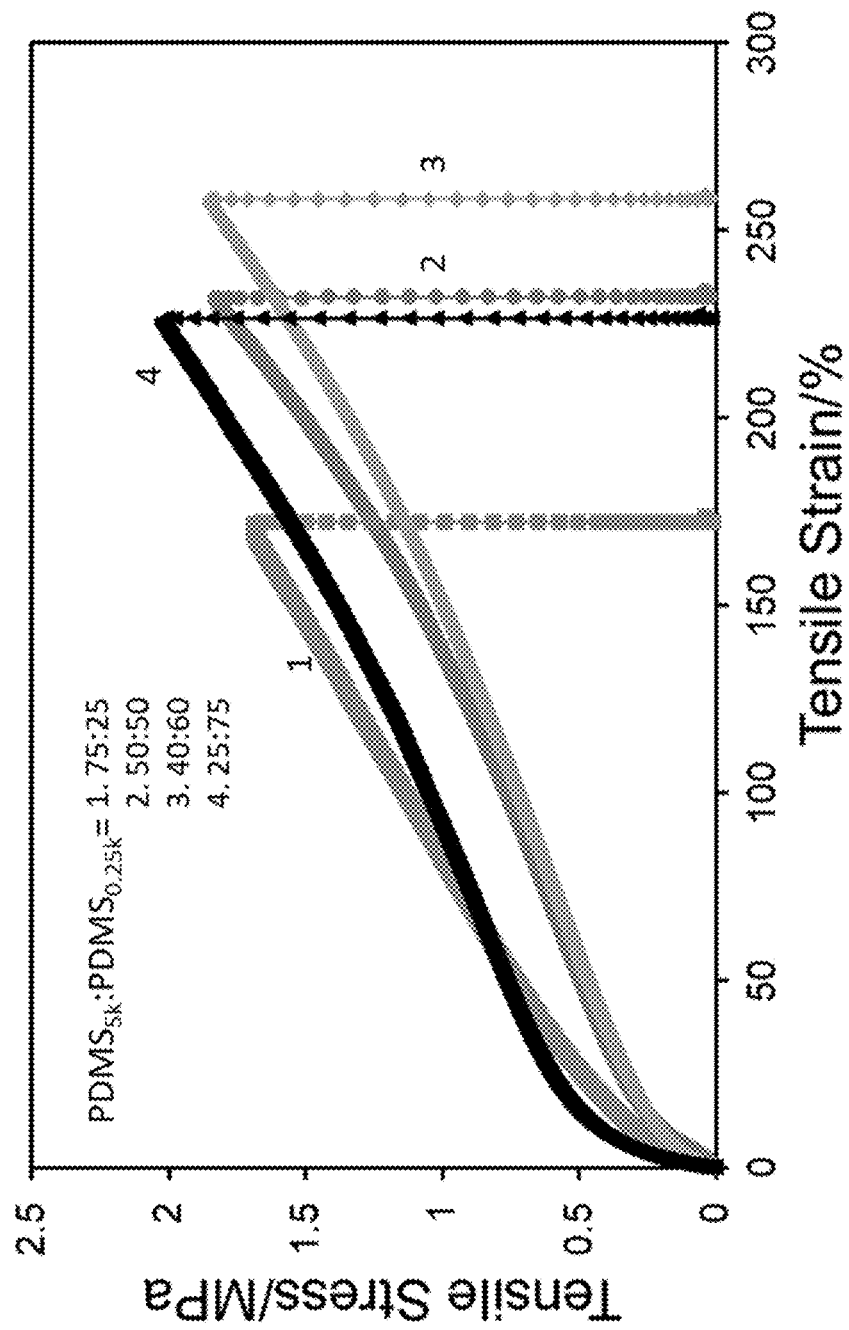
FIG. 10 depicts tensile test results (stress-strain curves) for cured resin samples containing PDMS-thiourea polymers with differing ratios of long PDMS segments to short PDMS segments, using the reactive diluent 3-propylbis (trimethylsiloxy)methylsilane-3-[(2-methacryloyloxyethyl) urea]
Figure 11:
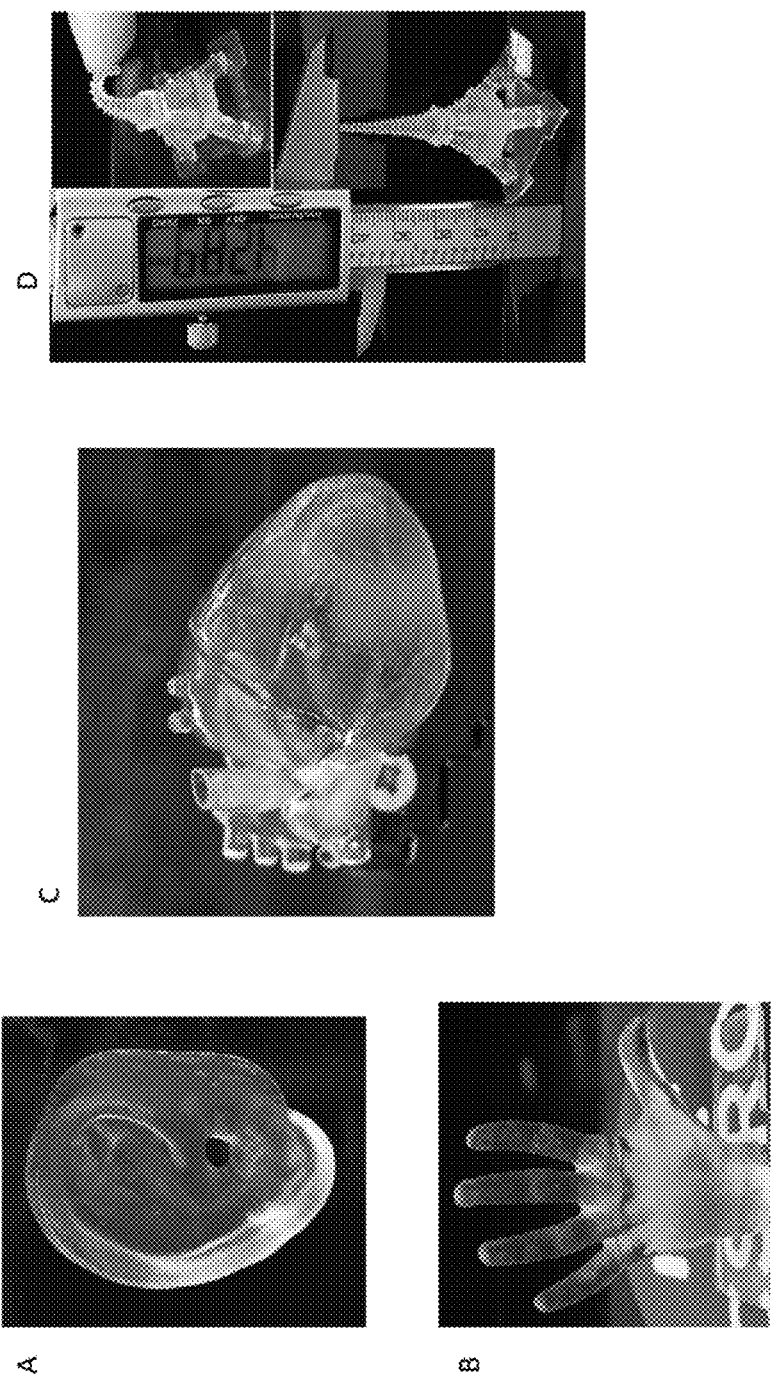
FIG. 11 depicts photographs of complex 3D-printed parts produced from resin containing PDMS-thiourea polymer, using the diluent 3-propylbis(trimethylsiloxy)methylsilane-3-[(2-methacryloyloxyethyl) urea]
Figure 12:
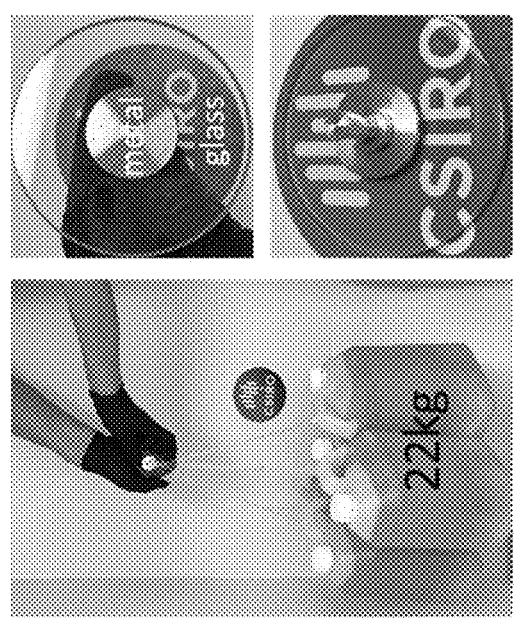
FIG. 12 depicts shear strength of the crosslinked resin adhering between glass and metal, in which a 4.9 $cm^2$ film of resin holds more than 22 kg.
Figure 12:
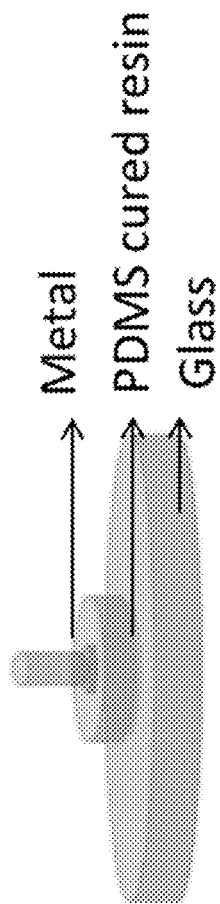

FIG. 8 shows comparison of crosslinking rate of resin A that contains Genomer 1122 and resin B containing Formula XIII. Resin containing reactive diluent Formula XIII results in a faster crosslinking rate, better miscibility with PDMS-thiourea polymer proved by a clear and stable resin solution and produces a crosslinked part with a higher modulus. FIG. 9 shows the viscosity of the various compositions containing reactive diluent Formula XIII, tris and PDMS thiourea macromonomers with different short and long block lengths with mass ratio 1:1:1. The higher the ratio of $PDMS_{5k}$: $PDMS_{0.25k}$ the higher the initial viscosity before shear is applied. Viscosities range from 0.5 to 2 Pa·s, which is suitable for vat polymerization 3D printing technology. FIG. 10 showed that the tensile properties of UV cured samples of these formulations. The results demonstrated that the maximum tensile strength could reach up to 2 MPa, while the tensile strain is around 200%, which suggests that the resin containing new reactive diluent Formula XIII can produce much tougher and rigid object compared with resin containing reactive diluent Genomer 1122. FIG. 11 shows photographs of complex 3D-printed parts produced from resin containing $PDMS_{5k}$-$PDMS_{248}$ (40:60)-thiourea, the reactive diluent Formula XIII and tris (mass ratio 1:1:1). The printed parts are transparent and have good resolution with respect to architectural detail. With the resin containing reactive diluent Formula XIII, it is now possible to print complex structures with fine details and small features, such as a human heart model complex architectural features. This same resin could also be used as adhesive for metal and glass, as shown in FIG. 12. After curing under UV light for 20 s, a circular film 25 mm diameter and 0.3 mm thick had the adhesive strength between glass and metal strong enough to pull a heavy load greater than 22 kg.

Example 11. Preparation of Nanofiller-Reinforced PDMS Resin

In the present work, hydrophilic nano-scaled silica nanoparticles (Wacker Chemicals, HDK® T30) were dispersed in resin ($PDMS_{5k}$-$PDMS_{248}$-thiourea 40:60+tris+new reactive diluent Formula XIII) with different ratio (1%, 2%, 5%, 10% and 15%). After sonication, the resin was further manually stirred for 10 min. All the nanocomposite resins turned out to be clear and transparent. After the bubbles were removed, it was ready to be poured into the mould for curing.

Figure 13:
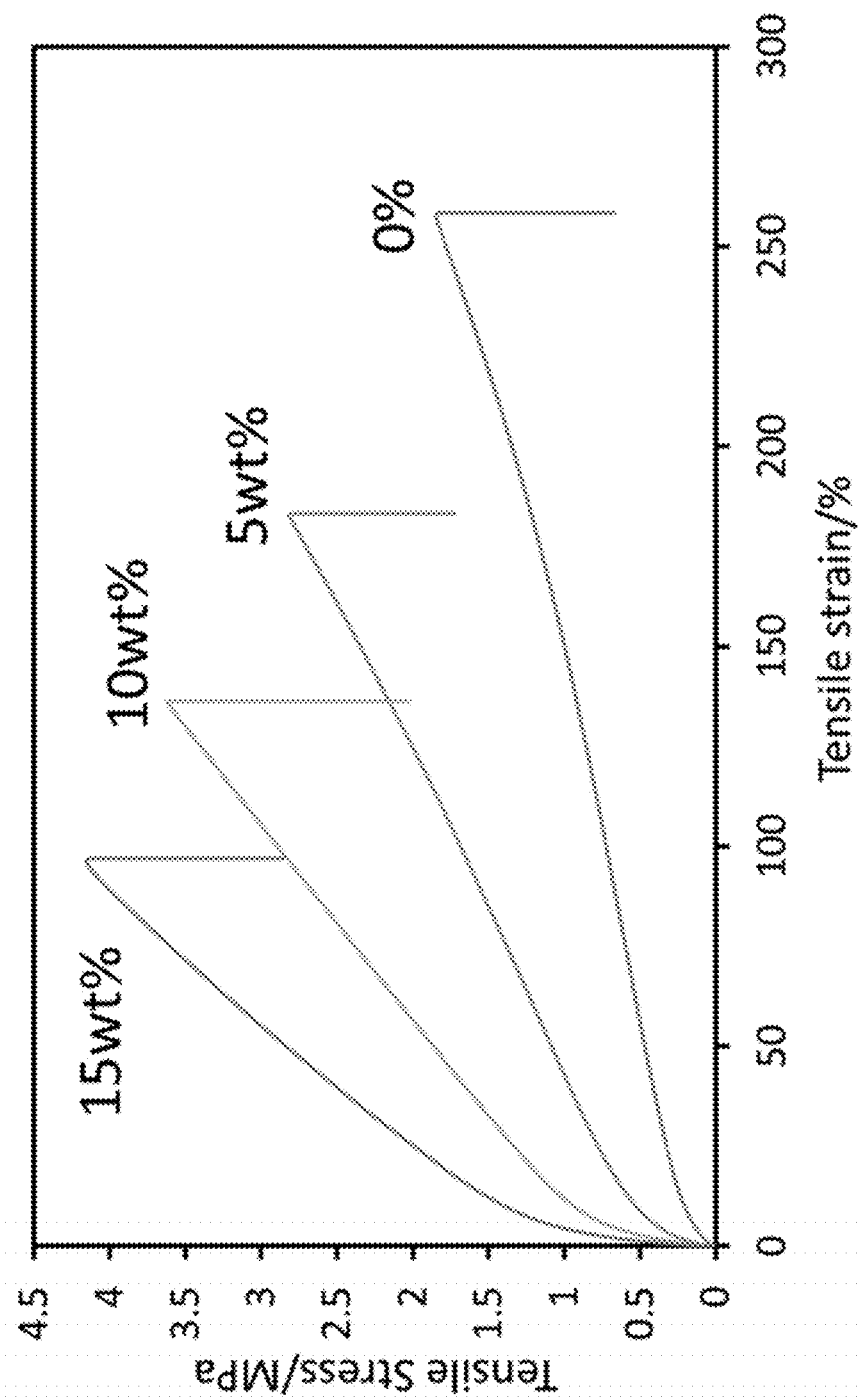
FIG. 13 depicts the tensile test result for crosslinked resin containing PDMS-thiourea polymer with different ratio with the addition of the nanoparticulate, hydrophilic silica nanoparticles (Wacker Chemicals, HDK® T30)

The dogbone shaped samples were prepared according to the procedures described in Example 7. FIG. 13 shows the tensile properties of cured samples with 0, 5, 10 and 15 wt % silica nanoparticles (HDK® T30). With increasing ratio of silica nanoparticles, the tensile strength of cured sample was greatly increased, while the tensile strain was decreased correspondingly. The tensile strength could reach up to 4.2 MPa with 15 wt % of silica nanoparticles, which suggested that the cured samples became tougher with silica nanofillers.

Figure 14:
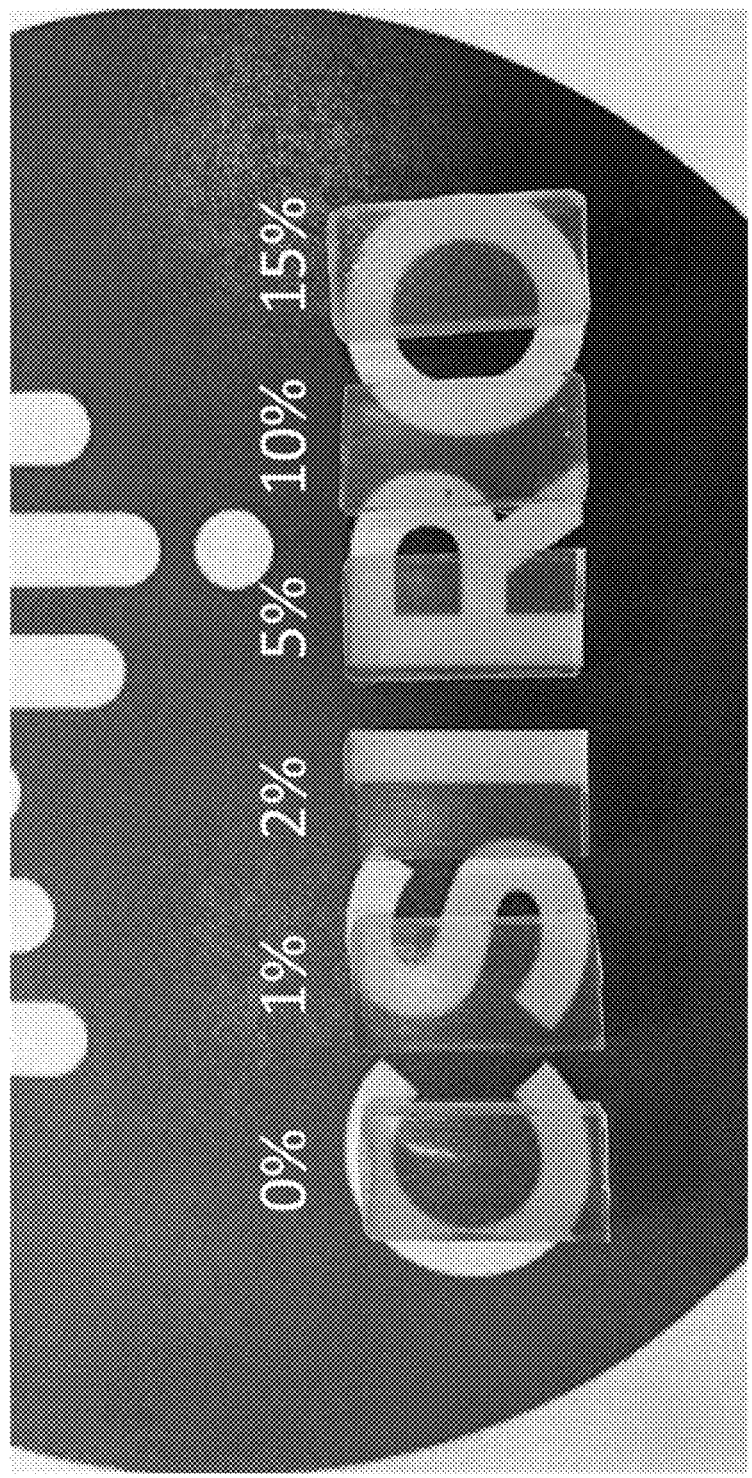
FIG. 14 depicts the photo of cured resin containing PDMS-thiourea polymer with different ratio of hydrophilic silica nanoparticles (Wacker Chemicals, HDK® T30).

FIG. 14 shows the photo of resin ($PDMS_{5k}$-$PDMS_{248}$-thiourea 40:60+tris+new reactive diluent Formula XIII) with different ratio (1%, 2%, 5%, 10% and 15%) of silica nanoparticles. All the samples still retain good transparency, even with high ratio (15%) of nanofillers.

It is to be understood that various other modifications and/or alterations may be made without departing from the spirit of the present invention as outlined herein.

The invention claimed is:

1. A liquid polysiloxane comprising a siloxane-thiourea segment and a crosslinkable functional group(s) selected from one or more ethylenically unsaturated groups, silyl hydride groups, alkylenethiol groups and combinations thereof, wherein the siloxane-thiourea segment comprises a structure of formula (III);

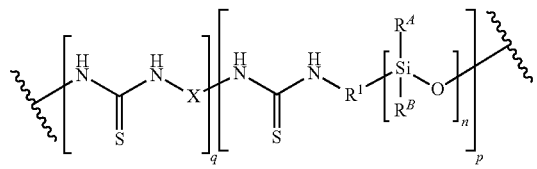

(III)

wherein:
  each $R^A$ and $R^B$ are independently selected from H, optionally substituted alkyl, optionally substituted aryl, optionally substituted siloxane, a moiety comprising an alkylenethiol group, and a moiety comprising one or more ethylenically unsaturated groups;
  each X is independently selected from optionally substituted alkylene, optionally substituted arylene, (poly)siloxane, polyether, polyimide and polyester;
  $R^1$ is independently optionally substituted alkylene or optionally substituted arylene;
  n is an integer of at least 1;
  p is an integer of at least 1; and
  q is an integer of at least 1.

2. The polysiloxane according to claim 1 having a structure of formula (IV):

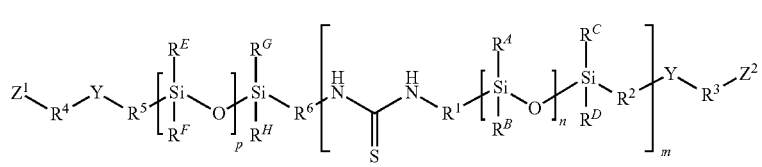

(IV)

wherein:
  each $R^A$, $R^B$, $R^C$, $R^D$, $R^E$ and $R^F$, and $R^G$ and $R^H$ are independently selected from H, optionally substituted alkyl, optionally substituted aryl, optionally substituted siloxane, optionally substituted alkylenethiol, and a moiety comprising one or more ethylenically unsaturated groups;
  each $R^1$ and $R^2$ are independently optionally substituted alkylene or optionally substituted arylene;
  $R^3$, $R^4$, $R^5$ and $R^6$ are each independently optionally substituted alkylene or optionally substituted arylene;
  Y represents a divalent linking group;
  $Z^1$ and $Z^2$ are each independently selected from a moiety comprising one or more silyl hydride groups, a moiety comprising one or more alkylenethiol groups, and a moiety comprising one or more ethylenically unsaturated groups;
  n is an integer of at least 1;
  m is an integer of at least 1; and
  p is an integer of at least 1.

3. The polysiloxane according to claim 2, wherein Y is a moiety of formula —NH—C(O)—NH— or NH—C(S)—NH—.

4. The polysiloxane according to claim 1, wherein the one or more ethylenically unsaturated groups form part of a (meth)acryloyl group, (meth)acryloyloxy group, styrenyl group, vinyl ether group, vinyl ester group or (meth)acrylamide group.

5. The polysiloxane according to claim 1, wherein the one or more ethylenically unsaturated groups has a structure represented by —R—(X)C=C(Y)$_2$, where R is Si or alkylene and X and each Y is independently alkyl or H.

6. The polysiloxane according to claim 1 further comprising a Diels-Alder adduct that can undergo a retro Diels-Alder reaction.

7. A liquid resin composition comprising a polysiloxane of claim 1 and an agent for promoting crosslinking of the crosslinkable functional group(s).

8. The resin composition according to claim 7, wherein the agent is selected from a catalyst and a radical initiator.

9. The resin composition according to claim 7, wherein the agent is a photo-radical initiator.

10. The resin composition according to claim 9, wherein the composition further comprises a photo-absorber.

11. The resin composition according to claim 7 further comprising a reactive diluent.

12. The resin composition according to claim 7 further comprising nanoparticulate material.

13. A silicone article comprising a crosslinked form of the liquid polysiloxane according to claim 1.

14. A silicone article comprising a crosslinked form of the liquid resin composition according to claim 1.

15. A method of producing a silicone article, the method comprising printing the liquid resin composition according to claim 10 using a three dimensional printer and crosslinking the printed resin composition.

16. The method according to claim 15, wherein the agent for promoting crosslinking is a photo-initiator and crosslinking is promoted by exposing the printed resin to UV light.

17. An adhesive, sealant or printing cartridge comprising the liquid resin composition according to claim 7.

* * * * *